US012342175B2

(12) United States Patent
Kimura et al.

(10) Patent No.: US 12,342,175 B2
(45) Date of Patent: Jun. 24, 2025

(54) INFORMATION PROCESSING DEVICE AND INFORMATION PROCESSING METHOD

(71) Applicant: SONY CORPORATION, Tokyo (JP)

(72) Inventors: Ryota Kimura, Tokyo (JP); Sho Furuichi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 662 days.

(21) Appl. No.: 17/276,610

(22) PCT Filed: Sep. 13, 2019

(86) PCT No.: PCT/JP2019/036190
§ 371 (c)(1),
(2) Date: Mar. 16, 2021

(87) PCT Pub. No.: WO2020/066712
PCT Pub. Date: Apr. 2, 2020

(65) Prior Publication Data
US 2021/0274353 A1    Sep. 2, 2021

(30) Foreign Application Priority Data

Sep. 28, 2018 (JP) ................. 2018-185111

(51) Int. Cl.
*H04W 16/14* (2009.01)
*H04W 24/10* (2009.01)
(Continued)

(52) U.S. Cl.
CPC .......... *H04W 16/14* (2013.01); *H04W 24/10* (2013.01); *H04W 76/20* (2018.02); *H04W 92/18* (2013.01)

(58) Field of Classification Search
CPC ..... H04W 16/14; H04W 24/10; H04W 76/20; H04W 92/18; H04W 52/262; H04W 52/367; H04B 17/354; H04B 17/3912
(Continued)

(56) References Cited

U.S. PATENT DOCUMENTS

2006/0026150 A1\* 2/2006 Hamada ................ G06F 21/608
2015/0148090 A1    5/2015 Shimomura
(Continued)

FOREIGN PATENT DOCUMENTS

CN    103748911 A    4/2014
CN    105453628 A    3/2016
(Continued)

OTHER PUBLICATIONS

International Search Report and Written Opinion of PCT Application No. PCT/JP2019/036190, issued on Dec. 10, 2019, 10 pages of ISRWO.

*Primary Examiner* — Ricardo H Castaneyra
(74) *Attorney, Agent, or Firm* — CHIP LAW GROUP

(57) ABSTRACT

An information processing device includes: an acquisition unit (441) that acquires information on a second wireless system that performs wireless communication by using radio waves in a frequency band used by a first wireless system; a determination unit (442) that determines a communication parameter of the second wireless system on the basis of the information on the second wireless system that is acquired by the acquisition unit (441); and a notification unit (443) that notifies another information processing device of the communication parameter determined by the determination unit (442).

10 Claims, 38 Drawing Sheets

(51) Int. Cl.
*H04W 76/20* (2018.01)
*H04W 92/18* (2009.01)

(58) Field of Classification Search
USPC .......................................... 370/329
See application file for complete search history.

(56) References Cited

U.S. PATENT DOCUMENTS

| | | |
|---|---|---|
| 2016/0080194 A1 | 3/2016 | Tsutsui |
| 2016/0128000 A1 | 5/2016 | Furuichi et al. |
| 2016/0261991 A1* | 9/2016 | Yamada ............. G06Q 30/0261 |
| 2019/0082327 A1 | 3/2019 | Furuichi |

FOREIGN PATENT DOCUMENTS

| | | |
|---|---|---|
| CN | 107534867 A | 1/2018 |
| CN | 107925887 A | 4/2018 |
| EP | 2887721 A1 | 6/2015 |
| EP | 3038400 A1 | 6/2016 |
| JP | 2012-49643 A | 3/2012 |
| JP | 2013-520079 A | 5/2013 |
| JP | 5884835 B2 | 3/2016 |
| WO | 2014/027403 A1 | 2/2014 |
| WO | 2014/188583 A1 | 11/2014 |
| WO | 2015/025605 A1 | 2/2015 |

* cited by examiner

FIG.15

| SERVER ID (DEVICE ID) | SERVER NAME (DEVICE NAME) | SERVER GROUP ID | IP ADDRESS | FQDN | MAC ADDRESS | LOCATION INFORMATION |
|---|---|---|---|---|---|---|
| 0001 | parasrv1 | G1 | 11.11.11.11 | parasrv1.xxx.com | AA:AA:AA:AA:AA:AA | LATITUDE Lat1 LONGITUDE Lon1 ALTITUDE Alt1 |
| 0002 | parasrv2 | G2 | 22.22.22.22 | parasrv2.yyy.com | BB:BB:BB:BB:BB:BB | LATITUDE Lat2 LONGITUDE Lon2 ALTITUDE Alt2 |
| 0003 | parasrv3 | G3 | 33.33.33.33 | parasrv3.zzz.com | CC:CC:CC:CC:CC:CC | LATITUDE Lat3 LONGITUDE Lon3 ALTITUDE Alt3 |
| ... | ... | ... | ... | ... | ... | ... |

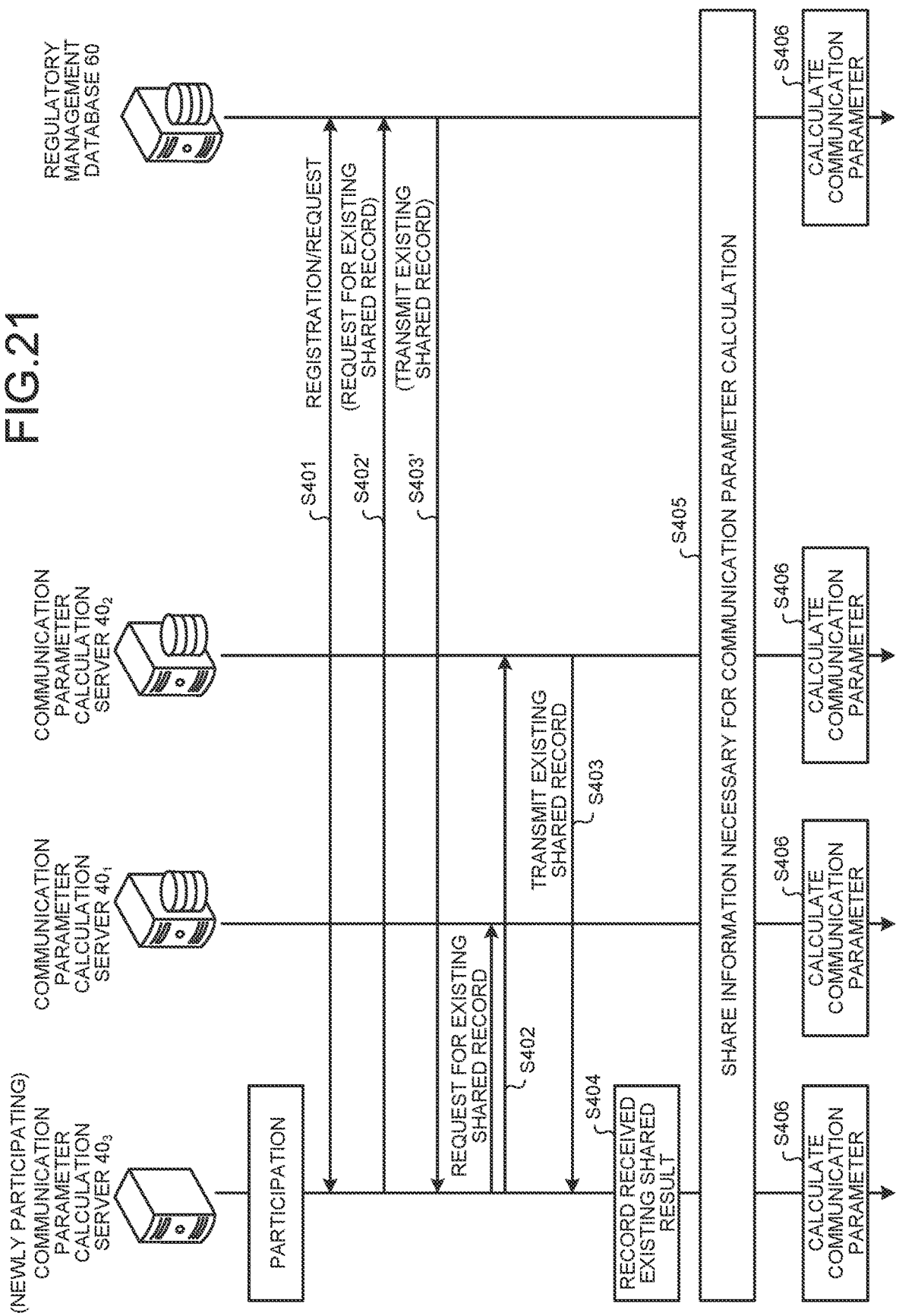

FIG.22

| SERVER ID (DEVICE ID) | SERVER NAME (DEVICE NAME) | SERVER TYPE | SERVER GROUP ID | IP ADDRESS | FQDN | MAC ADDRESS | LOCATION INFORMATION | REQUEST PRIORITY |
|---|---|---|---|---|---|---|---|---|
| 0001 | parasrv1 | COMMUNICATION PARAMETER CALCULATION SERVER | G1 | 11.11.11.11 | parasrv1.xxx.com | AA:AA:AA:AA:AA:AA | LATITUDE Lat1 LONGITUDE Lon1 ALTITUDE Alt1 | 3 |
| 0002 | parasrv2 | COMMUNICATION PARAMETER CALCULATION SERVER | G2 | 22.22.22.22 | parasrv2.yyy.com | BB:BB:BB:BB:BB:BB | LATITUDE Lat2 LONGITUDE Lon2 ALTITUDE Alt2 | 3 |
| 0003 | parasrv3 | COMMUNICATION PARAMETER CALCULATION SERVER | G3 | 33.33.33.33 | parasrv3.zzz.com | CC:CC:CC:CC:CC:CC | LATITUDE Lat3 LONGITUDE Lon3 ALTITUDE Alt3 | 3 |
| 0004 | Rgdb | REGULATORY MANAGEMENT DATABASE | G0 | 44.44.44.44 | regdb.aaa.gov | DD:DD:DD:DD:DD:DD | LATITUDE Lat4 LONGITUDE Lon4 ALTITUDE Alt4 | 2 |
| 0005 | recdb | CALCULATION RESULT RECORD DATABASE | G1 | 55.55.55.55 | Recdb.bbb.com | EE:EE:EE:EE:EE:EE | LATITUDE Lat5 LONGITUDE Lon5 ALTITUDE Alt5 | 1 |
| ... | ... | ... | ... | ... | ... | ... | ... | ... |

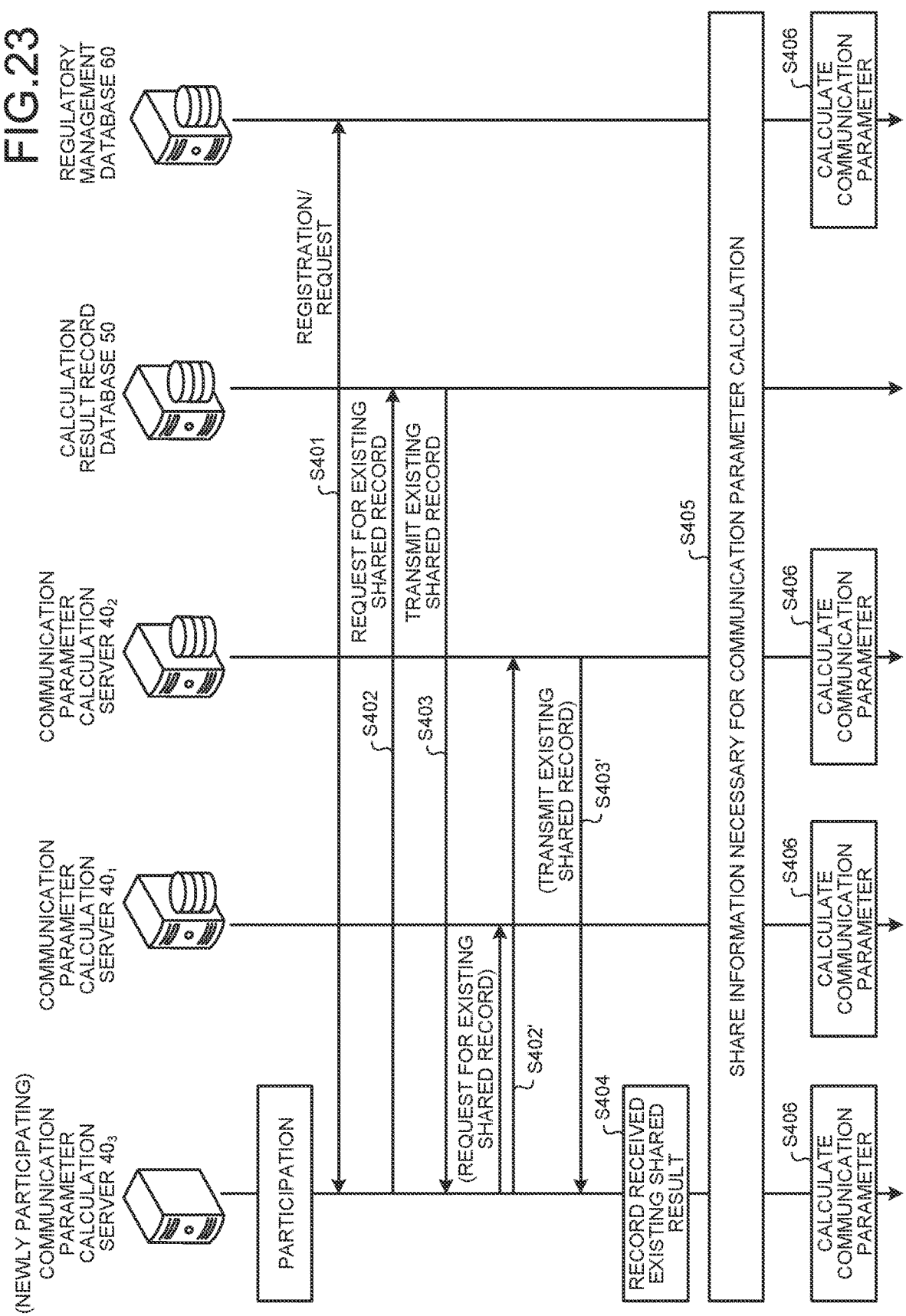

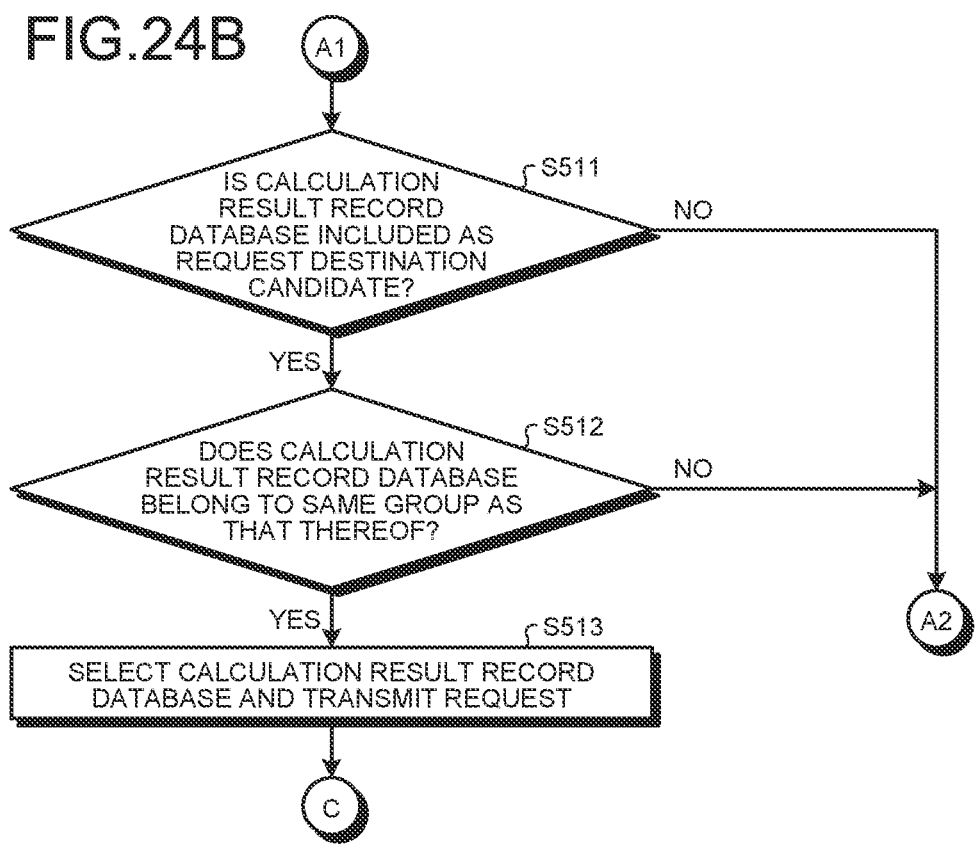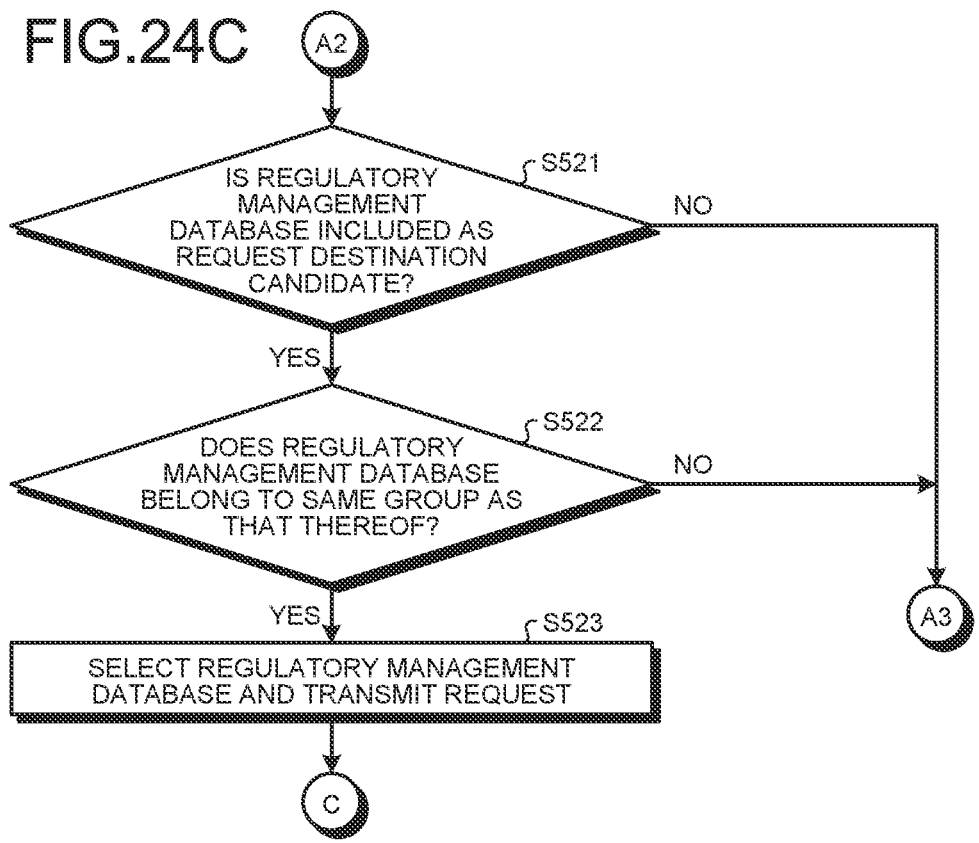

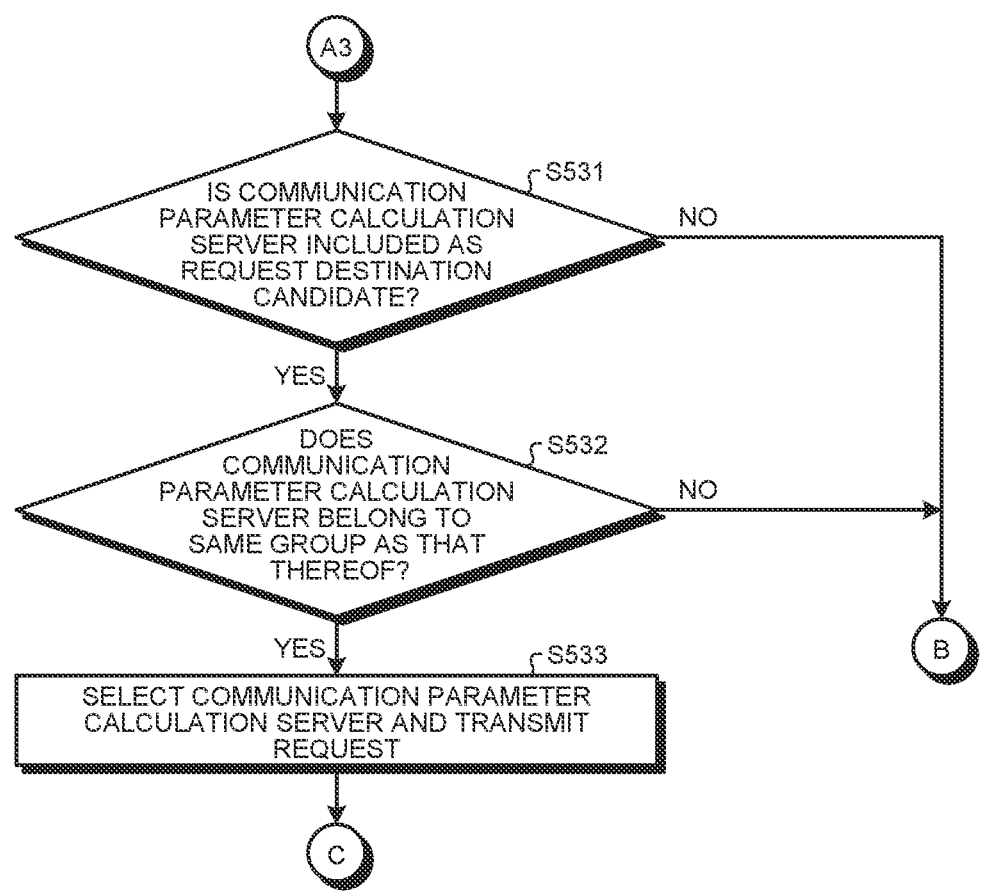

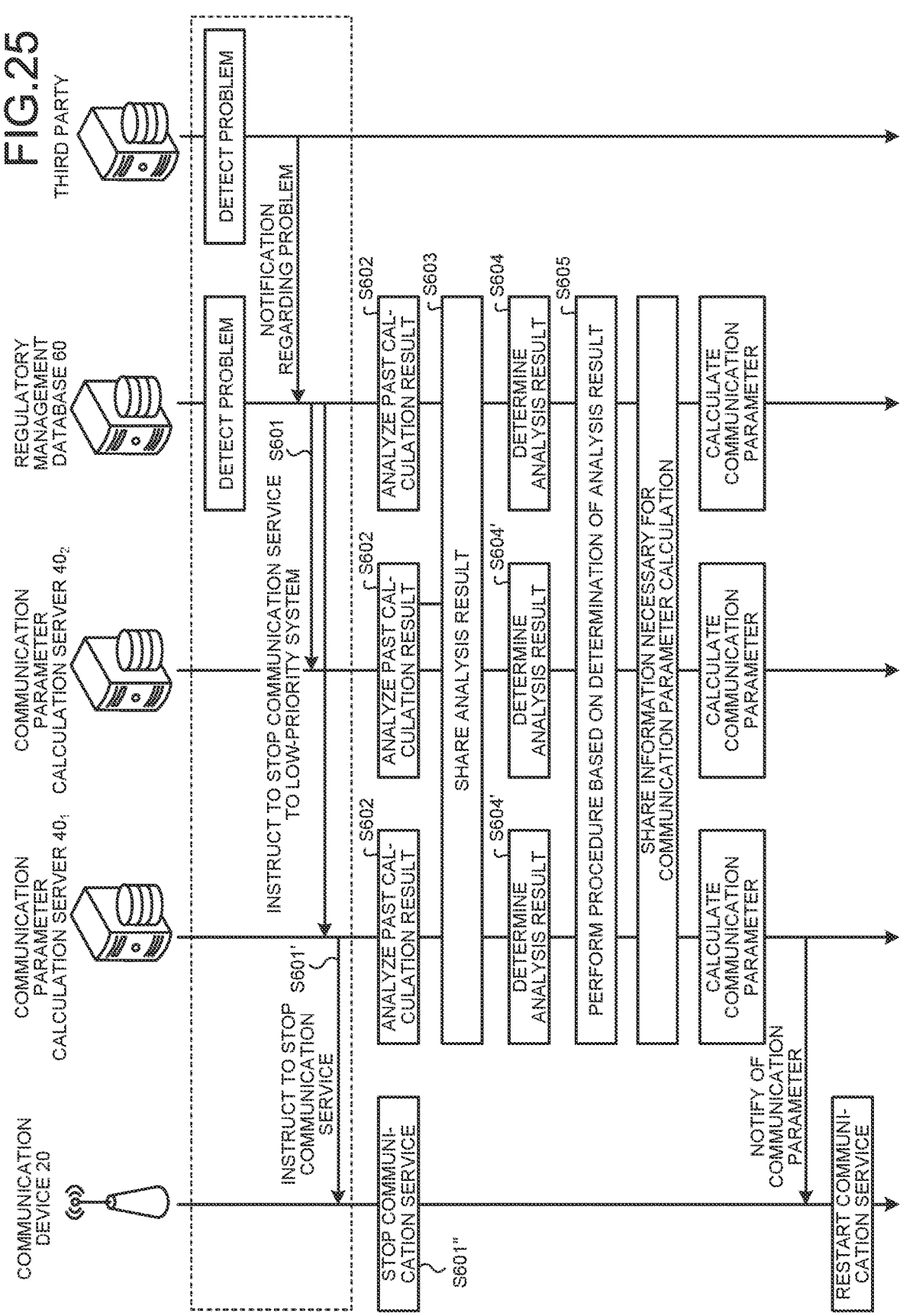

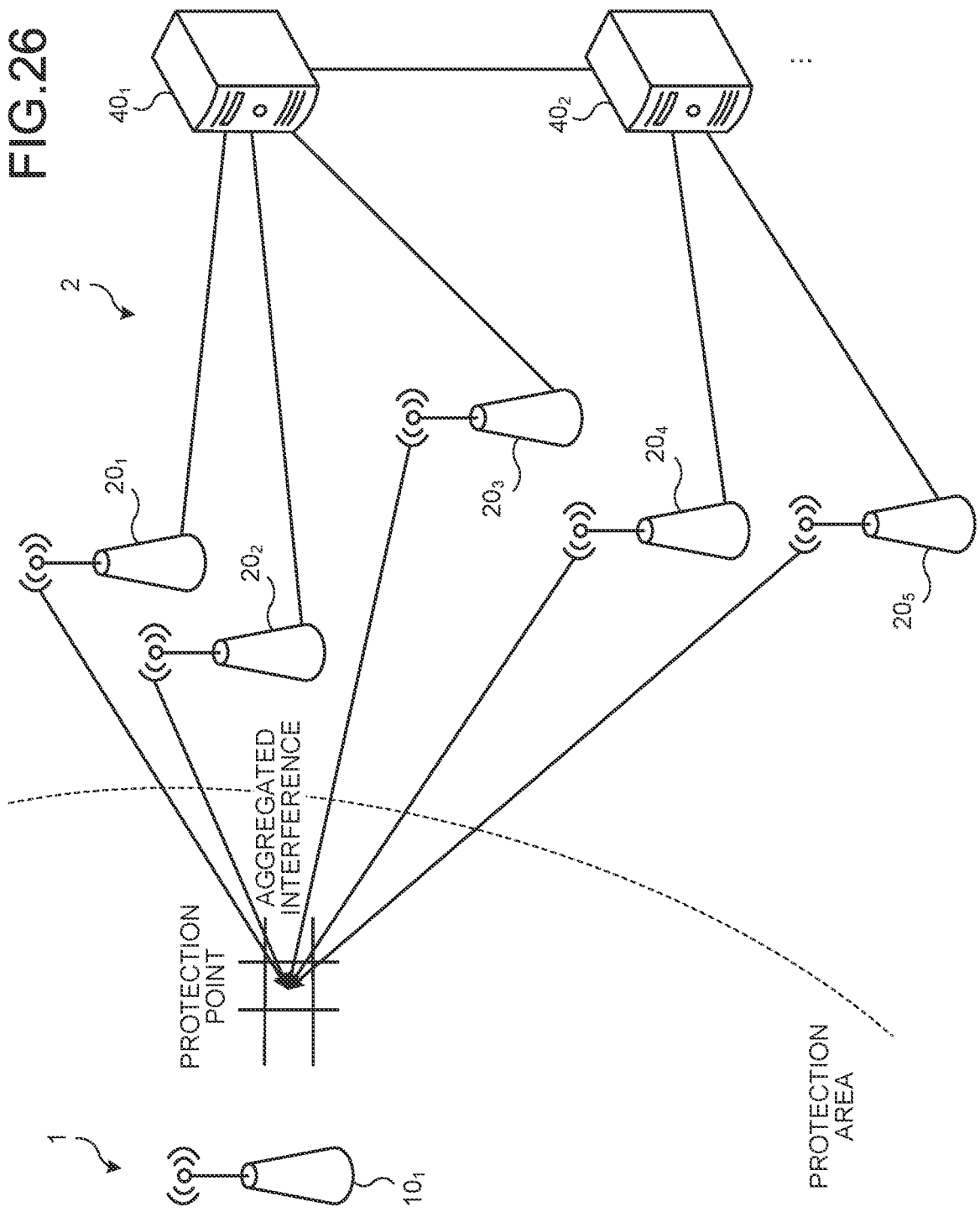

FIG.28

| TARGET OF CHANGE/UPDATE | | WHEN CALCULATION RESULT IS ABNORMAL | WHEN NORMAL CALCULATION RESULT IS OBTAINED PREDETERMINED NUMBER OF TIME OR IS CONTINUOUSLY OBTAINED FOR PREDETERMINED PERIOD OF TIME | WHEN TIME TAKEN FOR SHARING OF CALCULATION RESULT AND SHARING OF ANALYSIS RESULT IS SHORT |
|---|---|---|---|---|
| ANTENNA GAIN $G_p$ | | INCREASE | MAINTAIN (OR DECREASE) | MAINTAIN |
| ANTENNA GAIN $G_c$ | | INCREASE | MAINTAIN (OR DECREASE) | MAINTAIN |
| ADJACENT CHANNEL SELECTIVITY $A_{ACS,f_p,f_c}$ | | DECREASE | MAINTAIN (OR INCREASE) | MAINTAIN |
| ADJACENT CHANNEL LEAKAGE RATIO $A_{ACLR,f_p,f_c}$ | | INCREASE | MAINTAIN (OR DECREASE) | MAINTAIN |
| RADIO WAVE PROPAGATION ATTENUATION $L_{p,c,f_c}$ | MODEL | CHANGE MODEL SO THAT ATTENUATION AMOUNT DECREASES | MAINTAIN (OR CHANGE MODEL SO THAT ATTENUATION AMOUNT INCREASES) | MAINTAIN |
| | PARAMETER IN MODEL | CHANGE VALUE SO THAT ATTENUATION AMOUNT DECREASES | MAINTAIN (OR CHANGE VALUE SO THAT ATTENUATION AMOUNT INCREASES) | MAINTAIN |
| MARGIN $M_c$ | | DECREASE | MAINTAIN (OR INCREASE) | INCREASE |

FIG.37

| PRESENT EMBODIMENT | IEEE802.11af | CBRS (FCC Title 47 Part 96) |
|---|---|---|
| COMMUNICATION PARAMETER CALCULATION SERVER | "Geolocation Database (GDB)" | "Spectrum Access System (SAS)" |
| COMMUNICATION DEVICE | "White Space Device (WSD)", "GDC (Geolocation Database Control) enabling STA" and/or "GDC dependent STA" | "CBSD (CBRS Device)", "EUD (End User Device)", "eNodeB", "gNodeB", and/or "UE (User Equipment)" |

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2019/036190 filed on Sep. 13, 2019, which claims priority benefit of Japanese Patent Application No. JP 2018-185111 filed in the Japan Patent Office on Sep. 28, 2018. Each of the above-referenced applications is hereby incorporated herein by reference in its entirety.

FIELD

The present disclosure relates to an information processing device and an information processing method.

BACKGROUND

The problem of depletion of radio resources (wireless resources) that can be allocated to a wireless system (wireless device) has surfaced. Since all radio bands are already used by incumbent wireless systems (wireless devices), it is difficult to newly allocate radio resources to a wireless system. Therefore, in recent years, more effective use of radio resources by utilizing cognitive radio technology has begun to attract attention. In cognitive radio technology, radio resources are secured by using temporal and spatial unused radio waves (white space) of incumbent wireless systems.

CITATION LIST

Patent Literature

Patent Literature 1: JP 5884835 B2
Patent Literature 2: JP 2013-520079 A

SUMMARY

Technical Problem

However, it is not always possible to effectively use radio resources simply by using unused radio waves. For example, in order to realize effective use of radio resources, efficient operation of a wireless system (wireless device) is required, such as quickly stopping the system when a problem occurs, solving the problem, and restarting the system. However, since there are various wireless systems, it is not easy to operate the systems efficiently.

In this regard, the present disclosure proposes an information processing device and an information processing method capable of realizing efficient use of radio resources.

Solution to Problem

To solve the above problems, an information processing device according to the present disclosure includes: an acquisition unit that acquires information on a second wireless system that performs wireless communication by using radio waves in a frequency band used by a first wireless system; a determination unit that determines a communication parameter of the second wireless system on the basis of the information on the second wireless system that is acquired by the acquisition unit; and a notification unit that notifies another information processing device of the communication parameter determined by the determination unit.

BRIEF DESCRIPTION OF DRAWINGS

FIG. 15 is an example of a list of servers provided by the regulatory management database.

FIG. 21 is a sequence diagram illustrating an example of a new participation procedure when sharing/recording a calculation result in a distributed manner.

FIG. 22 is an example of a list of servers provided by the regulatory management database.

FIG. 23 is a sequence diagram illustrating an example of a new participation procedure when centrally recording/managing a calculation result.

FIG. 24B is an example of a flowchart for a newly participating communication parameter calculation server to select a request destination for acquiring a calculation result record.

FIG. 24C is an example of a flowchart for a newly participating communication parameter calculation server to select a request destination for acquiring a calculation result record.

FIG. 24D is an example of a flowchart for a newly participating communication parameter calculation server to select a request destination for acquiring a calculation result record.

FIG. 25 is a sequence diagram illustrating an example of a procedure for analyzing a past calculation result, the procedure being triggered by an event.

FIG. 26 is an explanatory diagram illustrating an example of an interference model assumed in the present embodiment.

FIG. 28 is a diagram illustrating an example of norms for changing/updating various parameters or models when a calculation result is abnormal.

FIG. 37 is a diagram illustrating names of communication parameter calculation servers and communication devices in IEEE 802.11af and the CBRS.

DESCRIPTION OF EMBODIMENTS

Figure 1:
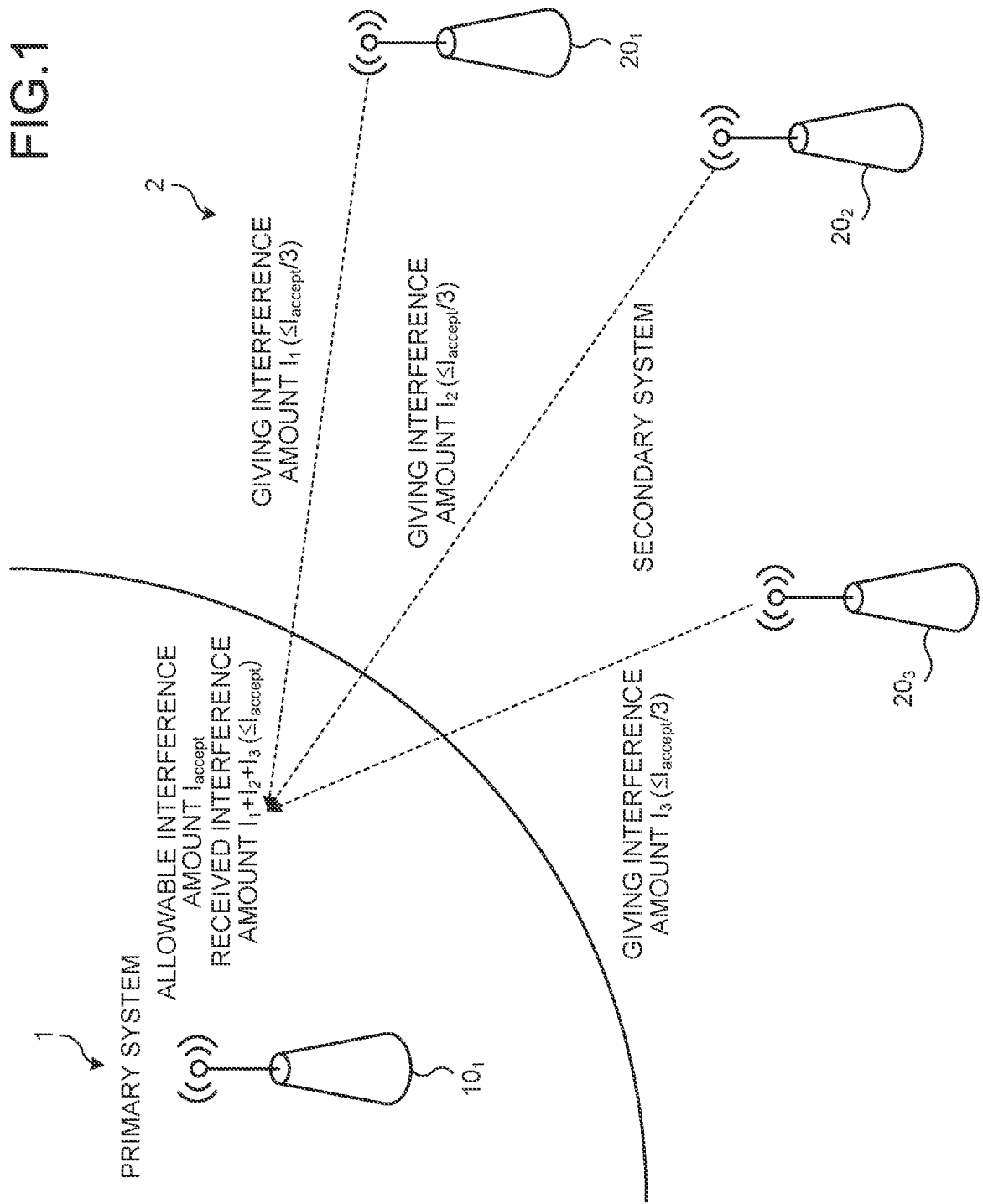
FIG. 1 is an explanatory diagram illustrating an example of distributing an interference margin to each communication device included in a secondary system.

Hereinafter, embodiments of the present disclosure will be described in detail with reference to the drawings. Note that in each of the following embodiments, the same reference signs denote the same portions, and an overlapping description will be omitted.

Further, in the present specification and the drawings, a plurality of components having substantially the same functional configuration may be distinguished by adding different numbers or alphabets after the same reference signs. For example, a plurality of configurations having substantially the same functional configuration are distinguished as necessary, such as communication parameter calculation servers $40_1$ and $40_2$. Alternatively, for example, a plurality of configurations having substantially the same functional configuration are distinguished as necessary, such as communication systems 2a, 2b, and 2c. However, in a case where it is not particularly necessary to distinguish each of the plurality of components having substantially the same functional configuration, only the same reference sign is given. For example, in a case where it is not necessary to distinguish between the communication parameter calculation servers $40_1$ and $40_2$, they are simply referred to as the communication parameter calculation server 40. Alternatively, in a case where it is not necessary to distinguish between the communication systems 2a, 2b, and 2c, they are simply referred to as the communication system 2.

Further, the present disclosure will be described in the following order.
1. Introduction
2. System Model of Present Embodiment
2-1. Overall Configuration
2-2. Configuration of Communication Device
2-3. Configuration of Terminal Device
2-4. Configuration of Communication Parameter Calculation Server
2-5. Configuration of Calculation Result Record Database
2-6. Configuration of Regulatory Management Database
3. Procedure for Sharing Calculation Result Between Servers
3-1. When Sharing Calculation Result for Each Calculation
3-2. When Sharing Calculation Result Every N Times of Calculation
3-3. Processing Flow When Record Database Function Is Decentralized
3-4. When Record Database Function Is Centralized
3-5. Processing Flow When Record Database Function Is Centralized
3-6. Data Format
3-7. New System Participation Procedure for Communication Parameter Calculation Server
3-8. Processing Flow for Newly Participating Server to Acquire Calculation Result Record
4. Procedure for Referring to and Analyzing Past Calculation Result When Event Occurs
4-1. Example of Procedure
4-2. Interference Model
4-3. Change/Update of Parameter or Model
4-4. Change/Update of Frequency of Communication Parameter Calculation
4-5. Stopping Specific Communication Parameter Calculation Server
5. Modified Example
5-1. Modified Example Related to System Configuration
5-2. Communication Parameter Calculation Server
5-3. Example of Correspondence Between Device of Present Embodiment and Standards/Regulations
5-4. Giving Incentive
5-5. Other Modified Examples
6. Conclusion

1. Introduction

In recent years, the problem of depletion of radio resources (for example, frequency) that can be allocated to a wireless system has surfaced. However, since all radio bands are already used by incumbent wireless systems, it is difficult to newly allocate radio resources. Therefore, in recent years, more effective use of radio resources by utilizing cognitive radio technology has begun to attract attention. For example, radio regulation in which radio resources (frequency channels) are shared by a plurality of communication systems while prioritizing them is spreading in each country.

In cognitive radio technology, radio resources are secured by using and utilizing (for example, dynamic spectrum access (DSA)) temporal/spatial unused radio waves (white space) of incumbent wireless systems. For example, in the United States, legislation/standardization of citizens broadband radio service (CBRS), which utilizes frequency sharing technology to aim to open, to the general public, a federal use band (3.55 to 3.70 GHz) overlapping frequency bands corresponding to global 3GPP bands 42 and 43, have been accelerated.

Note that the cognitive radio technology contributes not only to dynamic frequency sharing but also to improvement of frequency utilization efficiency of a wireless system. For example, ETSI EN 303 387 and IEEE 802.19.1-2014 stipulate technology for coexistence between wireless systems that use unused radio waves.

In order to realize frequency sharing, it is important that a communication control device (for example, a spectrum manager) controls communication of a secondary system so as not to give fatal interference to a primary system. The communication control device is a device that manages communication of the communication device or the like. For example, the communication control device is a device (system) for managing radio resources (for example, frequency), such as a geo-location database (GLDB), a spectrum access system (SAS), or a spectrum access system database (SASDB). In the present embodiment, the communication control device corresponds to the communication parameter calculation server 40 (for example, communication parameter calculation servers $40_1$, $40_2$, and $40_3$ illustrated in FIG. 4) as described later. The communication parameter calculation server 40 will be described in detail later.

Here, the primary system is, for example, a system (for example, an incumbent system) that has a higher priority in using radio waves in a predetermined frequency band than other systems such as the secondary system. Further, the secondary system is, for example, a system that secondarily uses (for example, dynamic frequency sharing) radio waves in a frequency band used by the primary system. The primary system and the secondary system may each include a plurality of communication devices, or may include one communication device. The communication control device distributes an interference allowance to one or more communication devices included in the secondary system so that aggregated interference of the one or more communication devices with respect to the primary system does not exceed the interference allowance (also referred to as an interference margin) of the primary system. At this time, the interference allowance may be an interference amount predetermined by an operator of the primary system, a public organization that manages radio waves, or the like. In the following description, the term "interference margin" refers to the interference allowance. Further, the aggregated interference may be referred to as aggregated interfering power.

FIG. 1 is an explanatory diagram illustrating an example of distributing the interference margin to each communication device included in the secondary system. In the example of FIG. 1, a communication system 1 is the primary system, and a communication system 2 is the secondary system. The communication system 1 includes a communication device $10_1$ and the like. Further, the communication system 2 includes communication devices $20_1$, $20_2$, and $20_3$ and the like. Note that, in the example of FIG. 1, the communication system 1 includes only one communication device 10, but the communication system 1 may include a plurality of communication devices 10. Further, in the example of FIG. 1, the communication system 2 includes three communication devices 20, but the number of communication devices 20 included in the communication system 2 may be less than or more than three. Note that, in the example of FIG. 1, only one primary system (the communication system 1 in the example of FIG. 1) and one secondary system (the communication system 2 in the example of FIG. 1) are illustrated, but the number of primary systems and the number of secondary systems may each be plural.

The communication device $10_1$ and the communication devices $20_1$, $20_2$, and $20_3$ can each transmit and receive radio waves. An interference amount allowed by the communication device $10_1$ is $I_{accept}$. Further, interference amounts given by the communication devices $20_1$, $20_2$, and $20_3$ to a predetermined protection point of the communication system 1 (primary system) are giving interference amounts $I_1$, $I_2$, and $I_3$, respectively. Here, the protection point is a reference interference calculation point for protection of the communication system 1.

The communication control device distributes the interference margin $I_{accept}$ to a plurality of communication devices 20 so that aggregated interference (received interference amount $I_1+I_2+I_3$ illustrated in FIG. 1) with respect to the predetermined protection point of the communication system 1 does not exceed the interference margin $I_{accept}$. For example, the communication control device distributes the interference margin $I_{accept}$ to each communication device 20 so that the giving interference amounts $I_1$, $I_2$, and $I_3$ each become $I_{accept}/3$. Alternatively, the communication control device distributes the interference margin $I_{accept}$ to each communication device 20 so that the giving interference amounts $I_1$, $I_2$, and $I_3$ each become smaller than $I_{accept}/3$. It is a matter of course that a method of distributing the interference margin is not limited to this example.

The communication control device calculates maximum transmission power (hereinafter, referred to as allowable maximum transmission power) allowed for each communication device 20 on the basis of the interference amount that is distributed (hereinafter, referred to as the distributed interference amount). For example, the communication control device calculates the allowable maximum transmission power of each communication device 20 by back-calculating from the distributed interference amount on the basis of a propagation loss, an antenna gain, and the like. Then, the communication control device notifies each communication device 20 of information on the calculated allowable maximum transmission power.

Note that, in the following description, information regarding communication of the communication device 20, such as the allowable maximum transmission power, may be referred to as a communication parameter. Examples of the communication parameter can include a frequency channel, a carrier frequency, a frequency bandwidth, (maximum) transmission power, and a modulation scheme (for example, waveform, spectrum mask, adjacent channel leakage ratio (ACLR), or modulation and coding scheme (MCS)).

Note that in an existing frequency sharing type communication control method (for example, a distributed frequency sharing management method in which a plurality of communication control devices manage different communication devices, respectively), a result of calculation of a communication parameter in a communication control device is not immediately shared with another server device. Therefore, in a case where a plurality of communication control devices are operated, each of the plurality of communication control devices cannot know (or verify) a calculation result of another communication control device. Therefore, in a case where the calculation result is incorrect or an inappropriate calculation result is obtained, it is difficult to take measures to correct or resolve such an error. This results in serious interference between communication devices, and thus such a problem must be avoided from the viewpoint of effective use of frequency resources.

In the present embodiment, in a case where a plurality of communication systems share the same or partially overlapping frequency resource (spectrum sharing, frequency resource sharing, or secondary spectrum access), a result of communication parameter calculation performed by a database or server is shared between a plurality of databases or servers. As a result, the calculation result can be verified retroactively. In addition, as the result of calculation of a communication parameter can be verified retroactively, it is possible to operate a plurality of different communication systems in a stable manner, and to increase the possibility of improving the characteristics. As a result, even when a problem occurs, the problem can be easily corrected or resolved, such that wireless resources can be used efficiently.

Note that the primary system (communication system 1) and the secondary system (communication system 2) may be in a frequency sharing environment. For example, Patent Literature 1 discloses a method in which a server device (database, GLDB, SASDB, or the like) calculates a communication parameter to be used by each system or device, and notifies a target system or target device of the calculated communication parameter in a communication method in which a plurality of communication systems and communication devices share the same or overlapping frequency resource (a frequency channel, a frequency band, a carrier component, and the like) according to priority. Examples of the frequency sharing type communication method can include TV white spaces (TVWS) of Europe, in which a frequency resource for TV broadcasting is shared with another communication system (for example, another communication system with a low priority), and the CBRS of the United States, in which a frequency resource for satellite/military applications is shared with another communication system (for example, another communication system with a low priority).

Figure 2:
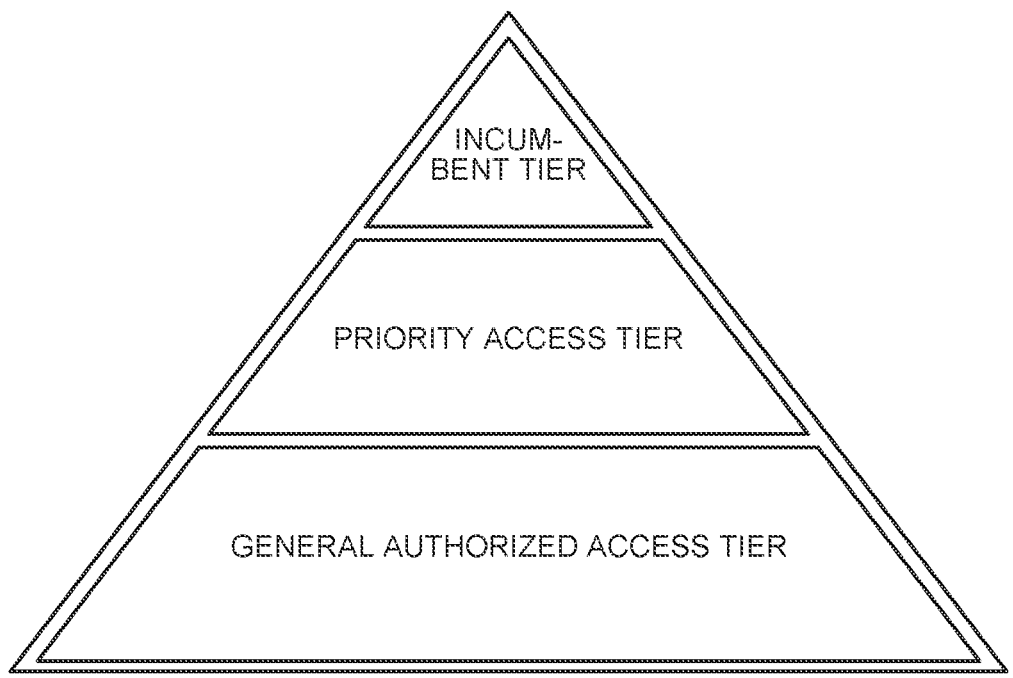
FIG. 2 is an explanatory diagram illustrating a tiered structure in CBRS.

The CBRS, for which the U.S. Federal Communications Commission (FCC) established rules, will be described in detail as an example. FIG. 2 is an explanatory diagram illustrating a tiered structure in the CBRS. In the CBRS, a tiered structure including an incumbent tier, a priority access tier, and a general authorized access tier is defined. In this tiered structure, the priority access tier is positioned above the general authorized access tier, and the incumbent tier is positioned above the priority access tier. Taking the CBRS as an example, a system positioned in the incumbent tier (incumbent system) is the primary system, and a system positioned in the general authorized access tier and the priority access tier is the secondary system.

Figure 3:
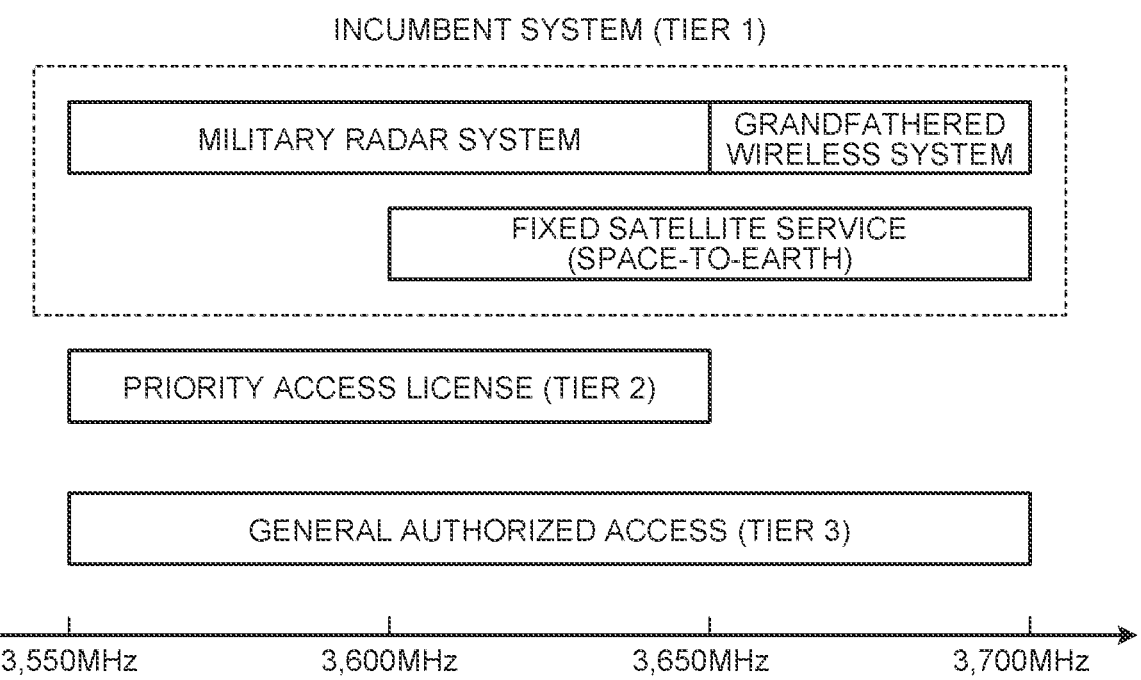
FIG. 3 is an explanatory diagram illustrating a band of the CBRS.

FIG. 3 is an explanatory diagram illustrating a band of the CBRS. Taking the above-described CBRS as an example, the primary system is a military radar system, a grandfathered wireless system, or a fixed satellite service (space-to-earth). Here, the military radar system is typically a carrier-based radar. Further, the secondary system is a wireless network system including a citizens broadband radio service device (CBSD), a base station that is called an end user device (EUD), and a terminal. Additional prioritization is made in the secondary system, and priority access license (PAL) that is licensed to use a shared bandwidth and general authorized access (GAA) that is equivalent to no license are defined. A tier 1 illustrated in FIG. 3 corresponds to the incumbent tier illustrated in FIG. 2. A tier 2 illustrated in FIG. 3 corresponds to the priority access tier illustrated in FIG. 3. A tier 3 illustrated in FIG. 3 corresponds to the general authorized access tier illustrated in FIG. 2.

Note that the primary system (communication system 1) of the present embodiment is not limited to the example illustrated in FIG. 3. The primary system (communication system 1) may be another type of wireless system. For example, another wireless system may be used as the primary system depending on a country/region/frequency band to which it is to be applied. For example, the primary system may be a television broadcasting system such as a digital video broadcasting-terrestrial (DVB-T) system. Further, the primary system may be a wireless system that is called a fixed system (FS). Further, frequency sharing in other frequency bands may be possible. For example, licensed shared access (LSA) and TV band white space (TVWS) are typical examples. Further, the primary system may be a cellular communication system such as long term evolution (LTE), new radio (NR), or the like. Further, the primary system may be an aeronautical radio system such as an aeronautical radio navigation service (ARNS) or the like. It is a matter of course that the primary system is not limited to the above-described wireless systems, and may be another type of wireless system.

Further, unused radio waves (white space) used by the communication system 2 are not limited to radio waves of the federal use band (3.55 to 3.70 GHz). The communication system 2 may use radio waves in a frequency band different from the federal use band (3.55 to 3.70 GHz) as the unused radio waves. For example, in a case where the primary system (communication system 1) is a television broadcasting system, the communication system 2 may be a system that uses the TV white space as the unused radio waves. Here, the TV white space refers to a frequency band that is not currently used by the television broadcasting system among frequency channels allocated to the television broadcasting system (primary system). At this time, the TV white space may be a channel that is not used depending on the region.

Further, a relationship between the communication system 1 and the communication system 2 is not limited to a frequency sharing relationship in which the communication system 1 is the primary system and the communication system 2 is the secondary system. The relationship between the communication system 1 and the communication system 2 may be a network coexistence relationship between the same or different wireless systems using the same frequency.

Note that the term "frequency" that appears in the following description may be replaced with another term. For example, the term "frequency" may be replaced with a term "resource", "resource block", "resource element", "channel", "component carrier", "carrier", or "subcarrier" or a term having a similar meaning thereto.

2. System Model of Present Embodiment

Hereinafter, a system model of an embodiment of the present disclosure will be described. The system model of the embodiment of the present disclosure includes the communication system 2. The communication system 2 is a wireless communication system that secondarily uses radio waves used by the communication system 1 (first wireless system) for wireless communication. For example, the communication system 2 is a wireless communication system that performs dynamic frequency sharing for unused radio waves of the communication system 1. The communication system 2 provides a wireless service to a user or a device owned by the user by using a predetermined radio access technology.

Here, the communication system 2 may be a cellular communication system such as wideband code division multiple access (W-CDMA), code division multiple access 2000 (cdma2000), LTE, or NR. In the following description, "LTE" includes LTE-Advanced (LTE-A), LTE-Advanced Pro (LTE-A Pro), and evolved universal terrestrial radio access (EUTRA). In addition, "NR" includes new radio access technology (NRAT) and Further EUTRA (FEUTRA). Note that the communication system 2 is not limited to the cellular communication system. For example, the communication system 2 may be another wireless communication system such as a wireless local area network (LAN) system, a television broadcasting system, an aeronautical radio system, or a space wireless communication system.

In the present embodiment, the communication system 1 is the primary system (first wireless system), and the communication system 2 is the secondary system (second wireless system). As described above, the number of communication systems 1 and the number of communication systems 2 may each be plural. Note that although the communication system 1 includes one communication device (the communication device $10_1$ illustrated in FIG. 1) in the example of FIG. 1, the communication system 1 may include a plurality of communication devices 10. The configuration of the communication device 10 may be the same as a configuration of the communication device 20 or terminal device 30 as described later. The communication device 10 can be regarded as the first wireless system, and the communication device 20 or the terminal device 30 can be regarded as the second wireless system.

2-1. Overall Configuration

As described above, the radio regulation in which radio resources (frequency channels) are shared by a plurality of communication systems while prioritizing them is spreading in each country. Examples thereof include the TV white spaces of the United Kingdom, the United States, and the like, SAS of the United States, the CBRS, and the like.

As for priority, for example, two categories of a low-priority communication system and a high-priority communication system, or three or more categories classified according to priority may be defined. Under such prioritization, the low-priority communication system must operate a communication service for the high-priority communication system so as to observe a specific condition. Examples of the specific condition can include not giving fatal interference/noise from the low-priority communication system to the high-priority communication system, and selecting the region, space, time, and frequency band of the low-priority communication system so as not to overlap at least one of the region, space, time, or frequency band in which the high-priority communication system is operated.

As a means for satisfying such a condition, in the present embodiment, a predetermined communication parameter calculation server (or communication parameter calculation database) or the like calculates, controls, limits, and sets a communication parameter that can be used by the low-priority communication system. Examples of such a server can include a GLDB, an SAS database, and the like.

Figure 4:
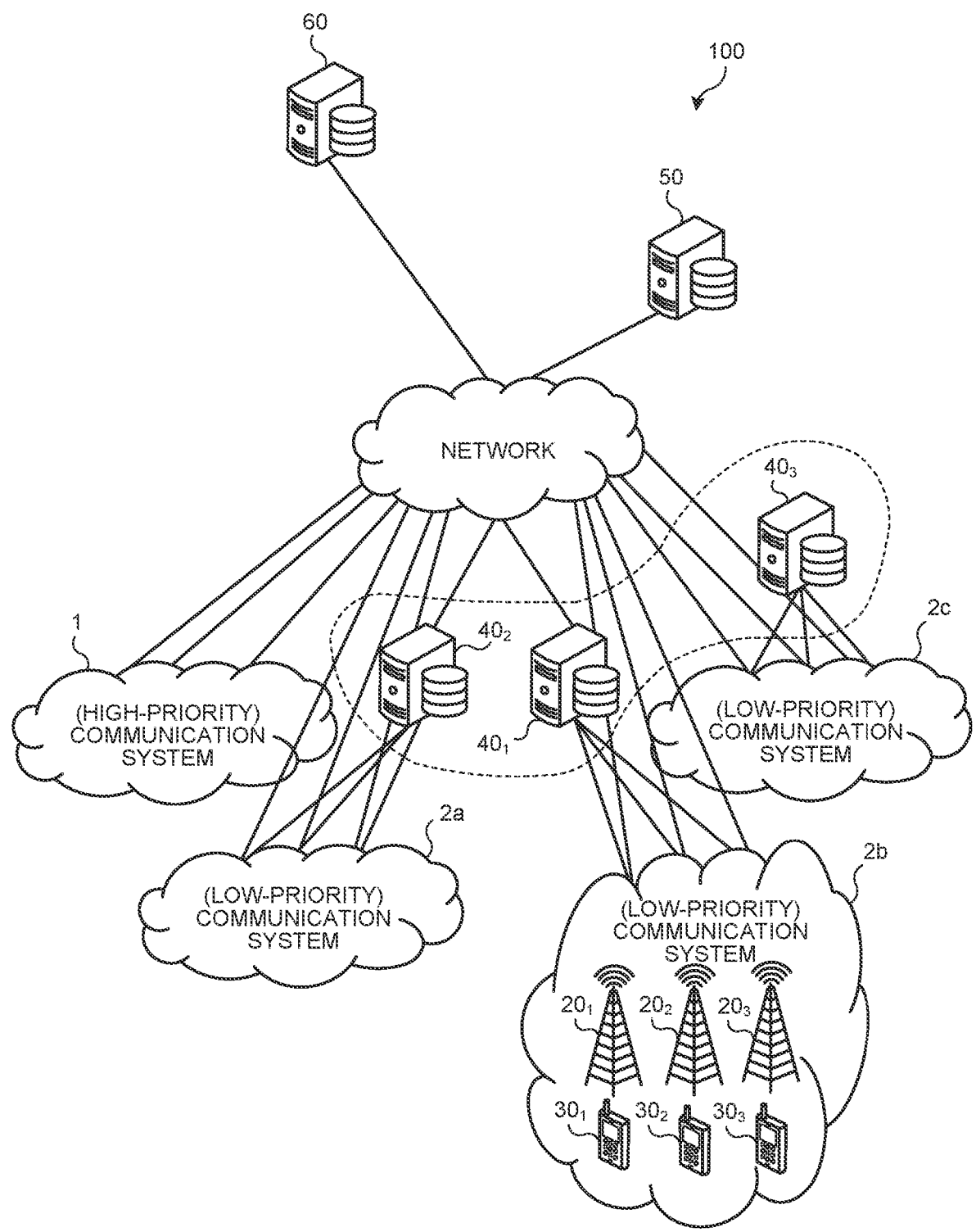
FIG. 4 is a diagram illustrating an example of a configuration of a communication system according to an embodiment of the present disclosure.

FIG. 4 is a diagram illustrating a system model 100 according to the present embodiment. The system model 100 includes one or more communication systems including a low-priority communication system and a high-priority communication system. In the example of FIG. 4, the system model 100 includes the communication system 1 and the communication systems 2 (communication systems 2a, 2b, and 2c). The communication system 1 is a high-priority communication system (primary system), and the communication system 2 is a low-priority communication system (secondary system). In addition, the system model 100 includes a communication parameter calculation server 40, a calculation result record database 50, and a regulatory management database 60.

Here, as a unit of a communication system, a mass operated by a certain operator (for example, an operator (communication business operator, mobile network operator (MNO), or mobile virtual network operator (MVNO)), a neutral host network (NHN) operator, a company, a school, or a building/house) can be considered as one communication system. In the following description, in a case where it is not necessary to distinguish between the communication systems 1 and 2, they are simply referred to as the communication system.

The communication system provides a wireless service to a user or a device owned by the user by operating respective wireless communication devices included in the communication system in cooperation with each other. The wireless communication device is a device having a wireless communication function, and in the example of FIG. 4, the communication device 20 and the terminal device 30 correspond to the wireless communication devices. Note that the communication parameter calculation server 40 may be regarded as a part of the communication system. Further, the communication parameter calculation server 40 may have a wireless communication function. In this case, the communication parameter calculation server 40 can also be regarded as the wireless communication device. In the following description, the wireless communication device may be simply referred to as a communication device.

Note that, in the following description, the communication device (wireless communication device) may be referred to as a wireless system. For example, the communication device 10 and the communication devices $20_1$ to $20_5$ are each one wireless system. Further, each of terminal devices $30_1$ to $30_3$ is one wireless system. Note that the wireless system may be one system including a plurality of wireless communication devices. For example, a system including one or more communication devices 20 and one or more terminal devices 30 subordinate to the communication device 20 may be regarded as one wireless system. Further, it is also possible to regard each of the communication system 1 and the communication system 2 as one wireless system. In the following description, a communication system including a plurality of wireless communication devices may be referred to as a wireless communication system or simply referred to as a communication system.

The communication system includes one or more communication devices. Examples of the communication device include a base station (node B, eNB, gNB, or the like), an access point, a terminal station (user equipment, user terminal, user station, mobile terminal, mobile station, or the like), a vehicle (vehicle terminal, vehicle station, or the like), a drone, a satellite station (low earth orbit (LEO), medium earth orbit (MEO), geostationary earth orbit (GEO), or the like), a satellite control station (satellite earth station, or the like), and a citizen broadband radio service device (CBSD). In the example of FIG. 4, the communication system 2*b* includes the communication devices 20 (communication devices 20$_1$, 20$_2$, and 20$_3$) and the terminal devices 30 (terminal devices 30$_1$, 30$_2$, and 30$_3$). The terminal device 30 can also be regarded as a kind of communication device.

Note that examples of a communication scheme used by the communication system include 2G (GSM (registered trademark), PDC, PHS, or the like), 3G (UMTS, WCDMA (registered trademark), CDMA2000, or the like), 4G (LTE, LTE-Advanced, LTE-Advanced-Pro, WiMAX (registered trademark), Mobile WiMAX (registered trademark), Multe-Fire, XGP, AXGP, sXGP, or the like), 5G (NR or the like), wireless LAN (for example, Wi-Fi (registered trademark)), and low power wide area (LPWA). Examples of a modulation scheme (or Waveform) include FDMA, TDMA, CDMA, OFDMA, SC-FDMA, and space division multiple access (SDMA).

At least some communication devices (for example, base stations or access points) of the low-priority communication system (or a communication system other than a high-priority communication system with the highest priority) have a function of connection to one or more communication parameter calculation servers. The connection may be wired connection or wireless connection, but it is desirable that the connection is wired connection from the viewpoint of control stability. The communication device connected to the communication parameter calculation servers sets a value of a communication parameter used by the communication device itself according to a calculation result (for example, the calculated value of the communication parameter or an intermediate parameter required for final calculation in the communication device) transferred from the servers. Further, the communication device may have a function of notifying another target communication device of a value of a communication parameter used by the another communication device (for example, a terminal station, a vehicle, or a drone) and causing the another communication device to set the value. The communication device of the high-priority communication system, particularly, the high-priority communication system with the highest priority, does not have to have a function of connection to the communication parameter calculation server. For example, a digital TV in the TVWS or an incumbent system in the CBRS may be used as the high-priority communication system with the highest priority, and does not have to have the function of connection to the communication parameter calculation server 40.

The communication device 20 (second wireless system) is a wireless communication device that performs wireless communication with the terminal device 30 or another communication device 20. For example, the communication device 20 is a base station (also referred to as a base station device) of a wireless communication system. The radio access technology used by the communication device 20 may be cellular communication technology or wireless LAN technology. It is a matter of course that the radio access technology used by the communication device 20 is not limited thereto, and may be another radio access technology.

The size of the coverage of the communication device 20 may be large like a macrocell or may be small like a picocell. It is a matter of course that the size of the coverage of the communication device 20 may be extremely small like a femtocell. Further, in a case where the communication device 20 is able to perform beamforming, a cell or a service area may be formed for each beam.

The communication device 20 may be installed/operated by one business operator, or may be installed/operated by one individual. It is a matter of course that the entity who installs/operates the communication device 20 is not limited thereto. For example, the communication device 20 may be jointly installed/operated by a plurality of business operators or a plurality of individuals. Further, the communication device 20 may be a shared facility used by a plurality of business operators or a plurality of individuals. In this case, the installation/operation of the facility may be carried out by a third party different from the user.

Note that the concept of the base station includes an access point or a wireless relay station (also referred to as a relay device). Further, the concept of the base station includes not only a structure having a function of the base station, but also a device installed in the structure. The structure is, for example, a building such as an office building, a house, a steel tower, a station facility, an airport facility, a port facility, or a stadium. Note that the concept of the structure includes not only a building, but also a non-building structure such as a tunnel, a bridge, a dam, a fence, or a steel column, or a facility such as a crane, a gate, or a windmill. In addition, the concept of the structure includes not only a structure on the ground (land) or in the ground, but also a structure on the water, such as a landing stage or Mega-Float, or a structure underwater such as an oceanographical observation facility.

Further, the base station may be a base station (mobile station) configured to be movable. Here, the base station (mobile station) may be a wireless communication device installed on a mobile body, or may be the mobile body itself. The mobile body may be a mobile body (for example, a vehicle such as an automobile, a bus, a truck, a train, or a linear motor car) that moves on the ground (land), or may be a mobile body (for example, subway) that moves in the ground (for example, in a tunnel). It is a matter of course that the mobile body may be a mobile terminal such as a smartphone. Further, the mobile body may be a mobile body (for example, a vessel such as a passenger ship, a cargo ship, or a hovercraft) that moves on the water, or may be a mobile body (for example, a submersible boat such as a submersible, a submarine, or an unmanned underwater vehicle) that moves underwater. Further, the mobile body may be a mobile body (for example, an aircraft such as an airplane, an airship, or a drone) that moves in the atmosphere, or may be a space mobile body (for example, an artificial celestial body such as a satellite, a spaceship, a space station, a space probe) that moves outside the atmosphere.

The terminal device 30 is communication equipment having a communication function. The terminal device 30 is a user terminal such as a mobile phone, a smart device (smartphone or tablet PC), a wearable terminal, a personal digital assistant (PDA), or a personal computer. Further, the terminal device 30 may be a device other than the user terminal, such as a machine in a factory or a sensor installed in a building. For example, the terminal device 30 may be a machine to machine (M2M) device or an Internet of Things (IoT) device. Further, the terminal device 30 may be a device having a relay communication function, as typified by device to device (D2D). Further, the terminal device 30 may be a device that is called client premises equipment (CPE) used in a wireless backhaul or the like. Further, the terminal device 30 may be a wireless communication device installed on the mobile body, or may be the mobile body itself.

The communication parameter calculation server 40 has a function of calculating a communication parameter to be used by a communication device of a communication system (particularly, at least some of communication systems other than the high-priority communication system with the highest priority). In the present embodiment, for performing this calculation or for processing after performing this calculation, the communication parameter calculation server 40 has a function of exchanging information with the regulatory management database 60, the communication device 20, and another communication parameter calculation server 40. In the exchange with the regulatory management database 60, reception of information necessary for communication parameter calculation is mainly performed.

The communication parameter calculation server 40 calculates, on the basis of, for example, information received from the regulatory management database 60, a communication parameter (for example, an available frequency channel, (the upper limit of) allowable transmission power, or a modulation scheme) used by a communication device 20 of a target communication system 2. In the exchange with the communication device 20, reception of information necessary for communication parameter calculation (for example, location information of a target communication device 20, compatible transmission power, a modulation scheme, or a communication scheme) and transferring of a value of a communication parameter that can be used by the communication device 20 are mainly performed. In the exchange with the communication parameter calculation server 40, sharing of a calculation result thereof with another communication parameter calculation server 40 and reception of a calculation result from another server are mainly performed. Since the sharing of the calculation result is the main part of the present embodiment, it will be described in detail later. The exchanged calculation results are recorded in the server retroactively up to predetermined past results and stored so that they can be referred to.

Note that a plurality of communication parameter calculation servers 40 may exist in one communication system 2. In this case, the communication parameter calculation servers 40 exchange information of the communication device 20 managed with each other, and perform necessary frequency allocation or interference control calculation. Basically, a target to be controlled by the communication parameter calculation server 40 is the communication device 20, but the communication parameter calculation server 40 may also control the terminal device 30 subordinate to the communication device 20.

The main function of the regulatory management database 60 is to provide, to the communication parameter calculation server 40, information necessary for communication parameter calculation. For example, the regulatory management database 60 provides information regarding an operational parameter of the high-priority communication system with the highest priority. The regulatory management database 60 may be provided by, for example, a national or local administrative agency to which the subordinate communication systems 1 and 2, the communication devices 10 and 20, and the communication parameter calculation server 40 provide a communication service and a communication parameter calculation service. The regulatory management database 60 does not have to necessarily exist. For example, in a case where information required for calculating a communication parameter is specified by the radio regulation or the like, the information may be preset in the communication parameter calculation server 40.

In addition, there may be a plurality of regulatory management databases 60. As an example, it is effective in making the database redundant to prevent the database from becoming the operational bottleneck (single point of failure) or to balance the load of the database. In this case, it is desirable that each of the plurality of databases has a function of providing the same content of information. Further, it is desirable that the communication parameter calculation server is connected to at least one of the plurality of databases.

Note that the system model 100 may include the calculation result record database 50. In this case, the calculation result record database 50 records a calculation result of one or more communication parameter calculation servers 40. Note that the function of the calculation result record database 50 may be provided as one function of the communication parameter calculation server 40.

Hereinafter, a configuration of each device included in the system model 100 will be described in detail.

2-2. Configuration of Communication Device

Figure 5:
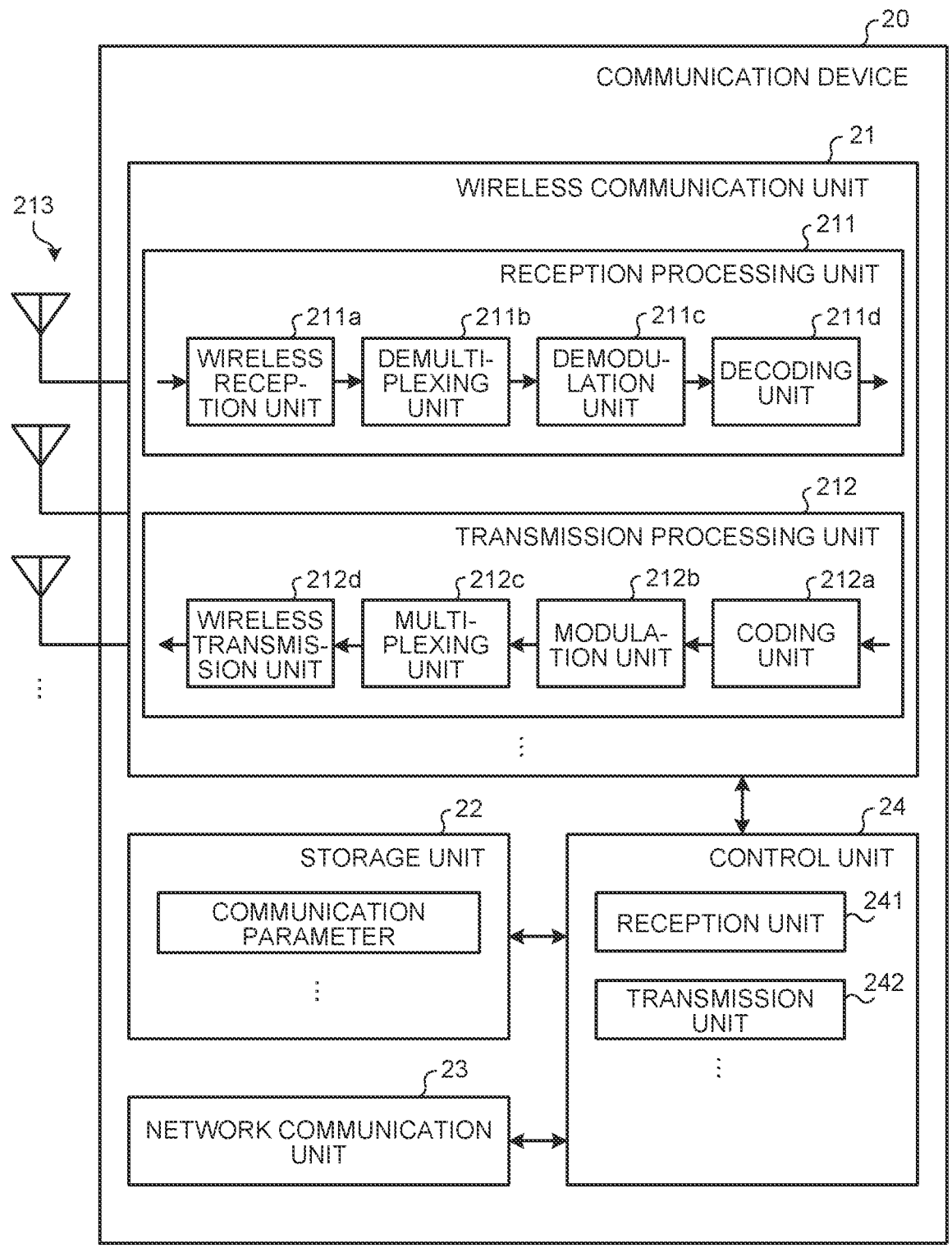
FIG. 5 is a diagram illustrating an example of a configuration of a communication device according to an embodiment of the present disclosure.

First, the configuration of the communication device 20 will be described. FIG. 5 is a diagram illustrating an example of the configuration of the communication device 20 according to an embodiment of the present disclosure. The communication device 20 is a wireless communication device (wireless system) that performs wireless communication with the terminal device 30 under the control of the communication parameter calculation server 40. For example, the communication device 20 is a base station device (ground station device) located on the ground. At this time, the communication device 20 may be a base station device arranged in a structure on the ground, or may be a base station device installed in a mobile body moving on the ground. More specifically, the communication device 20 may be an antenna installed in a structure such as a building and a signal processing device connected to the antenna. It is a matter of course that the communication device 20 may be a structure or a mobile body itself. The phrase "on the ground" not only means on the ground (land), but also means in the ground, on the water, and underwater in a broad sense.

Note that the communication device 20 is not limited to the ground station device. For example, the communication device 20 may be a base station device (non-ground station device) that moves or floats in the air or in space. At this time, the communication device 20 may be an aircraft station device or a satellite station device.

The aircraft station device may be a device mounted on an aircraft or the like, or may be the aircraft itself. The concept of the aircraft includes not only a heavy aircraft such as an airplane or a glider, but also a light aircraft such as a balloon or an airship. Further, the concept of the aircraft also includes a rotary-wing aircraft such as a helicopter or an autogyro. Note that the aircraft station device (or the aircraft on which the aircraft station device is mounted) may be a manned aircraft or an unmanned aircraft such as a drone.

The satellite station device may be a device mounted on a space mobile body such as an artificial satellite, or may be the space mobile body itself. A satellite that serves as the satellite station device may be any one of a low earth orbiting (LEO) satellite, a medium earth orbiting (MEO) satellite, a geostationary earth orbiting (GEO) satellite, or a highly elliptical orbiting (HEO) satellite. It is a matter of course that the satellite station device may be a device mounted on the LEO satellite, the MEO satellite, the GEO satellite, or the HEO satellite.

Further, the communication device 20 may be a relay station device. The relay station device is, for example, an aviation station or an earth station. The relay station device can be regarded as a kind of the above-described relay device. The aviation station is a radio station installed on the ground or on a mobile body moving on the ground to perform communication with the aircraft station device. Further, the earth station is a radio station located on the earth (including in the air) to perform communication with the satellite station device. The earth station may be a large earth station or a small earth station such as a very small aperture terminal (VSAT). Note that the earth station may be a VSAT control earth station (also referred to as a master station or a HUB station) or a VSAT earth station (also referred to as a slave station). Further, the earth station may be a radio station installed in a mobile body that moves on the ground. Examples of an earth station mounted on a vessel can include earth stations on board vessels (ESV). Further, the earth station may also include an aircraft earth station installed on an aircraft (including a helicopter) and performing communication with a satellite station. Further, the earth station may include an aeronautical earth station that is installed in a mobile body that moves on the ground and performs communication with an aircraft earth station via a satellite station. Note that the relay station device may be a portable mobile radio station that performs communication with a satellite station or an aircraft station.

The communication device 20 includes a wireless communication unit 21, a storage unit 22, a network communication unit 23, and a control unit 24. Note that the configuration illustrated in FIG. 5 is a functional configuration, and a hardware configuration may be different from this. Further, the functions of the communication device 20 may be distributed to and implemented in a plurality of physically separated devices.

The wireless communication unit 21 is a wireless communication interface that performs wireless communication with other communication devices (for example, the terminal device 30, the communication parameter calculation server 40, and another communication device 20). The wireless communication unit 21 is operated under the control of the control unit 24. The wireless communication unit 21 may support a plurality of radio access schemes. For example, the wireless communication unit 21 may support both NR and LTE. The wireless communication unit 21 may support another cellular communication scheme such as W-CDMA or cdma2000. Further, the wireless communication unit 21 may support a wireless LAN communication scheme in addition to the cellular communication scheme. It is a matter of course that the wireless communication unit 21 may only support one radio access scheme.

The wireless communication unit 21 includes a reception processing unit 211, a transmission processing unit 212, and an antenna 213. The wireless communication unit 21 may include a plurality of reception processing units 211, a plurality of transmission processing units 212, and a plurality of antennas 213. Note that, in a case where the wireless communication unit 21 supports a plurality of radio access schemes, each unit of the wireless communication unit 21 can be individually configured for each radio access scheme.

For example, in a case where the communication device 20 supports NR and LTE, the reception processing unit 211 and the transmission processing unit 212 may be individually configured for each of NR and LTE.

The reception processing unit 211 processes an uplink signal received via the antenna 213. The reception processing unit 211 includes a wireless reception unit 211a, a demultiplexing unit 211b, a demodulation unit 211c, and a decoding unit 211d.

The wireless reception unit 211a performs, on the uplink signal, down-conversion, removal of an unnecessary frequency component, a control of an amplification level, quadrature demodulation, conversion into a digital signal, removal of a guard interval, extraction of a frequency domain signal by fast Fourier transform, and the like. For example, it is assumed that the radio access scheme of the communication device 20 is a cellular communication scheme such as LTE. At this time, the demultiplexing unit 211b separates an uplink channel such as a physical uplink shared channel (PUSCH) or physical uplink control channel (PUCCH) and an uplink reference signal from a signal output from the wireless reception unit 211a. The demodulation unit 211c performs demodulation of a received signal for a modulation symbol of the uplink channel by using a modulation scheme such as binary phase shift keying (BPSK) or quadrature phase shift keying (QPSK). The modulation scheme used by the demodulation unit 211c may be 16-quadrature amplitude modulation (QAM), 64-QAM, or 256-QAM. The decoding unit 211d performs decoding processing on a coded bit of the demodulated uplink channel. Decoded uplink data and uplink control information are output to the control unit 24.

The transmission processing unit 212 performs transmission processing of downlink control information and downlink data. The transmission processing unit 212 includes a coding unit 212a, a modulation unit 212b, a multiplexing unit 212c, and a wireless transmission unit 212d.

The coding unit 212a codes the downlink control information and the downlink data input from the control unit 24 by using a coding method such as block coding, convolutional coding, or turbo coding. The modulation unit 212b modulates the coded bit output from the coding unit 212a by a predetermined modulation scheme such as BPSK, QPSK, 16-QAM, 64-QAM, or 256-QAM. The multiplexing unit 212c multiplexes a modulation symbol of each channel and a downlink reference signal, and maps them to a predetermined resource element. The wireless transmission unit 212d performs various kinds of signal processing on a signal from the multiplexing unit 212c. For example, the wireless transmission unit 212d performs processing such as conversion into the time domain by fast Fourier transform, addition of a guard interval, generation of a baseband digital signal, conversion into an analog signal, quadrature modulation, up-conversion, removal of extra frequency components, or power amplification. A signal generated by the transmission processing unit 212 is transmitted from the antenna 213.

The storage unit 22 is a storage device, from which data can be read and in which data can be written, such as a DRAM, an SRAM, a flash memory, or a hard disk. The storage unit 22 functions as a storage means of the communication device 20. The storage unit 22 stores the communication parameter and the like.

Desired transmission power information is information on transmission power for which the communication device 20 requests the communication parameter calculation server 40 as information on transmission power necessary for transmitting radio waves.

The communication parameter is information (for example, setting information) regarding a radio wave transmission operation of the communication device 20. For example, the communication parameter is information on a maximum value (allowable maximum transmission power) of transmission power allowed for the communication device 20. It is a matter of course that the communication parameter is not limited to the information on the allowable maximum transmission power.

The network communication unit 23 is a communication interface for performing communication with another device. For example, the network communication unit 23 is a local area network (LAN) interface such as a network interface card (NIC). The network communication unit 23 may be a universal serial bus (USB) interface including a USB host controller, a USB port, and the like. Further, the network communication unit 23 may be a wired interface or a wireless interface. The network communication unit 23 functions as a network communication means of the communication device 20. The network communication unit 23 performs communication with another device under the control of the control unit 24.

The control unit 24 is a controller that controls each unit of the communication device 20. The control unit 24 is implemented by, for example, a processor such as a central processing unit (CPU) or a micro processing unit (MPU). For example, the control unit 24 is implemented in a manner in which the processor executes various programs stored in the storage device inside the communication device 20 by using a random access memory (RAM) or the like as a work area. Note that the control unit 24 may be implemented by an integrated circuit such as an application specific integrated circuit (ASIC) or a field programmable gate array (FPGA). The CPU, the MPU, the ASIC, and the FPGA can all be regarded as the controller.

Figure 6:
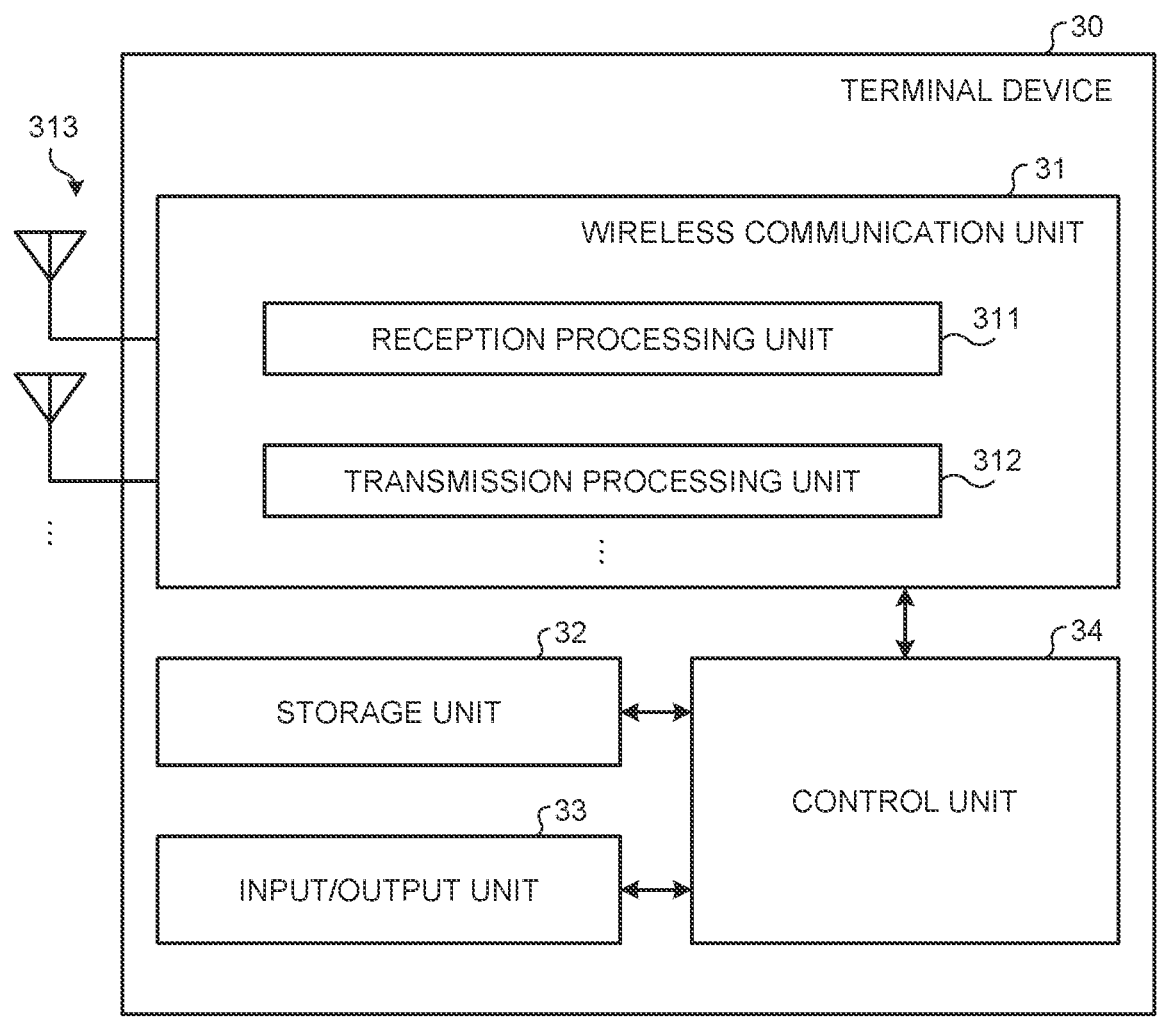
FIG. 6 is a diagram illustrating an example of a configuration of a terminal device according to an embodiment of the present disclosure.

As illustrated in FIG. 6, the control unit 24 includes a reception unit 241 and a transmission unit 242. The respective blocks (the reception unit 241, the transmission unit 242, and the like) included in the control unit 24 are functional blocks each indicating the function of the control unit 24. These functional blocks may be software blocks or hardware blocks. For example, each of the above-described functional blocks may be one software module implemented by software (including a microprogram) or may be one circuit block on a semiconductor chip (die). It is a matter of course that each functional block may be one processor or one integrated circuit. A method of configuring the functional block is arbitrary. Note that the control unit 24 may be configured with a functional unit different from the above-described functional block. The operation of each block (the reception unit 241, the transmission unit 242, or the like) included in the control unit 24 will be described in detail in the description of communication control processing and the like as described later.

2-3. Configuration of Terminal Device

Next, the configuration of the terminal device 30 will be described. FIG. 6 is a diagram illustrating an example of the configuration of the terminal device 30 according to an embodiment of the present disclosure. The terminal device 30 is a communication device that performs wireless communication with the communication device 20 and the communication parameter calculation server 40. Note that, in the present embodiment, the concept of the communication device (wireless communication device) includes not only a base station device, but also a terminal device. The communication device can be rephrased as a wireless system.

The terminal device 30 includes a wireless communication unit 31, a storage unit 32, an input/output unit 33, and a control unit 34. Note that the configuration illustrated in FIG. 6 is a functional configuration, and a hardware configuration may be different from this. Further, the functions of the terminal device 30 may be distributed to and implemented in a plurality of physically separated components.

The wireless communication unit 31 is a wireless communication interface that performs wireless communication with other communication devices (for example, the communication device 20 and another terminal device 30). The wireless communication unit 31 is operated under the control of the control unit 34. The wireless communication unit 31 supports one or more radio access schemes. For example, the wireless communication unit 31 supports both NR and LTE. The wireless communication unit 31 may support another radio access scheme such as W-CDMA or cdma2000.

The wireless communication unit 31 includes a reception processing unit 311, a transmission processing unit 312, and an antenna 313. The wireless communication unit 31 may include a plurality of reception processing units 311, a plurality of transmission processing units 312, and a plurality of antennas 313. Note that, in a case where the wireless communication unit 31 supports a plurality of radio access schemes, each unit of the wireless communication unit 31 can be individually configured for each radio access scheme. For example, the reception processing unit 311 and the transmission processing unit 312 may be individually configured for each of LTE and NR. The configurations of the reception processing unit 311 and the transmission processing unit 312 are the same as those of the reception processing unit 211 and the transmission processing unit 212 of the communication device 20.

The storage unit 32 is a storage device, from which data can be read and in which data can be written, such as a DRAM, an SRAM, a flash memory, or a hard disk. The storage unit 32 functions as a storage means of the terminal device 30.

The input/output unit 33 is a user interface for exchanging information with the user. For example, the input/output unit 33 is an operation device for the user to perform various operations, such as a keyboard, a mouse, an operation key, or a touch panel. Alternatively, the input/output unit 33 is a display device such as a liquid crystal display or an organic electroluminescence (EL) display. The input/output unit 33 may be an audio device such as a speaker or a buzzer. Further, the input/output unit 33 may be a lighting device such as a light emitting diode (LED) lamp. The input/output unit 33 functions as an input/output means (input means, output means, operation means, or notification means) of the terminal device 30.

The control unit 34 is a controller that controls each unit of the terminal device 30. The control unit 34 is implemented by, for example, a processor such as a CPU or MPU. For example, the control unit 34 is implemented in a manner in which the processor executes various programs stored in the storage device inside the terminal device 30 by using a RAM or the like as a work area. Note that the control unit 34 may be implemented by an integrated circuit such as an ASIC or FPGA. The CPU, the MPU, the ASIC, and the FPGA can all be regarded as the controller.

2-4. Configuration of Communication Parameter Calculation Server

The communication parameter calculation server 40 is an information processing device (communication parameter determination device) that controls wireless communication of the communication device 20. The communication parameter calculation server 40 may be a communication control device such as the SAS. The communication parameter calculation server 40 may control wireless communication of the terminal device 30 via the communication device 20 or directly. The communication parameter calculation server 40 is, for example, a network manager that integrally controls wireless devices in the network. For example, the communication parameter calculation server 40 is a regulatory management database/a spectrum manager/a coexistence manager. Further, the communication parameter calculation server 40 may be a database server such as a GLDB or an SASDB.

Note that in a case where the communication system 2 is a cellular communication system, the communication parameter calculation server 40 may be a device configuring a core network. A core network CN is, for example, evolved packet core (EPC) or 5G core network (5GC). In a case where the core network is the EPC, the communication parameter calculation server 40 may be, for example, a device having a function as a mobility management entity (MME). Further, in a case where the core network is the 5GC, the communication parameter calculation server 40 may be, for example, a device having a function as an access and mobility management function (AMF). Note that even in a case where the communication system 2 is a cellular communication system, the communication parameter calculation server 40 does not necessarily have to be a device configuring the core network. For example, the communication parameter calculation server 40 may be a device having a function as a radio network controller (RNC).

Note that the communication parameter calculation server 40 may have a function as a gateway. For example, in a case where the core network is the EPC, the communication parameter calculation server 40 may be a device having a function as a serving gateway (S-GW) or a packet data network gateway (P-GW). Further, in a case where the core network is the 5GC, the communication parameter calculation server 40 may be a device having a function as a user plane function (UPF). The communication parameter calculation server 40 does not necessarily have to be a device configuring the core network. For example, it is assumed that the core network is a core network of W-CDMA or cdma2000. At this time, the communication parameter calculation server 40 may be a device that functions as a radio network controller (RNC).

Further, the communication parameter calculation server 40 may be a system that controls a plurality of secondary systems. In this case, the communication system 2 can be regarded as a system including a plurality of secondary systems.

Figure 7:
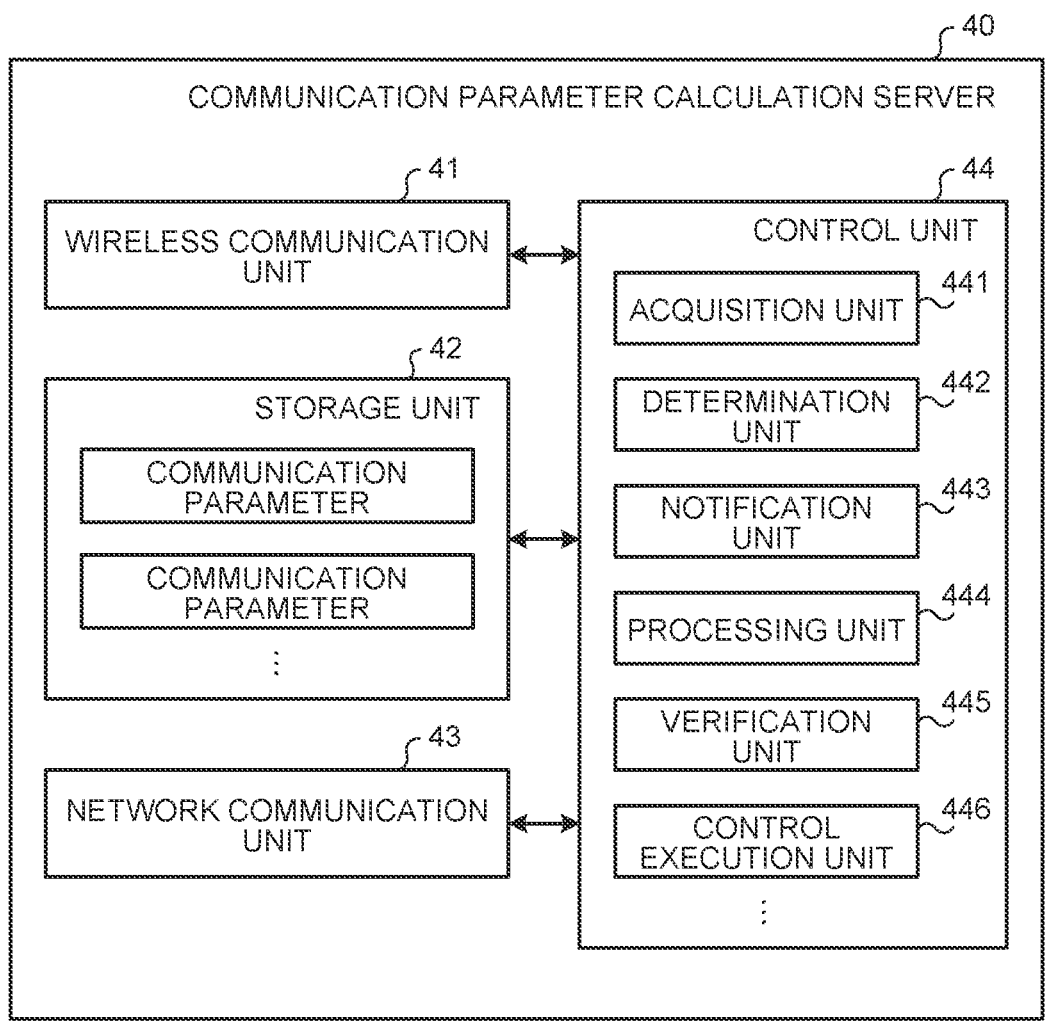
FIG. 7 is a diagram illustrating an example of a configuration of a communication parameter calculation server according to an embodiment of the present disclosure.

FIG. 7 is a diagram illustrating an example of a configuration of the communication parameter calculation server 40 according to an embodiment of the present disclosure. The communication parameter calculation server 40 includes a wireless communication unit 41, a storage unit 42, a network communication unit 43, and a control unit 44. Note that the configuration illustrated in FIG. 7 is a functional configuration, and a hardware configuration may be different from this. Further, the functions of the communication parameter calculation server 40 may be distributed to and implemented in a plurality of physically separated components. For example, the communication parameter calculation server 40 may include a plurality of servers.

The wireless communication unit 41 is a wireless communication interface that performs wireless communication with other communication devices (for example, the communication device 20, the terminal device 30, another communication parameter calculation server 40, the calculation result record database 50, and the regulatory management database 60). The wireless communication unit 41 is operated under the control of the control unit 44. The wireless communication unit 41 supports one or more radio access schemes. For example, the wireless communication unit 41 supports both NR and LTE. The wireless communication unit 41 may support another radio access scheme such as W-CDMA or cdma2000. The configuration of the wireless communication unit 41 is the same as that of the wireless communication unit 21 of the communication device 20.

The storage unit 42 is a storage device, from which data can be read and in which data can be written, such as a DRAM, an SRAM, a flash memory, or a hard disk. The storage unit 42 functions as a storage means of the calculation result record database 50. The storage unit 42 stores a communication parameter of each of the plurality of communication devices 20 included in the communication system 2. Note that the storage unit 42 may store possessed resource information of each of the plurality of communication devices 20 included in the communication system 2. As described above, the possessed resource information is information regarding possession of a wireless resource of the communication device 20.

The network communication unit 43 is a communication interface for performing communication with another device. The network communication unit 43 may be a network interface or may be a device connection interface. For example, the network communication unit 43 may be a local area network (LAN) interface such as a network interface card (NIC). Further, the network communication unit 43 may be a universal serial bus (USB) interface including a USB host controller, a USB port, and the like. Further, the network communication unit 43 may be a wired interface or a wireless interface. The network communication unit 43 functions as a communication means of the communication parameter calculation server 40. The network communication unit 43 performs communication with the communication device 20 and the terminal device 30 under the control of the control unit 44.

The control unit 44 is a controller that controls each unit of the communication parameter calculation server 40. The control unit 44 is implemented by, for example, a processor such as a CPU or MPU. For example, the control unit 44 is implemented in a manner in which the processor executes various programs stored in the storage device inside the communication parameter calculation server 40 by using a RAM or the like as a work area. Note that the control unit 44 may be implemented by an integrated circuit such as an ASIC or FPGA. The CPU, the MPU, the ASIC, and the FPGA can all be regarded as the controller.

As illustrated in FIG. 7, the control unit 44 includes an acquisition unit 441, a determination unit 442, a notification unit 443, a processing unit 444, a verification unit 445, and a control execution unit 446. The respective blocks (the acquisition unit 441, the control execution unit 446, and the like) included in the control unit 44 are functional blocks each indicating the function of the control unit 44. These functional blocks may be software blocks or hardware blocks. For example, each of the above-described functional blocks may be one software module implemented by software (including a microprogram) or may be one circuit block on a semiconductor chip (die). It is a matter of course that each functional block may be one processor or one integrated circuit. A method of configuring the functional block is arbitrary. Note that the control unit 44 may be configured with a functional unit different from the above-described functional block. The operation of each block (the acquisition unit 441, the control execution unit 446, or the like) included in the control unit 44 will be described in detail in the description of communication control processing and the like as described later.

2-5. Configuration of Calculation Result Record Database

Figure 8:
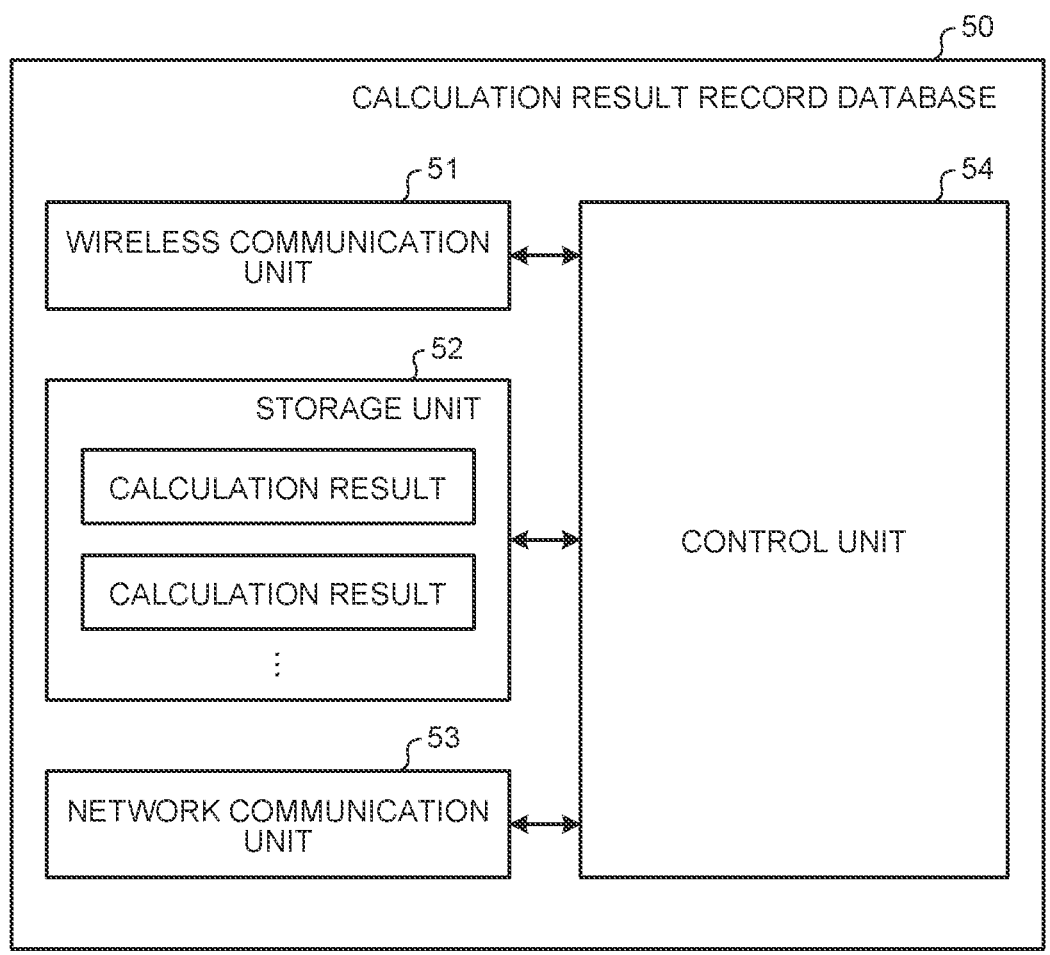
FIG. 8 is a diagram illustrating an example of a configuration of a calculation result record database according to an embodiment of the present disclosure.

The calculation result record database 50 is an information processing device that records a calculation result of the communication parameter calculation server 40. FIG. 8 is a diagram illustrating an example of a configuration of the calculation result record database 50 according to an embodiment of the present disclosure. The calculation result record database 50 includes a wireless communication unit 51, a storage unit 52, a network communication unit 53, and a control unit 54. Note that the configuration illustrated in FIG. 8 is a functional configuration, and a hardware configuration may be different from this. Further, the functions of the calculation result record database 50 may be distributed to and implemented in a plurality of physically separated components. For example, the calculation result record database 50 may include a plurality of servers.

The wireless communication unit 51 is a wireless communication interface that performs wireless communication with other communication devices (for example, the communication device 20, the terminal device 30, the communication parameter calculation server 40, another calculation result record database 50, and the regulatory management database 60). The wireless communication unit 51 is operated under the control of the control unit 54. The wireless communication unit 51 supports one or more radio access schemes. For example, the wireless communication unit 51 supports both NR and LTE. The wireless communication unit 51 may support another radio access scheme such as W-CDMA or cdma2000. The configuration of the wireless communication unit 51 is the same as that of the wireless communication unit 21 of the communication device 20.

The storage unit 52 is a storage device, from which data can be read and in which data can be written, such as a DRAM, an SRAM, a flash memory, or a hard disk. The storage unit 52 functions as a storage means of the calculation result record database 50. The storage unit 52 stores a calculation result of each of the plurality of communication parameter calculation servers 40 included in the system model 100. As described above, the possessed resource information is information regarding possession of a wireless resource of the communication device 20.

The network communication unit 53 is a communication interface for performing communication with another device. The network communication unit 53 may be a network interface or may be a device connection interface. For example, the network communication unit 53 may be a local area network (LAN) interface such as a network interface card (NIC). Further, the network communication unit 53 may be a universal serial bus (USB) interface including a USB host controller, a USB port, and the like. Further, the network communication unit 53 may be a wired interface or a wireless interface. The network communication unit 53 functions as a communication means of the calculation result record database 50. The network communication unit 53 performs communication with the communication device 20 and the terminal device 30 under the control of the control unit 54.

The control unit 54 is a controller that controls each unit of the calculation result record database 50. The control unit 54 is implemented by, for example, a processor such as a CPU or MPU. For example, the control unit 54 is implemented in a manner in which the processor executes various programs stored in the storage device inside the calculation result record database 50 by using a RAM or the like as a work area. Note that the control unit 54 may be implemented by an integrated circuit such as an ASIC or FPGA. The CPU, the MPU, the ASIC, and the FPGA can all be regarded as the controller.

The control unit 54 may have the same function as that of the control unit 44 of the communication parameter calculation server 40. For example, the control unit 64 includes an acquisition unit 441, a determination unit 442, a notification unit 443, a processing unit 444, a verification unit 445, and a control execution unit 446, similarly to the control unit 44 illustrated in FIG. 7. These blocks (the acquisition unit 441, the control execution unit 446, and the like) are functional blocks each indicating the function of the control unit 64. These functional blocks may be software blocks or hardware blocks.

2-6. Configuration of Regulatory Management Database

Figure 9:
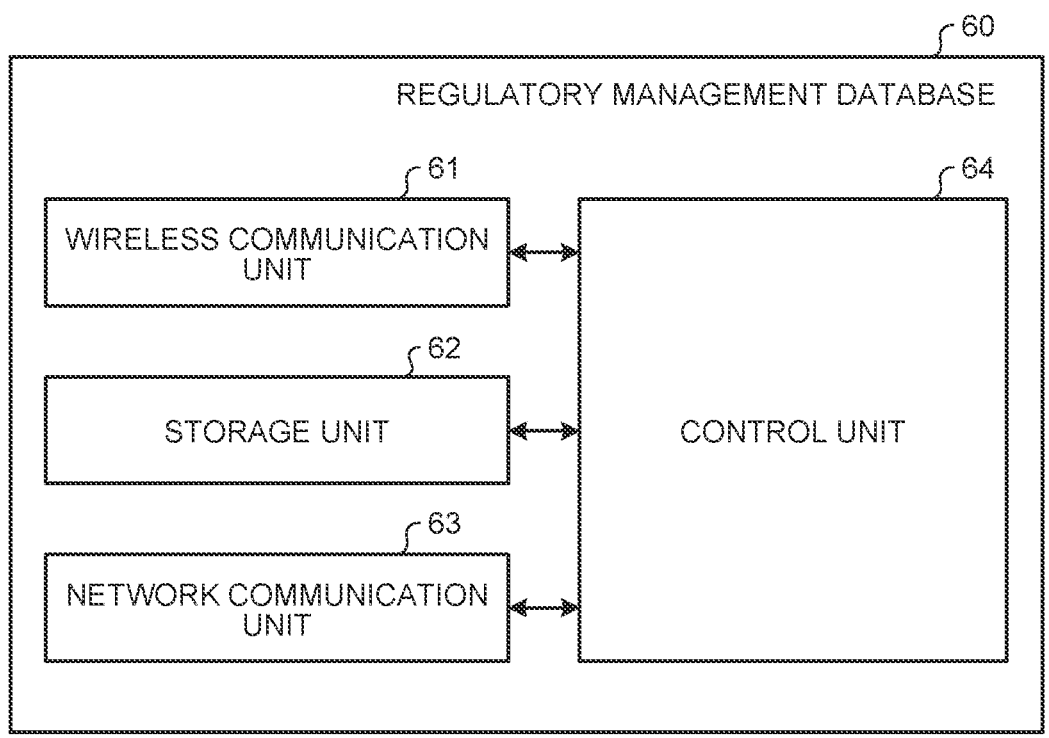
FIG. 9 is a diagram illustrating an example of a configuration of a regulatory management database according to an embodiment of the present disclosure.

The regulatory management database 60 is an information processing device that provides, to the communication parameter calculation server 40, information necessary for communication parameter calculation. FIG. 9 is a diagram illustrating an example of a configuration of the regulatory management database 60 according to an embodiment of the present disclosure. The regulatory management database 60 includes a wireless communication unit 61, a storage unit 62, a network communication unit 63, and a control unit 64. Note that the configuration illustrated in FIG. 9 is a functional configuration, and a hardware configuration may be different from this. Further, the functions of the regulatory management database 60 may be distributed to and implemented in a plurality of physically separated components. For example, the regulatory management database 60 may include a plurality of servers.

The wireless communication unit 61 is a wireless communication interface that performs wireless communication with other communication devices (for example, the communication device 20, the terminal device 30, the communication parameter calculation server 40, the calculation result record database 50, and another regulatory management database 60). The wireless communication unit 61 is operated under the control of the control unit 64. The wireless communication unit 61 supports one or more radio access schemes. For example, the wireless communication unit 61 supports both NR and LTE. The wireless communication unit 61 may support another radio access scheme such as W-CDMA or cdma2000. The configuration of the wireless communication unit 61 is the same as that of the wireless communication unit 21 of the communication device 20.

The storage unit 62 is a storage device, from which data can be read and in which data can be written, such as a DRAM, an SRAM, a flash memory, or a hard disk. The storage unit 62 functions as a storage means of the regulatory management database 60. The storage unit 62 stores a calculation result of each of the plurality of communication parameter calculation servers 40 included in the system model 100. As described above, the possessed resource information is information regarding possession of a wireless resource of the communication device 20.

The network communication unit 63 is a communication interface for performing communication with another device. The network communication unit 63 may be a network interface or may be a device connection interface. For example, the network communication unit 63 may be a local area network (LAN) interface such as a network interface card (NIC). Further, the network communication unit 63 may be a universal serial bus (USB) interface including a USB host controller, a USB port, and the like. Further, the network communication unit 63 may be a wired interface or a wireless interface. The network communication unit 63 functions as a communication means of the regulatory management database 60. The network communication unit 63 performs communication with the communication device 20 and the terminal device 30 under the control of the control unit 64.

The control unit 64 is a controller that controls each unit of the regulatory management database 60. The control unit 64 is implemented by, for example, a processor such as a CPU or MPU. For example, the control unit 64 is implemented in a manner in which the processor executes various programs stored in the storage device inside the regulatory management database 60 by using a RAM or the like as a work area. Note that the control unit 64 may be implemented by an integrated circuit such as an ASIC or FPGA. The CPU, the MPU, the ASIC, and the FPGA can all be regarded as the controller.

The control unit 64 may have the same function as that of the control unit 44 of the communication parameter calculation server 40. For example, the control unit 64 includes an acquisition unit 441, a determination unit 442, a notification unit 443, a processing unit 444, a verification unit 445, and a control execution unit 446, similarly to the control unit 44 illustrated in FIG. 7. These blocks (the acquisition unit 441, the control execution unit 446, and the like) are functional blocks each indicating the function of the control unit 64. These functional blocks may be software blocks or hardware blocks.

3. Procedure for Sharing Calculation Result Between Servers

3-1. When Sharing Calculation Result for Each Calculation

Figure 10:
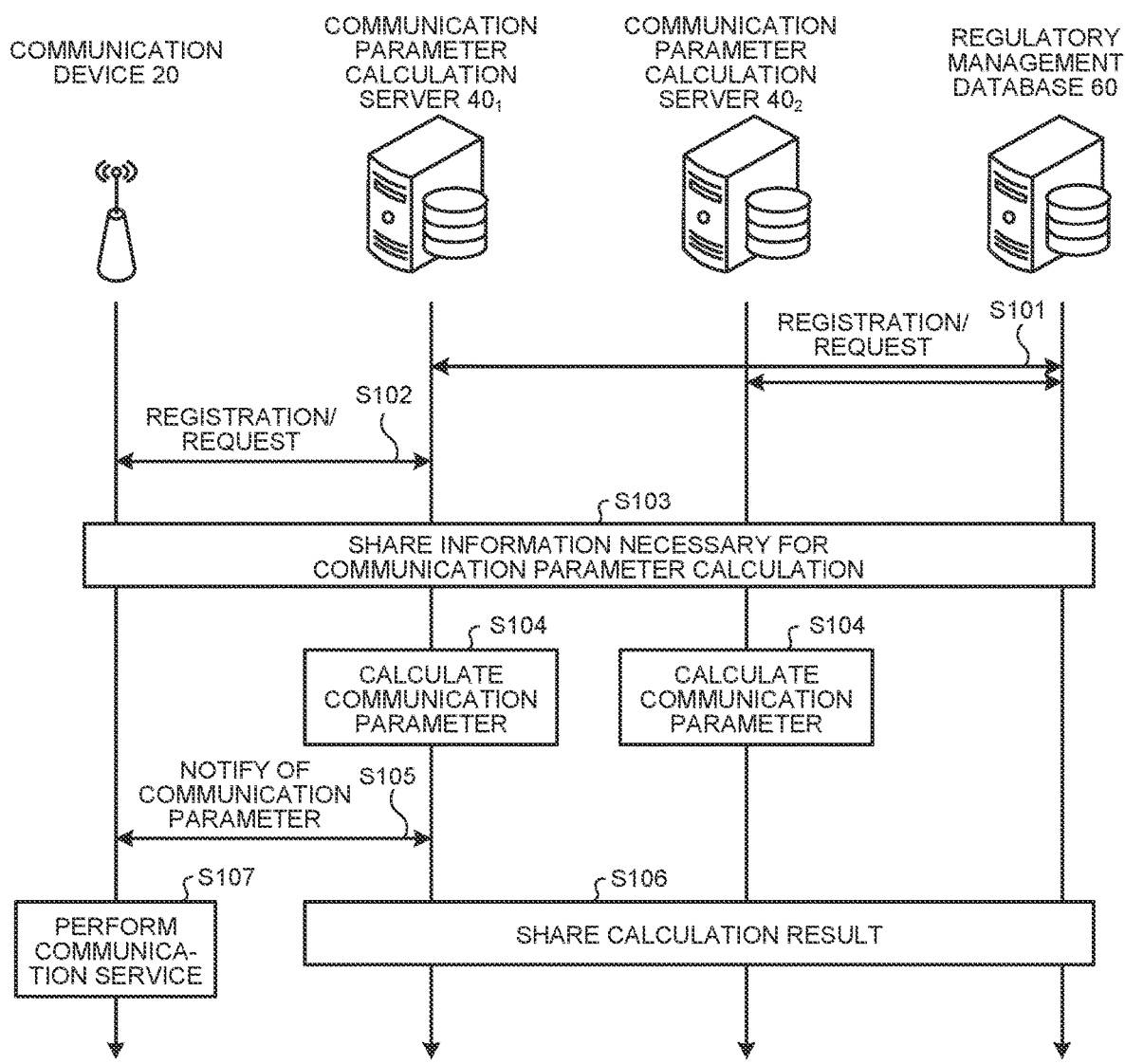
FIG. 10 is a sequence diagram illustrating an example of a procedure for sharing a calculation result between communication parameter calculation servers.

FIG. 10 is a sequence diagram illustrating an example of a procedure for sharing a calculation result between the communication parameter calculation servers 40. In the present embodiment, a result of communication parameter calculation performed by the communication parameter calculation server 40 is shared between a plurality of databases or servers, such that the calculation result can be verified retroactively. As the result of calculation of a communication parameter can be verified retroactively, it is possible to operate a plurality of different communication systems in a stable manner. In addition, as the result of calculation of a communication parameter can be verified retroactively, the possibility of improving the characteristics is increased. Hereinafter, a procedure for sharing a calculation result will be described. Note that, in the following description, a database or server may be simply referred to as a "server".

At the start of operation, the communication parameter calculation server 40 first executes its own registration/registration request with respect to the regulatory management database 60 (Step S101). It is desirable to register the communication parameter calculation server 40 at the start of operation because it is necessary to receive, from the regulatory management database 60, information/parameter value that is necessary for calculating a communication parameter later. The regulatory management database 60 may transmit, as a response, a registration completion notification (for example, ACK/NACK) with respect to the registration request from the communication parameter calculation server 40. At this time, it is desirable that the regulatory management database 60 provides, to the communication parameter calculation server 40, information on when the communication parameter calculation is to be performed. Such information may be provided K times for each period T, for example, once a week, once a day, or once an hour. Further, as will be described later, since it is desirable that the calculation is performed by a plurality of communication parameter calculation servers 40 at almost the same time, a calculation time may be specified.

The communication system (or a predetermined communication device (for example, a base station or an access point) in the communication system) executes its own registration/registration request with respect to the communication parameter calculation server 40 (Step S102). At the time of registration, notification on how many communication devices there are for the communication system 2, what kind of communication scheme is to be used, what kind of communication parameter is desired to be used, and the like may be made together. Further, the communication parameter calculation server 40 may transmit, as a response, a registration completion notification (for example, ACK/NACK) with respect to the registration request. However, when transmitting such a completion notification as a response, it is not necessary to guarantee a value of a communication parameter desired by the communication device. In other words, it is desirable that a result of calculation of a communication parameter to be performed later is preferentially used as a value that can be actually used.

Note that, in the example of FIG. 10, the number of communication parameter calculation servers 40 is plural (two), and particularly, in a case where the communication device is the communication device 20 of the low-priority communication system, the communication device may be registered in at least one of the communication parameter calculation servers 40. Further, in a case where the communication device is the communication device 10 of the high-priority communication system (with the highest priority), the communication device may be allowed not to be registered in the communication parameter calculation server 40 of the present invention.

At a timing when the communication parameter is calculated, the communication parameter calculation server 40 collects, from another communication parameter calculation server 40, the regulatory management database 60, and a communication device/communication system registered therein, information and a parameter value that are necessary for calculating the communication parameter (Step S103). For example, in the exchange of information between the communication parameter calculation servers 40, the number of communication devices registered in each communication parameter calculation server 40, the number of communication devices included in a registered communication system, and the like are collected. As another example, the communication parameter calculation server 40 collects, from the regulatory management database 60, a radio wave propagation model to be used for calculation, a parameter used for the radio wave propagation model, information regarding the presence or absence of the high-priority communication system (with the highest priority), and the like. Further, as another example, the communication parameter calculation server 40 collects, from the communication device/communication system, information on the latest status of the number of communication devices.

The communication parameter calculation server 40 performs calculation of a communication parameter on the basis of the information/parameter collected in Step S104 (Step S104). Examples of the communication parameter to be calculated here can include a frequency channel (center frequency, upper-end frequency, lower-end frequency, frequency bandwidth, or the like) that communication device/communication system should use, and allowable maximum transmission power that the communication device/communication system should use, a communication scheme (2G, 3G, 4G, 5G, Wi-Fi (registered trademark), MulteFire, XGP, AXGP, sXGP, or the like) that the communication device/communication system should use, and a place (location) where the communication device/communication system may be operated. As for a result of the calculation, it is desirable that a calculation result is obtained for each communication device. Alternatively, a calculation result may be obtained for each communication system. In addition, the communication parameter calculation server 40 calculates a communication parameter not only for the communication device/communication system registered therein, but also for a communication device/communication system registered in another communication parameter calculation server 40. This is because, in sharing of a calculation result, which is the main part of the present invention, results of a plurality of communication parameter calculation servers 40 can be referred to/verified for a calculation result for a certain communication device/communication system.

When the calculation ends, the communication parameter calculation server 40 notifies the communication device/communication system registered therein of a result of the calculation (Step S105). In this notification method, it is desirable to determine whether to make the notification for each communication device or to make the notification for each communication system depending on whether a calculation result is obtained for each communication device or for each communication system in Step S104.

In the present invention, the communication parameter calculation server 40 shares a result of the calculation of the communication parameter with another communication parameter calculation server 40 (Step S106). Further, the regulatory management database 60 may also be notified of the calculation result. A specific example of a sharing procedure here will be described later. It is desirable that the communication parameter calculation server 40 ends the sharing procedure for this sharing before a timing for the next calculation of a communication parameter or a timing for the next sharing. This is to simplify a recording work when recording a past calculation result.

The communication device may perform a communication service according to the communication parameter notified by the communication parameter calculation server 40 (within the range of the notified communication parameter) (Step S107). As for the validity period of a value of the communication parameter, for example, the value of the communication parameter may be valid until the next notification regarding the parameter is received. Further, the validity period may be specified by the communication parameter calculation server 40 at the time of making the notification in Step S105 (or the registration in Step S102).

3-2. When Sharing Calculation Result Every N Times of Calculation

In the example of FIG. 10, a calculation result is shared for each calculation of a communication parameter, but the server may share a calculation result every multiple times (for example, every N times) of calculation. By doing so, it is possible to reduce a communication band required for sharing a calculation result, and avoid and reduce network congestion between a plurality of communication parameter calculation servers 40 or between the communication parameter calculation server 40 and the regulatory management database 60.

Figure 11:
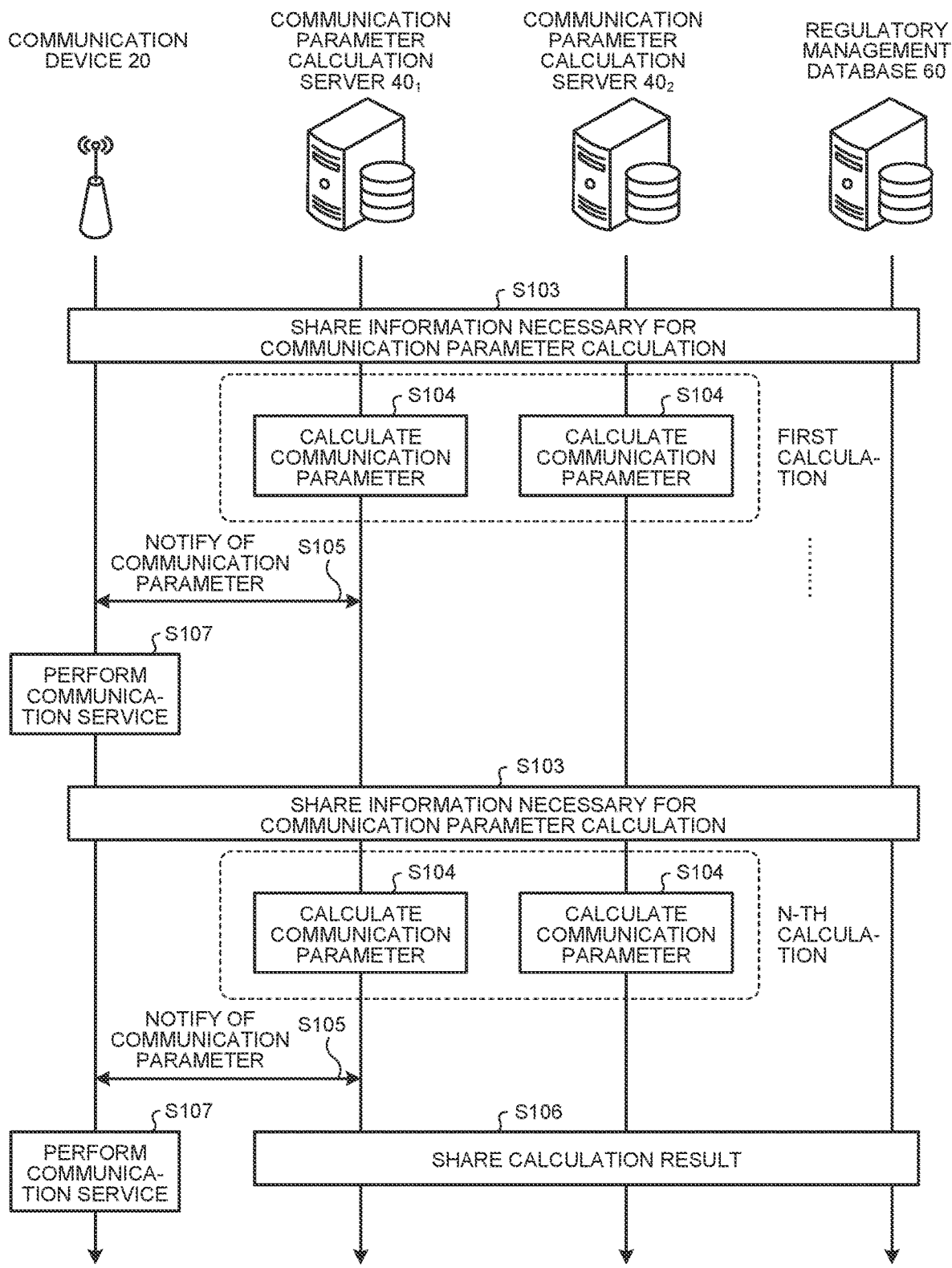
FIG. 11 is a sequence diagram illustrating an example of a procedure for sharing a calculation result between communication parameter calculation servers.

FIG. 11 is a sequence diagram illustrating an example of a procedure for sharing a calculation result between the communication parameter calculation servers 40. Processing contents of Steps S103 to S107 illustrated in FIG. 11 correspond to the processing contents of Steps S103 to S107 illustrated in FIG. 10. In the example of FIG. 11, the server shares a calculation result every N times.

Here, a method of recognizing "N times" may be, for example, specified by the regulatory management database 60 for the communication parameter calculation server 40 (or information necessary for recognition may be provided from the regulatory management database 60 to the communication parameter calculation server 40). Alternatively, the number of times of calculation may be agreed upon by the operators of the communication parameter calculation servers 40 in advance. Further, it is desirable that the sharing of the calculation result is performed by a plurality of communication parameter calculation servers 40 at the same time. Therefore, it is desirable that the count of "N times" is not a count for each communication parameter calculation server 40, but a count common to a plurality of communication parameter calculation servers 40.

Figure 12:
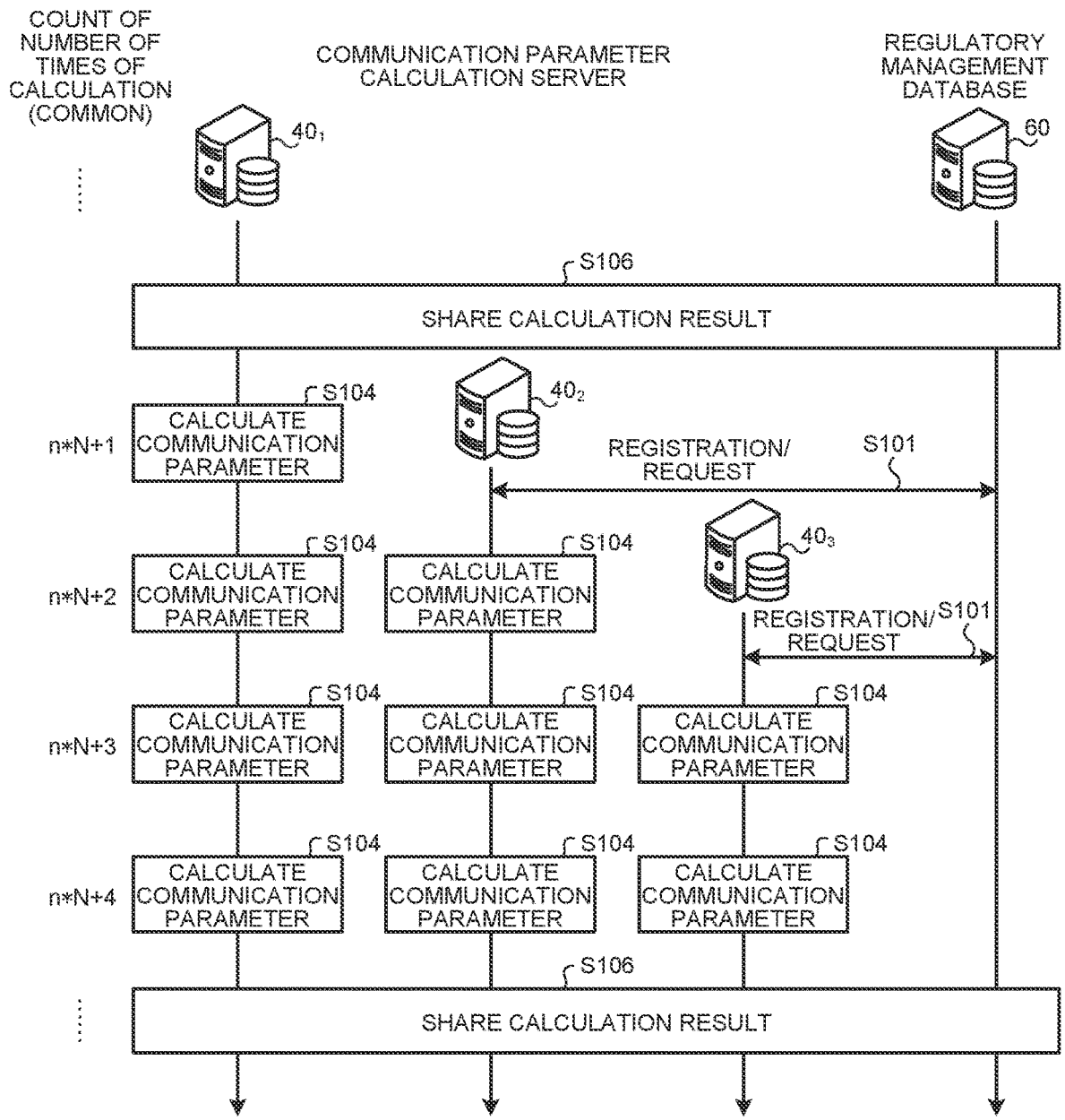
FIG. 12 is a sequence diagram illustrating an example of a procedure for sharing a calculation result between communication parameter calculation servers.

FIG. 12 is a sequence diagram illustrating an example of a procedure for sharing a calculation result between the communication parameter calculation servers 40. In the example of FIG. 12, communication parameter calculation servers 40 whose registration timings are different coexist in a case where N=4 (in a case where the sharing of the calculation result is performed every four times of calculation). Processing contents of Steps S101 to S106 illustrated in FIG. 12 correspond to the processing contents of Steps S101 to S106 illustrated in FIG. 10.

In the example of FIG. 12, the communication parameter calculation server 40$_2$ is registered in the regulatory management database 60 after the (n×N+1)-th calculation ends, and the communication parameter calculation server 40$_3$ is registered in the regulatory management database 60 after the (n×N+2)-th calculation ends. Even in such a case, in the example of FIG. 12, once the count common to the communication parameter calculation servers 40 becomes divisible by N(=4), the communication parameter calculation server 40$_2$ performs the sharing of the calculation result even when the actual number of times of calculation performed by the communication parameter calculation server 40$_2$ is only three and the actual number of times of calculation performed by the communication parameter calculation server 40$_3$ is only two.

Note that, in such an example, it is desirable that when the communication parameter calculation server 40 is registered in the regulatory management database 60, the regulatory management database 60 notifies the communication parameter calculation server 40 of the value of N and a current count of the number of times of calculation. Therefore, it is desirable that the regulatory management database 60 also grasps the count of the number of times of calculation. In addition, the number of times of calculation is not indefinitely counted, but may be initialized to a predetermined number (desirably, zero) when the number of times of calculation reaches a predetermined number (desirably, a power of 2). For example, when the count reaches 1024, the count may be initialized to zero (0). As a result, it is possible to prepare the number of bits required for counting in advance, and thus malfunctions such as overflow can be avoided. It is desirable that this rule is also specified by the regulatory management database 60 at the time of the registration in the regulatory management database 60.

Figure 13:
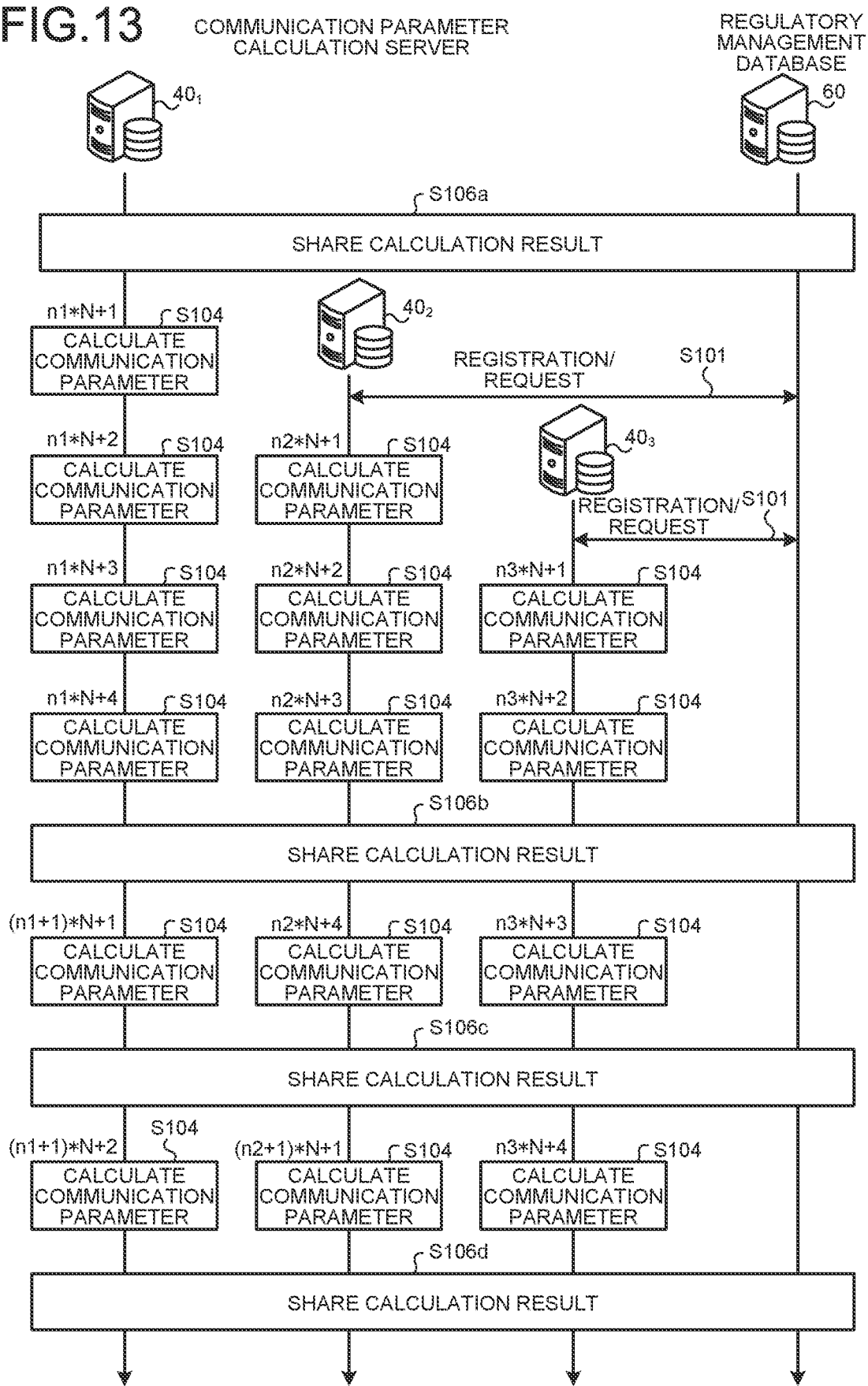
FIG. 13 is a sequence diagram illustrating an example of a procedure for sharing a calculation result between communication parameter calculation servers.

Note that, although the count is common to the plurality of communication parameter calculation servers 40 in the examples of FIGS. 11 and 12, the number of times of calculation may be individually counted for each of the plurality of communication parameter calculation servers 40. FIG. 13 is a sequence diagram illustrating an example of a procedure for sharing a calculation result between the communication parameter calculation servers 40. In the example of FIG. 13, the server shares a calculation result every four times of calculation. Note that n1, n2, and n3 in FIG. 13 are arbitrary positive integers. Processing contents of Steps S101 to S104 illustrated in FIG. 13 correspond to the processing contents of Steps S101 to S104 illustrated in FIG. 10.

In a case of the example of FIG. 13, for example, each communication parameter calculation server 40 transmits, on the basis of a count of the number of times of calculation performed after each communication parameter calculation server 40 is registered in the regulatory management database 60, a calculation result thereof to another communication parameter calculation server 4040 and the regulatory management database 60 every N times of calculation. Even in this case, the number of times of calculation is not indefinitely counted, but may be initialized to a predetermined number (desirably, zero) when the number of times of calculation reaches a predetermined number (desirably, a power of 2).

In the example of FIG. 13, a calculation result of the communication parameter calculation server 40$_1$ is shared in Steps S106$a$ and S106$b$, a calculation result of the communication parameter calculation server 40$_2$ is shared in Step S106$c$, and a calculation result of the communication parameter calculation server 40$_3$ is shared in Step S106$d$.

Note that, in addition to the examples of FIGS. 12 and 13, a different value of N may be given to each communication parameter calculation server 40. In this case, it is desirable that when the communication parameter calculation server 40 is registered in the regulatory management database 60, the regulatory management database 60 notifies the communication parameter calculation server 40 of the value of N.

3-3. Processing Flow when Record Database Function is Decentralized

Figure 14:
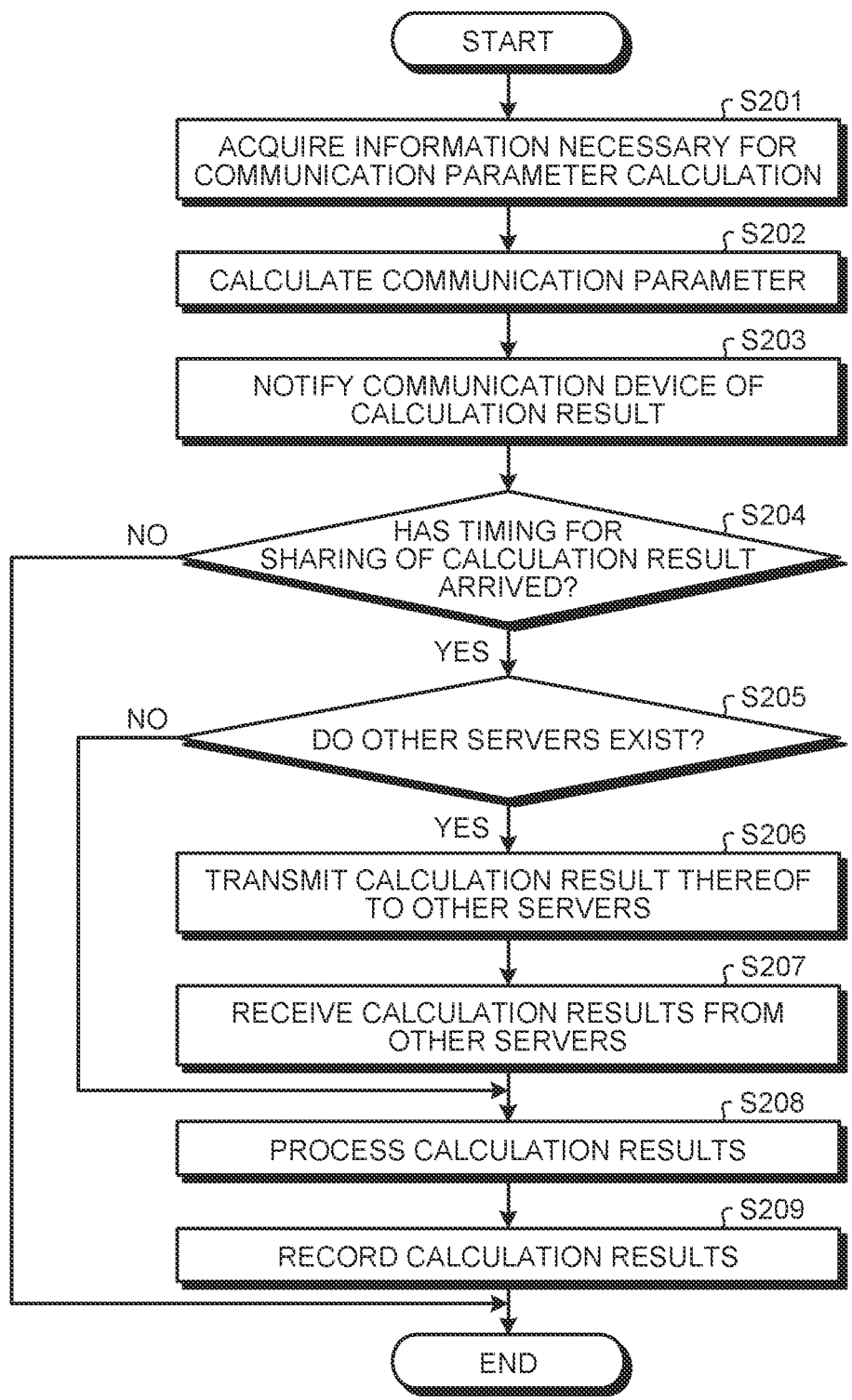
FIG. 14 is a flowchart illustrating an operation of the communication parameter calculation server when a calculation result is shared in a distributed manner.

FIG. 14 is a flowchart illustrating an operation of the communication parameter calculation server 40 when a calculation result is shared in a distributed manner (for example, FIGS. 11 to 13).

First, the acquisition unit 441 of the communication parameter calculation server 40 acquires information necessary for communication parameter calculation from, for example, the communication device 20 and another communication parameter calculation server 40 (Step S201). At this time, the acquisition unit 441 may acquire not only information of the communication device 20 under the control of the corresponding communication parameter calculation server 40, but also information of a communication device 20 under the control of another communication parameter calculation server 40. Then, the determination unit 442 of the communication parameter calculation server 40 performs the calculation of the communication parameter (Step S202). Then, the notification unit 443 of the communication parameter calculation server 40 notifies the communication device 20 of a calculation result (Step S203).

Next, the notification unit 443 determines whether or not a timing for sharing of the calculation result has arrived (Step S204). It is desirable that whether or not the timing for the sharing of the calculation result with another server has arrived is determined by using the method described in FIGS. 12 and 13. As a method other than the method described above, a method of starting sharing after a time T (hour unit, minute unit, second unit, or the like) after the previous sharing, or a method of starting sharing at a specific time may be adopted. It is desirable that both methods are specified by, for example, the regulatory management database 60.

In a case where the timing for the sharing of the calculation result has not arrived (Step S204: No), the control unit 44 of the communication parameter calculation server 40 ends the processing. In a case where the timing for the sharing of the calculation result has arrived (Step S204: Yes), the notification unit 443 checks whether or not servers other than the corresponding communication parameter calculation server 40 exist (Step S205). In a case where other servers do not exist (Step S205: No), the notification unit 443 skips the procedure for sharing the calculation result. In a case where other servers exist (Step S205: Yes), the notification unit 443 proceeds to the procedure for sharing the calculation result. Here, the notification unit 443 may consider the regulatory management database 60 as another server in addition to the communication parameter calculation server 40. In this case, practically, it may be interpreted that another server always exists.

In a case where other servers exist (Step S205: Yes), the communication parameter calculation server 40 shares (transmits) the calculation result thereof (in the case where the sharing is performed every multiple times of calculation, calculation results of multiple times of calculation) with (to) those other servers (Step S206). Examples of a sharing (transmission) method can include unicasting to each of other servers individually and multicasting or broadcasting to a plurality of other servers. In addition, it is desirable that layers, in which the unicasting, multicasting, and broadcasting are formed, include Layer 2 (data link layer), Layer 3 (network layer), Layer 4 (transport layer), Layer 7 (application layer), and the like.

In a case where other servers exist, calculation results may be transmitted from (at least some of) those other servers. Therefore, in this case, the acquisition unit 441 of the communication parameter calculation server 40 receives the calculation results (Step S207).

The communication parameter calculation server 40 records, in the storage unit 42 thereof, the received calculation results and the calculation result thereof. At that time, the processing unit 444 of the communication parameter calculation server 40 may perform predetermined processing on a set/bundle of the calculation results for the purpose of security, such that the calculation results are not falsified later (Step S208). Examples of this processing can include generation of a hash value by a one-way hash function, insertion of a digital watermark, and insertion of a falsification detection code. Further, from another viewpoint, it is also conceivable to reduce a data size in consideration of recording capacity.

After performing the above processing on the calculation result thereof and the calculation results of other servers, the processing unit 444 records the calculation results subjected to the processing (Step S209). Note that in a case where the processing is performed for the purpose of security, it is also desirable to record the calculation results that are not subjected to the processing together.

For a method of checking the existence of other servers or the addresses (IDs, IP addresses, MAC addresses, and the like) of those other servers, for example, it is desirable that the regulatory management database 60 provides a list of servers. FIG. 15 is an example of a list of servers provided by the regulatory management database 60. This list contains information regarding servers. When listing/managing servers, the servers may be grouped and managed. For example, in the table, a server group ID is shown. Servers with the same server group ID belong to the same group.

As for the meaning of the group, for example, it is desirable to group respective devices according to the definition of a country/state/prefecture/city/town/village or a predetermined region where a target communication device/communication system is present. That is, it can be assumed that servers belonging to the same group accept registration of communication devices/communication systems present in a region within a predetermined range. Note that, in the example of FIG. 15, servers of a plurality of groups are collectively described in one list, but a list of servers may be prepared/generated for each group.

Note that even in a case where grouping is not performed, it is desirable that a maximum target range of the list is a country. In other words, even in a case where grouping is not performed, it is desirable that servers listed in the same list are servers targeting communication devices/communication systems in at least the same country. That is, it is desirable that servers targeting communication devices and communication systems in a different country are described in a different list.

In a case where grouping is performed, it is desirable that the sharing of the calculation result of the present embodiment is performed in a group unit. That is, when one communication parameter calculation server 40 shares a calculation result thereof with another communication parameter calculation server 40 (transmits the calculation result to another communication parameter calculation server 40), the calculation result may be shared with a device belonging to the same group as that of the one communication parameter calculation server 40, and does not have to be shared with a server belonging to a different group. For example, multicasting and broadcasting are multicasting and broadcasting within a group. In this case, the effect of reducing the load of sharing itself and the effect of reducing the load on network resources (bandwidth and device), especially when the number of servers enormously increases, can be expected.

3-4. When Record Database Function is Centralized

The sharing of a calculation result can be realized by a method in which a database device for sharing/recording a calculation result is separately prepared (for example, for centralized management), and the calculation result is written in the database device, in addition to the method in which communication parameter calculation servers 40 share (exchange) a result.

Figure 16:
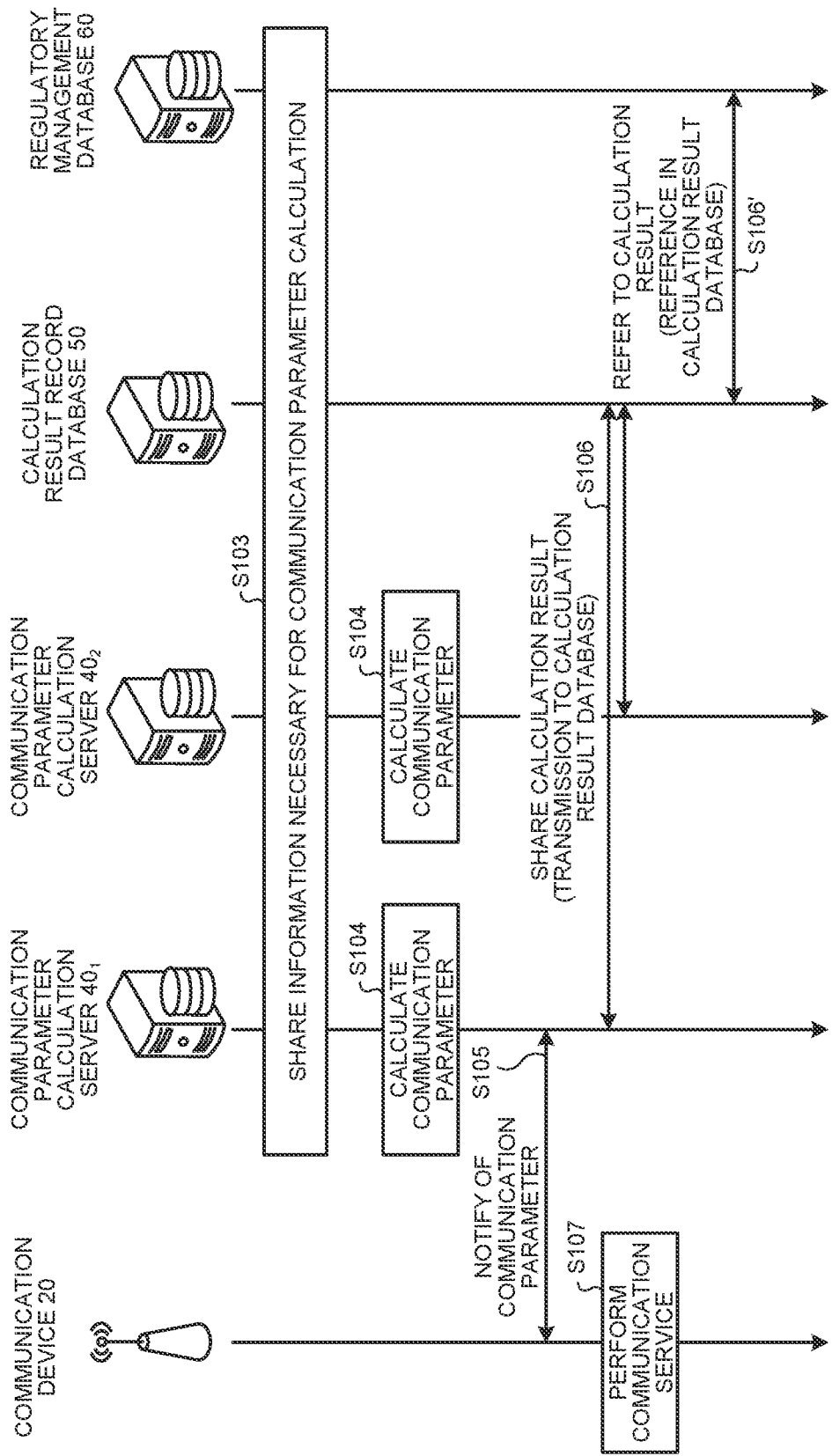
FIG. 16 is a sequence diagram illustrating an example of a calculation result sharing procedure when the calculation result record database is used.

FIG. 16 is a sequence diagram illustrating an example of a calculation result sharing procedure when the calculation result record database 50 is used. The operations in which the communication parameter calculation server 40 calculates a communication parameter and a predetermined communication device/communication system is notified of a result of the calculation may be the same as the operations in the above description.

Then, the communication parameter calculation server 40 notifies the calculation result record database 50 of the calculation result thereof or transmits the calculation result thereof to the calculation result record database 50, such that the calculation result thereof can be shared (Step S106). Note that it is desirable that the calculation result record database 50 writes the received result in a database thereof, such that another device (the regulatory management database 60, the communication parameter calculation server 40, or the like) can refer to the database. Further, the calculation result record database 50 may further provide the calculation result received from the communication parameter calculation server 40 to the regulatory management database 60 (Step S106'). However, Step S106' does not have to be performed in a case where the calculation result record database 50 allows the regulatory management database 60 to refer to the database thereof as described above.

Even in a case of centralized management, the server can additionally perform the method in which a calculation result is shared after calculation is performed multiple times as described in FIGS. 11 to 13. In a case of centralized management, when the communication parameter calculation server 40 shares a calculation result thereof, it is not necessary to exchange information with another communication parameter calculation server 40. It is sufficient that the information is transmitted to the calculation result record database 50. Therefore, both a configuration in which the count of the number of times of calculation is common to the communication parameter calculation servers 40 and a configuration in which the number of times of calculation is individually counted can be adopted. However, it is predicted that the common count and the individual count are not as different as a case of decentralized management.

3-5. Processing Flow when Record Database Function is Centralized

Figure 17:
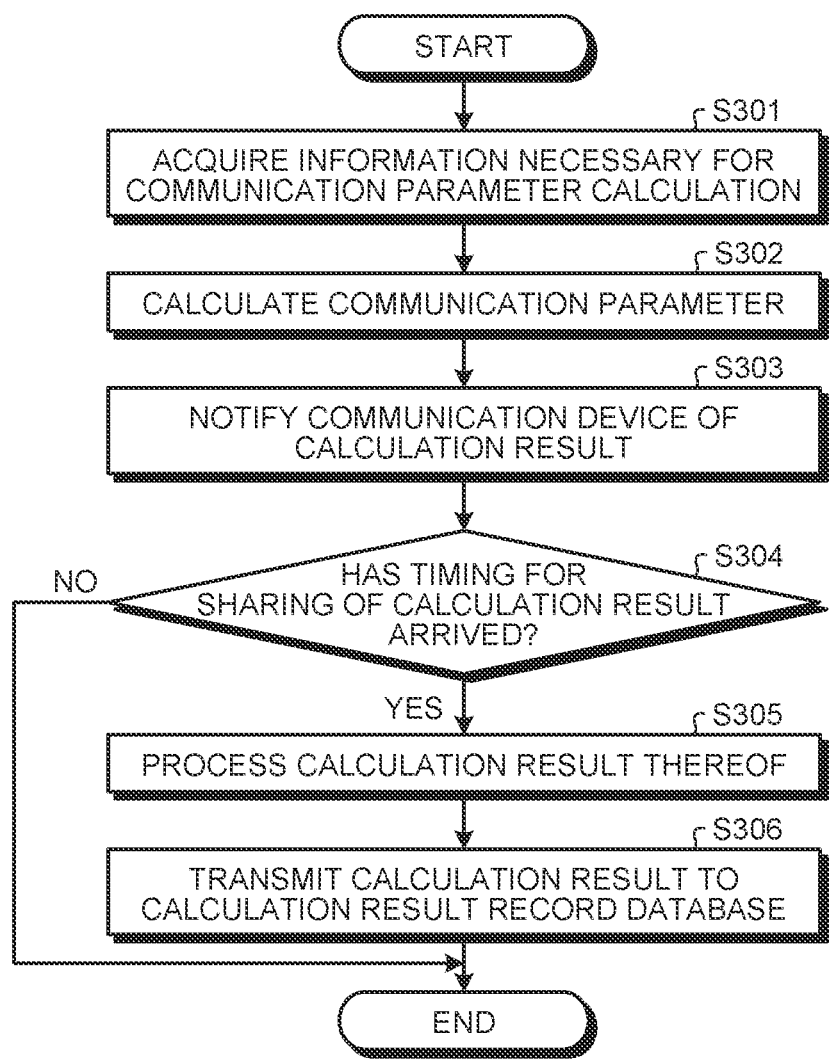
FIG. 17 is a flowchart illustrating an operation of the communication parameter calculation server 40 in centralized management type calculation result sharing.

FIG. 17 is a flowchart illustrating an operation of the communication parameter calculation server 40 in centralized management type calculation result sharing.

First, the acquisition unit 441 of the communication parameter calculation server 40 acquires information necessary for communication parameter calculation from, for example, the communication device 20 and another communication parameter calculation server 40 (Step S301). Then, the determination unit 442 of the communication parameter calculation server 40 performs the calculation of the communication parameter (Step S302). Then, the notification unit 443 of the communication parameter calculation server 40 notifies the communication device 20 of a calculation result (Step S303).

Next, the notification unit 443 determines whether or not a timing for sharing of the calculation result has arrived (Step S304). It is desirable that whether or not the timing for the sharing of the calculation result with another server has arrived is determined by using the method described in FIGS. 12 and 13. As a method other than the method described above, a method of starting sharing after a time T (hour unit, minute unit, second unit, or the like) after the previous sharing, or a method of starting sharing at a specific time may be adopted. It is desirable that both methods are specified by, for example, the regulatory management database 60.

In a case where the timing for the sharing of the calculation result has not arrived (Step S304: No), the control unit 44 of the communication parameter calculation server 40 ends the processing. In a case where the timing for the sharing of the calculation result has arrived (Step S304: Yes), the processing unit 444 of the communication parameter calculation server 40 performs predetermined processing on the calculation result (Step S305). Examples of this processing can include generation of a hash value by a one-way hash function, insertion of a digital watermark, and insertion of a falsification detection code. Further, from another viewpoint, it is also conceivable to reduce a data size in consideration of recording capacity.

After performing the above processing on the calculation result, the processing unit 444 transmits the calculation result subjected to the processing to the calculation result record database 50 (Step S306). Note that in a case where the processing is performed for the purpose of security, it is also desirable to record the calculation results that are not subjected to the processing together. Note that the communication parameter calculation server 40 only transmits the calculation result to the calculation result record database 50, and the procedure for receiving calculation results from other servers as in Step S207 of FIG. 15 does not have to be performed.

3-6. Data Format

Figure 18:
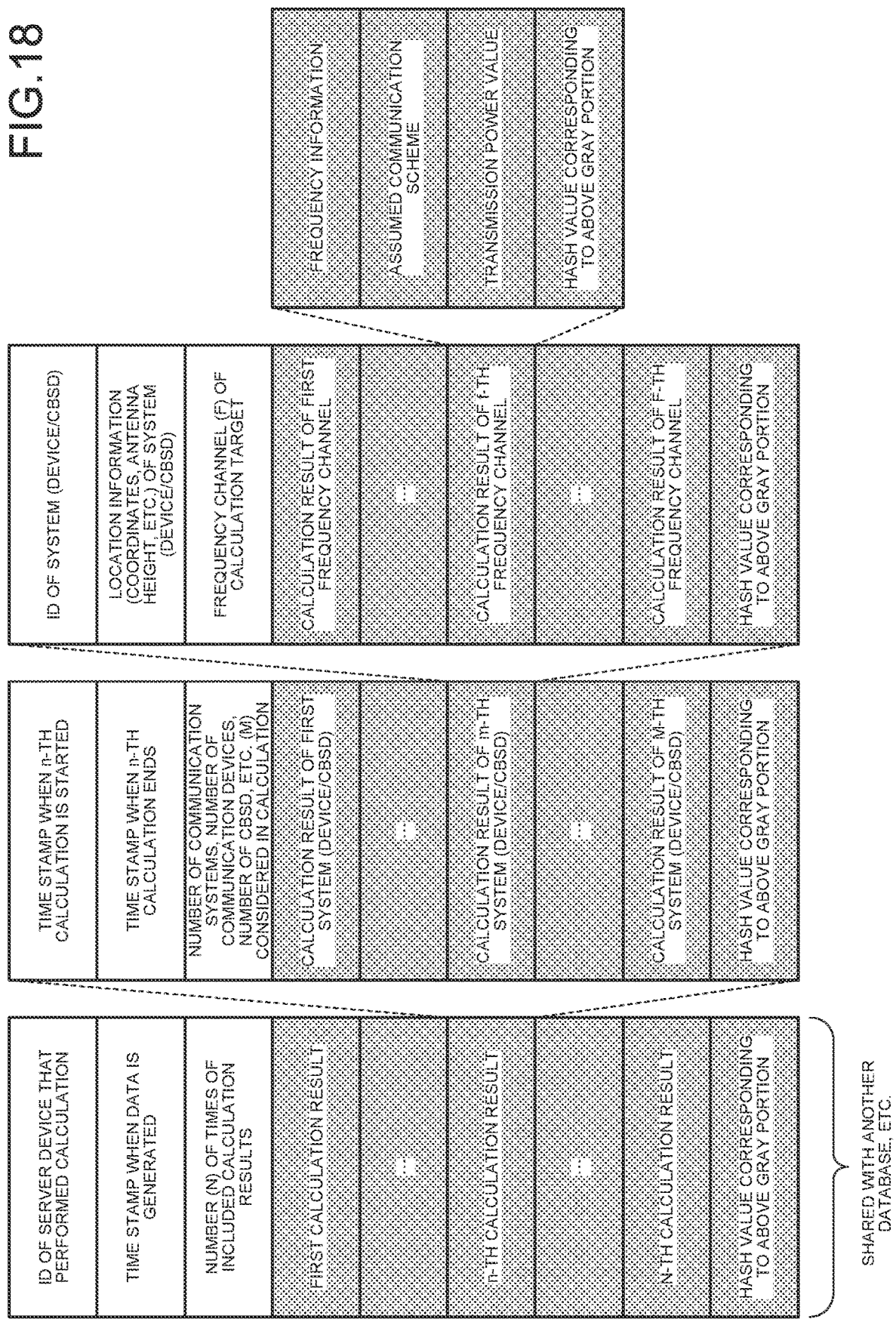
FIG. 18 is an example of a data format for calculation result sharing (or a data format for calculation result recording) in the present embodiment.

FIG. 18 is an example of a data format for calculation result sharing (or a data format for calculation result recording) in the present embodiment. FIG. 18 is an example in which a hash value generated by applying a one-way hash function to at least a part of shared information is included in consideration of security.

In a case of sharing a calculation result with another communication parameter calculation server 40, the calculation result record database 50, the regulatory management database 60, and the like (in a case of transmitting the calculation result to them), it is desirable to include data fields as illustrated on the leftmost side of FIG. 18. That is, it is desirable to include an ID of a server that performed the calculation (for example, this server may be the same server as that transmitting this information), a time stamp when the data format is generated, the number N of calculation results included in one format, N calculation results, and a hash value corresponding to at least some (for example, calculation result fields) of data fields included in the format.

Further, it is desirable that one calculation result (for example, the n-th calculation) has a format as illustrated on the second leftmost side of FIG. 18. That is, it is desirable to include a time stamp when the n-th calculation is started, a time stamp when the n-th calculation ends, and the number M of communication devices (or communication systems) considered in the n-th calculation, calculation results for M communication devices (or communication systems), and a hash value corresponding to at least some (for example, a calculation result field) of data fields included in the format.

Note that a digital watermark may be inserted to data, instead of adding a hash value.

Further, it is desirable that a calculation result for one communication device (or communication system) (for example, the m-th device/system) has a format as illustrated on the third leftmost side of FIG. 18. That is, it is desirable to include an ID (or a name, an IP address, a MAC address, or the like) of a target device/system, location information (latitude, longitude, altitude, and the like) of the target device/system, the number F of target frequency channels at the time of calculation, calculation results for F frequency channels for the target device/system, and a hash value corresponding to at least some (for example, calculation result fields) of data fields included in this format. Note that a digital watermark may be inserted to data, instead of adding a hash value.

In addition, it is desirable that a calculation result for one channel frequency (for example, the f-th frequency channel) has a format as illustrated on the rightmost side of FIG. 18. That is, it is desirable to include information (for example, a channel ID, a channel number, a center frequency, a lower-end frequency, an upper-end frequency, a bandwidth, and the like) regarding a target frequency channel, an assumed communication scheme (2G, 3G, 4G (TDD-LTE, FDD-LTE, or LTE LAA), 5G (FDD-NR, TDD-NR, or NR-unlicensed), MulteFire, Wi-Fi (registered trademark), XGP, AXGP, sXGP, or the like), a transmission power value (allowable (maximum) transmission power, an adjacent channel leakage ratio (ACLR), or the like), modulation/demodulation information (a modulation and coding scheme (MCS), the number of MIMO layers, the number of MIMO antennas (the number of antenna ports), or the like), and a hash value corresponding to at least some (for example, calculation result fields) of data fields included in the format. Note that a digital watermark may be inserted to data, instead of adding a hash value.

It is desirable that the data format is a data format in the application layer. That is, when the calculation result is actually transmitted, the calculation result is transmitted to a destination (or is multicasted or broadcasted) while adding necessary header information in each communication layer to the format.

Alternatively, the data format may be used as a format in a communication layer below the application layer. In this case as well, the calculation result is transmitted to a destination (or is multicasted or broadcasted) while adding necessary header information in a layer below the communication layer.

When a shared calculation result is received from another server, the communication parameter calculation server 40, the calculation result record database 50, and the regulatory management database 60 need to record the received calculation result in the storage units of them, respectively.

Figure 19:
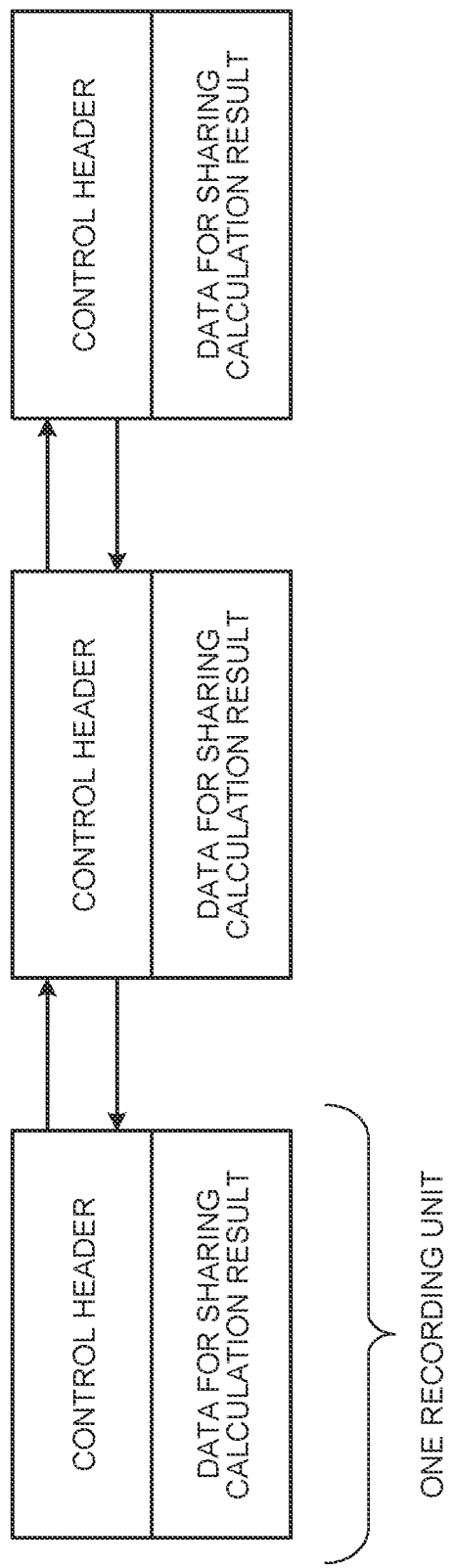
FIG. 19 is an example of a recording format for recording a shared calculation result.
Figure 20:
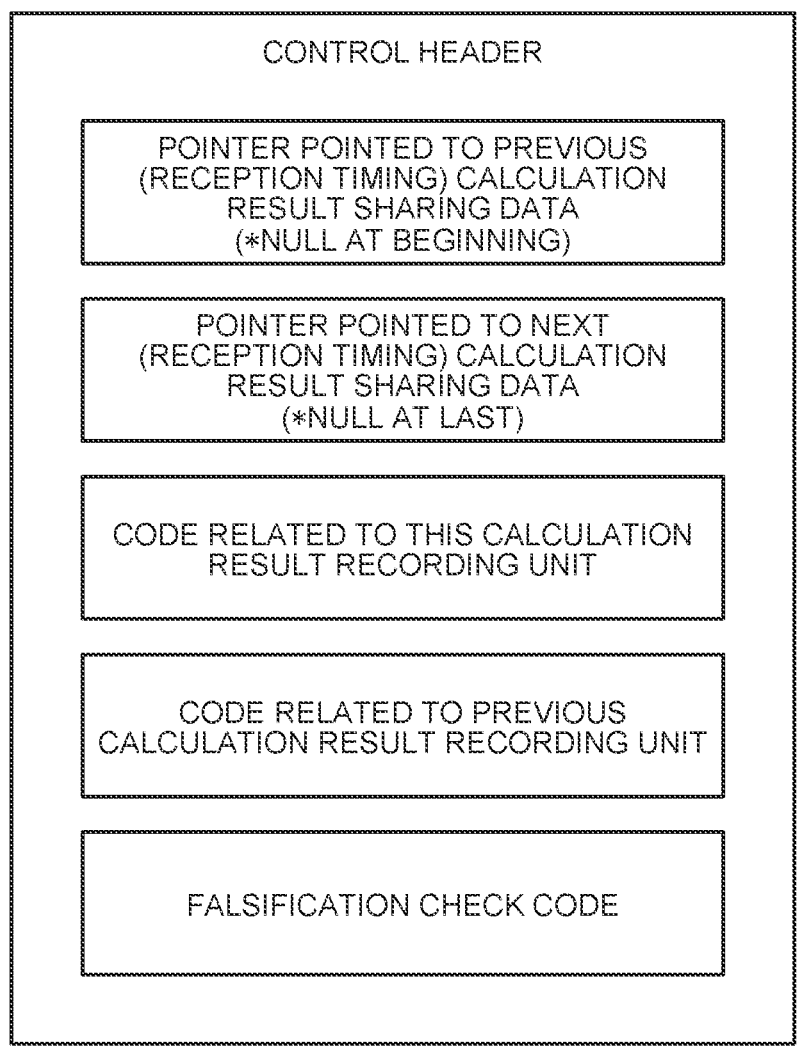
FIG. 20 is an example of a control header field added to the recording format of the present embodiment.

FIG. 19 is an example of a recording format for recording a shared calculation result. In the present embodiment, it is desirable to connect shared data (for example, data (including gray and white) illustrated on the leftmost side of FIG. 18) that are each added with a header for control in a chain form. As the chain, for example, a pointer (the arrow in FIG. 19) indicating the addresses of the previous and next recording units may be used in the control header. FIG. 20 is an example of a control header field added to the recording format of the present embodiment. Note that, in a case of using the pointer, pointers in only one direction (front to back or back to front) may be used, or pointers in both directions (front to back and back to front) may be used. In the present embodiment, since the shared calculation result is desired to be used for the purpose of retroactively analyzing the past calculation result as described above, it is desirable to include a pointer pointed from back to front. When recording shared data while connecting the shared data in a chain form, it is desirable that the order of connection is based on information (meaning) related to a time direction.

Here, the information related to the time direction can be, for example, the order of timings when a server/database on a recording side receives the data for sharing. Alternatively, the information related to the time direction can be the order of timings when the data for sharing is generated by a server on a transmission side. In the former case, since the timing may be different between servers/databases on the recording side, there is a possibility that a resulting record may be different for each server/database (the order of connection may be different). On the other hand, in the latter case, since the timing when the data for sharing is generated on the transmission side is unique, records connected in a chain form on the basis of the information can be the same between the servers/databases on the recording side (the order of connection can be the same). For the purpose of avoiding/reducing the possibility of falsification of records, which will be described later, it is desirable to connect data in a chain form according to the latter case, especially when performing recording in a plurality of server databases in a distributed manner. It is desirable that a backward direction pointer of the foremost data and a forward direction pointer of the rearmost data are NULL.

Further, the following information is added to the control header as a measure for making it difficult to falsify the recorded data.

(a) Code related to this recording unit
(b) Code related to the previous recording unit
(c) Falsification check code By doing so, in order to falsify a certain recording unit, it is necessary to falsify the previous recording unit connected in a chain form, and as a result, the load for falsification is large, and thus, practically, falsification is not possible. Here, it is desirable that the code related to this recording unit is a hash value generated for (at least a part of) a shared data portion of the recording unit. Further, it is desirable that the code related to the previous recording unit is, for example, a hash value generated for the entire previous recording unit, a hash value generated for (at least a part) of a control header portion of the previous recording unit, a hash value generated for (at least a part of) the shared data portion of the previous recording unit, or the like. Further, it is desirable that the falsification check code is a cyclic redundancy check (CRC) code sequence or a code sequence that satisfies a predetermined condition when combined with (a) and (b).

Note that, in the recording as illustrated in FIG. 19, when the communication parameter calculation servers 40 are grouped, it is desirable that the connection in a chain form is also performed in a group unit. That is, the shared data connected to the same chain is calculated/shared by servers belonging to the same group. Data calculated/shared by servers belonging to different groups, respectively, should be connected to different chains, respectively.

3-7. New System Participation Procedure for Communication Parameter Calculation Server In a case where the communication parameter calculation server 40 newly participates in the system, it is desirable to acquire a calculation result (calculation result record) already shared in the system. An example of the procedure is as below.

FIG. 21 is a sequence diagram illustrating an example of a new participation procedure when sharing/recording a calculation result in a distributed manner.

The newly participating communication parameter calculation server 40 first transmits a request for registration of the server itself to the regulatory management database 60, and the regulatory management database 60 transmits, as a response, information regarding whether or not the registration can be completed and a registration result to the corresponding server (Step S401). Basically, the operation of Step S401 is the same as the above description.

In addition, the regulatory management database 60 may provide, to a newly participating server, information on how to obtain existing calculation result records. As the content of the information, for example, it is conceivable to provide information on a request destination candidate device to which the existing calculation result records are to be requested as illustrated in FIG. 22. The table is similar to FIG. 15 above except that "server type (device type)" and "request priority" are added. As for the device type, in FIG. 22, in addition to the communication parameter calculation server 40, the regulatory management database 60 or the calculation result record database 50 may also be included as a request destination to which the existing calculation result records are to be requested. Therefore, when the newly participating communication parameter calculation server 40 selects the request destination, it can be effective to clarify the device type. Similarly, when the newly participating communication parameter calculation server 40 selects the request destination, it can be effective to clarify the request priority.

The registered communication parameter calculation server 40 requests another communication parameter calculation server 40 that is already in operation or the regulatory management database 60 to share a record regarding a past calculation result (Step S402 and Step S402'). For example, the communication parameter calculation server 40 may select one request destination on the basis of the information provided in Step S401 above. Alternatively, the communication parameter calculation server 40 may multicast or broadcast the request to one or more request destinations.

Note that in a case where calculation results are recorded in a distributed manner, it is desirable that the request destination is another communication parameter calculation server 40 (Step S402). A case of requesting the existing calculation result records to the regulatory management database 60 (Step S402') may be possible in a case where, for example, the regulatory management database 60 provides information so that the request for the past calculation result record is made to the regulatory management database 60 (for example, a case where the ID, the address, or the like of the regulatory management database 60 is included in the list as illustrated in FIG. 22) in the previous Step S401.

Another server that receives the request from the newly participating server transmits calculation result records up to a current point in time to the newly participating server (Step S403).

Then, the newly participating server records the calculation result records received in Step S403 in a recording device thereof (Step S404). Then, the newly participating server proceeds to a predetermined operation (the operation described hereinabove in the present embodiment) at a timing for the next communication parameter calculation, and calculates a communication parameter (Step S405 and Step S406).

FIG. 23 is a sequence diagram illustrating an example of a new participation procedure when centrally recording/managing a calculation result. Although there are many parts in common with FIG. 21 above, in a case where calculation results are centrally recorded, the newly participating communication parameter calculation server 40 may transmit the request for the existing calculation result records to a device (for example, the calculation result record database 50, the regulatory management database 60, or the like in FIG. 23) that centrally manages the records (Step S402).

3-8. Processing Flow for Newly Participating Server to Acquire Calculation Result Record FIGS. 24A, 24B, 24C, and 24D are each an example of a flowchart for a newly participating communication parameter calculation server 40 to select a request destination for acquiring a calculation result record. In the following description, the newly participating communication parameter calculation server 40 may be referred to as a newly participating server.

Figure 24A:
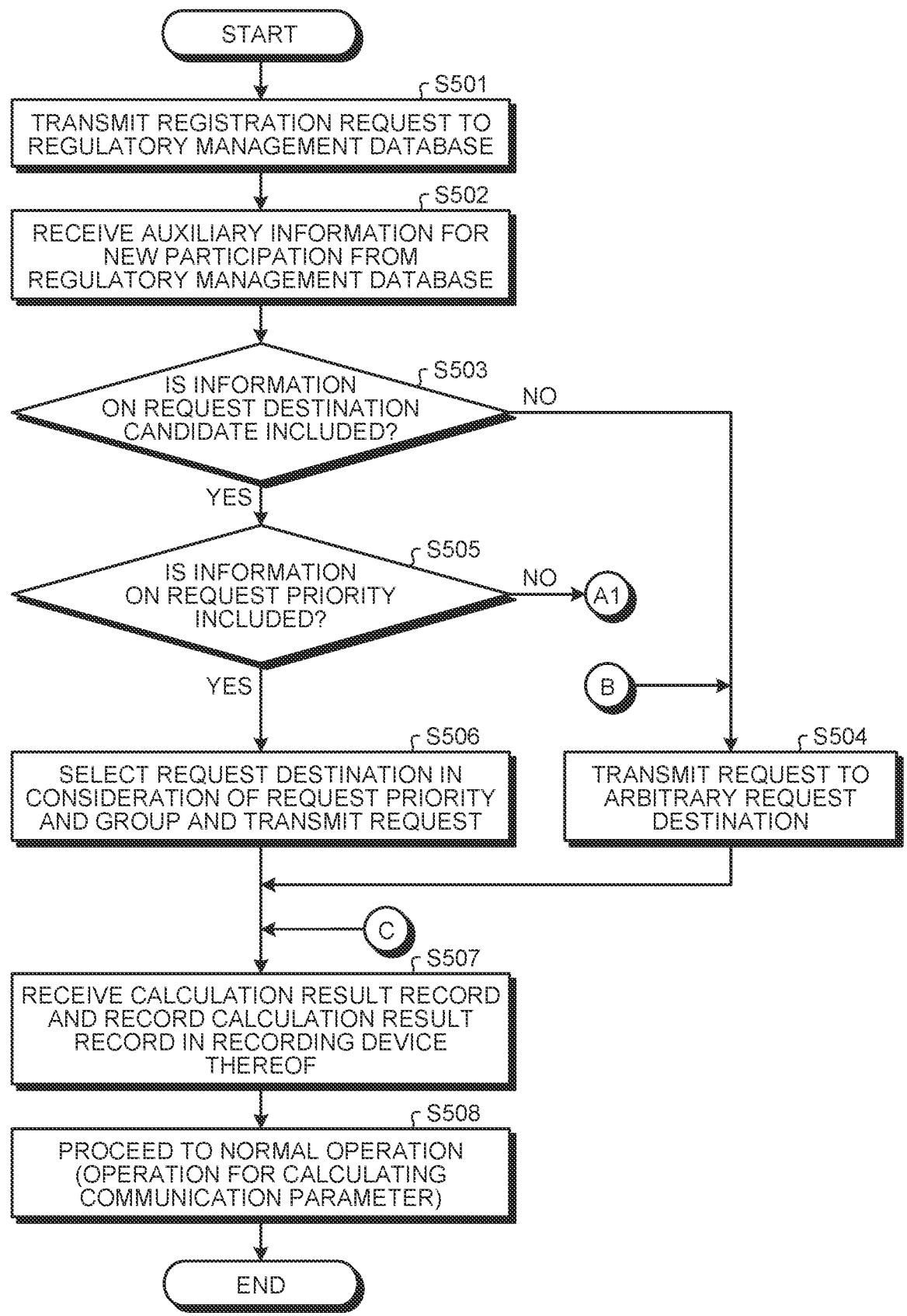
FIG. 24A is an example of a flowchart for a newly participating communication parameter calculation server to select a request destination for acquiring a calculation result record.

First, the notification unit 443 of the newly participating server transmits a registration request to the regulatory management database 60 (Step S501 in FIG. 24A). The acquisition unit 441 of the newly participating server acquires auxiliary information from the regulatory management database 60 (Step S502 in FIG. 24A). Here, it is assumed that the newly participating server receives, from the regulatory management database 60, the information as illustrated in FIG. 22 as the auxiliary information for new participation. In a case where there is no auxiliary information for new participation, or in a case where there is no information as illustrated in FIG. 22 in the auxiliary information (Step S503: No in FIG. 24A), the notification unit 443 transmits, to an arbitrary request destination, a request by broadcasting (Step S504 in FIG. 24A).

In a case where there is information as illustrated in FIG. 22 as the auxiliary information (Step S503: Yes in FIG. 24A), the processing unit 444 of the newly participating server determines whether or not there is information regarding the request priority in the auxiliary information (Step S505 in FIG. 24A). In a case where there is information regarding the request priority (Step S505: Yes in FIG. 24A), the processing unit 444 selects the request destination in consideration of the priority (Step S506 in FIG. 24A). As for the priority, the one having a higher priority (for example, the one having a smaller number) in FIG. 22 may be selected as the request destination. Here, in a case where server grouping is performed, it is desirable to select the request destination from devices that belong to the same server group as that of the newly participating server. Further, not only a configuration in which one device is selected as the request destination and the request is transmitted by unicasting, but also a configuration in which one or more devices that satisfy the condition are selected and the request is transmitted by multicasting may be possible.

In a case where there is no request priority information in the auxiliary information (Step S505: Yes in FIG. 24A), the processing unit 444 selects the request destination in consideration of the server type. In a case where the calculation result record database 50 is included as a candidate (Step S511: Yes in FIG. 24B), the notification unit 443 selects the database as the request destination and transmits the request by unicasting or multicasting (Step S513 in FIG. 24B). Here, it is also desirable to select, as the request destination, the calculation result record database 50 that belongs to the same group as that of the newly participating server, by additionally considering grouping (Step S512 in FIG. 24B).

In a case where the calculation result record database 50 is not included as a candidate (Step S511: No in FIG. 24B), the processing unit 444 determines the presence or absence of the regulatory management database 60 (Step S521 in FIG. 24C). In a case where the regulatory management database 60 is present as a request candidate (Step S521: Yes in FIG. 24C), the notification unit 443 selects the regulatory management database 60 as the request destination and transmits the request by unicasting or multicasting (Step S523 in FIG. 24C). Here, in a case where a group is defined, it is also desirable to consider the group (Step S522 in FIG. 24C).

In a case where the regulatory management database 60 is not included as a request destination candidate (Step S521: No in FIG. 24C), the processing unit 444 determines the presence or absence of the communication parameter calculation server 40 (Step S531 in FIG. 24D). In a case where the communication parameter calculation server 40 is present as a request candidate (Step S531: Yes in FIG. 24D), the notification unit 443 selects the request destination from other communication parameter calculation servers 40 included as request destination candidates, and transmits the request by unicasting or multicasting (Step S533 in FIG. 24C). Here, in a case where a group is defined, it is also desirable to consider the group (Step S532 in FIG. 24C).

In a case where another communication parameter calculation server is also not included as the request destination (Step S531: No in FIG. 24D), the notification unit 443 transmits the request by broadcasting to an arbitrary request destination (Step S504 in FIG. 24A).

After transmitting the request, the newly participating server receives a calculation result record and records the calculation result record in a recording device thereof (Step S507 in FIG. 24A). Then, the newly participating server proceeds to an operation for calculating a communication parameter (Step S508 in FIG. 24A).

4. Procedure for Referring to and Analyzing Past Calculation Result when Event Occurs

4-1. Example of Procedure

Next, a procedure for the communication parameter calculation server 40 or the regulatory management database 60 to refer to and analyze a past calculation result when an event occurs will be described. FIG. 25 is a sequence diagram illustrating an example of a procedure for analyzing a past calculation result, the procedure being triggered by an event.

Here, the "event" may basically indicate an event in which a problem or issue is caused when the low-priority communication system (for example, the communication system 2), the high-priority communication system (for example, the communication system 1), the communication parameter calculation server 40, and the like operate/continue a service. For example, it is conceivable that a non-negligible level of interference of the low-priority communication system with the high-priority communication system occurs. This is a problem that shakes the operation mode of the communication system targeted by the present embodiment and the concept of radio wave management administration in the country/region, and there is a need to take an action to solve such a problem/issue.

Other examples include a case where the communication parameter calculation server 40 cannot complete the calculation of the communication parameter of the target communication device/communication system within a predetermined time, a case where the sharing of the calculation result is not correctly performed, and the like. Even in these cases, considering that the service of the low-priority communication system is appropriately controlled after the calculation, it is necessary to appropriately solve the problem/issue.

As another example, the completion of the sharing of the calculation result (or the completion of a predetermined number of times of sharing) may be an event of calculation result analysis. This corresponds to regular operation/maintenance, and is very effective for continuously providing an appropriate communication service.

In a case where, for example, an event occurs between the low-priority communication system and the high-priority communication system, as illustrated in FIG. 25, for example, the high-priority system (and a device in the system) or a sensor device for interference measurement notifies the regulatory management database 60 of occurrence of such an event (problem). Alternatively, the regulatory management database 60 itself may have a function of detecting/recognizing the occurrence of such an event.

Upon detecting the event, the regulatory management database 60 notifies the registered communication parameter calculation servers 40 that a problem has occurred from the low-priority communication system to the high-priority communication system (Step S601). At this time, the regulatory management database 60 may transmit a notification to all the registered servers. Alternatively, in a case where information on the place/location where the problem occurs can be obtained or the like, the notification (multicasting, broadcasting, or the like) may be transmitted only to servers belonging to a specific group. As such a group, it is desirable to use the group as described in FIG. 15 above.

Upon receiving the notification regarding the problem/issue from the regulatory management database 60, the communication parameter calculation server 40 notifies the communication device/communication system registered therein to immediately stop the communication service (Step S601'). This is because, in the communication system targeted by the present invention and the concept of using radio waves, it is unacceptable for the low-priority communication system to continue to provide a communication service while continuously causing fatal interference to the high-priority communication system. Upon receiving the notification, the communication device/communication system stops the communication service according to the notification (Step S601").

Upon receiving the notification in Step S601 from the regulatory management database 60, the communication parameter calculation servers 40 retroactively verify/analyze a past record on the basis of the sharing/recording of the calculation result described above (Step S602). In the verification/analysis at this stage, each server and the regulatory management database 60 refer to the past calculation results thereof and the calculation results of the other servers that they have received and recorded in the past. In some sharing situations, a record may be different for each server, but at this step, such a difference need not be considered. Note that a predetermined time deadline may be set for this verification/analysis. By setting the deadline, it can be expected that the verification/analysis can be completed within a short time and the communication service of the low-priority communication system can be restarted at an early stage.

When the communication parameter calculation servers 40 and the regulatory management database 60 complete the verification/analysis performed by themselves, the communication parameter calculation servers 40 and the regulatory management database 60 share the verification/analysis results with another communication parameter calculation server 40 and the regulatory management database 60 (Step S603). Here, sharing destinations may be all of the communication parameter calculation servers 40. As another example, in a case where the grouping of the communication parameter calculation servers 40 is performed, an analysis result may be shared (multicasting, broadcasting, or the like) between the communication parameter calculation servers 40 in the group and the regulatory management database 60. As for the grouping of the communication parameter calculation servers 40, it is desirable to use the group as described in FIG. 15 above.

After sharing the verification/analysis results, the communication parameter calculation servers 40 and the regulatory management database 60 determine the action to take to deal with the event (problem or issue) targeted this time on the basis of the collected results (Step S604 and Step S604'). Then, the communication parameter calculation servers 40 and the regulatory management database 60 perform the procedure for the action to be taken on the basis of the determination (Step S605). Note that Step S604, Step S604', and Step S605 (particularly, Step S604 and Step S604') may be performed only by the regulatory management database 60.

After dealing with the occurred event by the method from Step S601 to Step S605 above, the communication parameter calculation server 40 performs the calculation of the communication parameter to be used by the registered low-priority communication system again. Then, the communication parameter calculation server 40 notifies the target communication device/communication system of the calculation result. Upon receiving this notification, the target communication device/communication system can perform (restart) the target communication service. In other words, the target communication service should not be restarted until the notification is received.

An example of the procedure to be performed in Step S605 is as follows.

(i) Change/update of a radio wave propagation model, a co-channel interference model, an adjacent channel interference model, and the like used/referred to for calculation (estimation) of an interference amount at the time of calculation of a communication parameter, such as co-channel interference, adjacent channel interference, and aggregate interference (ii) Change/update of the frequency of communication parameter calculation (iii) Stopping a specific wireless system and communication parameter calculation server 40 In Step S605 above, for example, it is desirable to perform at least one of these.

As for (i) above, for example, in a case where a significant abnormality is found in the calculation result, the model or parameter used for the calculation may be changed/updated.

4-2. Interference Model

Next, an interference model assumed in the present embodiment will be described. FIG. 26 is an explanatory diagram illustrating an example of the interference model assumed in the present embodiment. The interference model illustrated in FIG. 26 is applied, for example, when the primary system has a service area. In the example of FIG. 26, a protection area is defined for the high-priority communication system (the communication system 1 or the communication device $10_1$), and the communication parameter calculation server 40 estimates/predicts/calculates the amount of interference (aggregated interference) given by the communication device (communication devices $20_1$ to $20_5$) of the (plurality of) low-priority communication system 20 to a predetermined point (protection point) in the protection area. The protection area is divided in, for example, a grid shape, and an intersection point of the lines of the grid or the center of the square of the grid is assumed as the protection point. That is, the communication parameter calculation server 40 calculates the aggregated interference at a plurality of protection points in the protection area.

Figure 27:
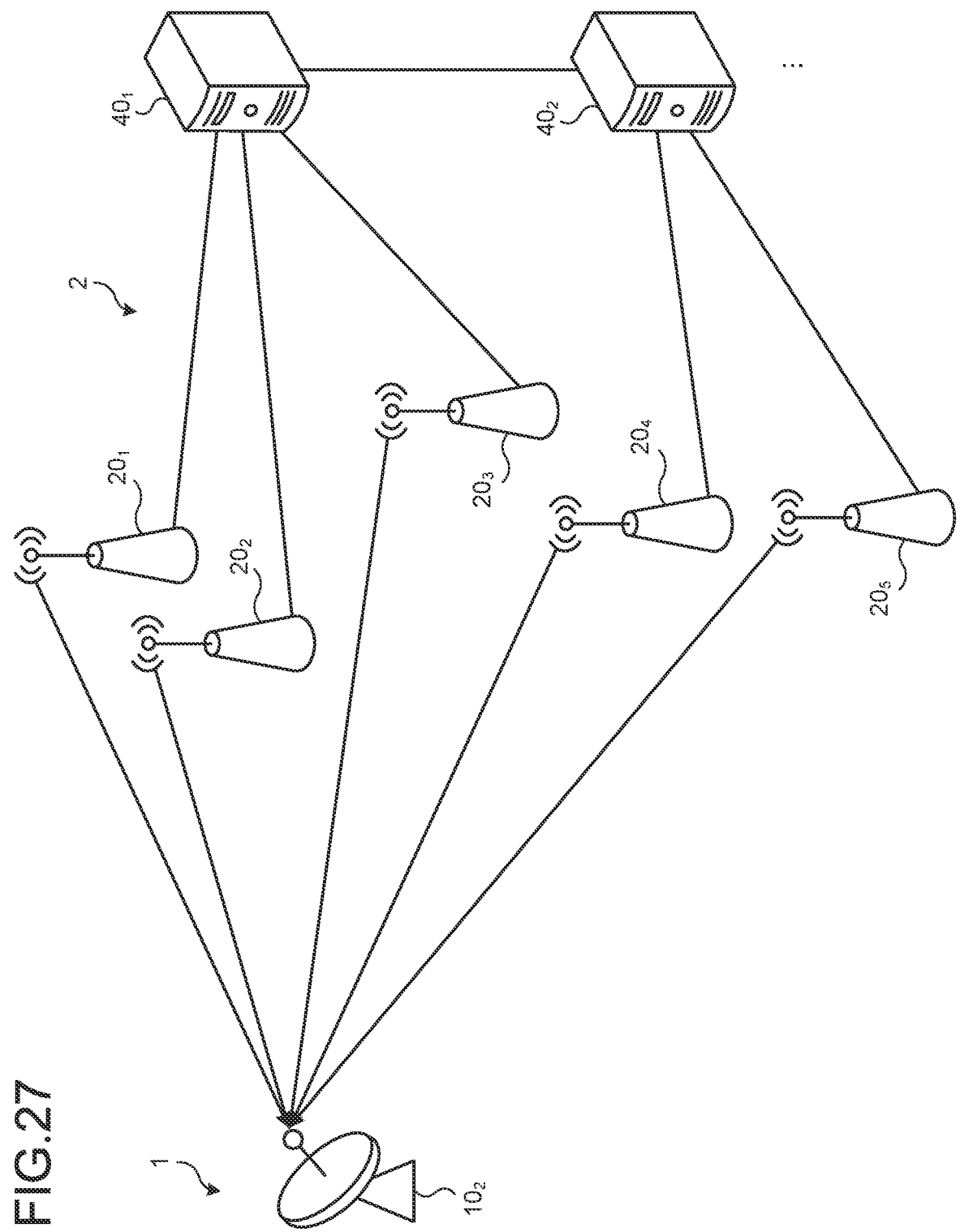
FIG. 27 is an explanatory diagram illustrating another example of the interference model assumed in the present embodiment.

FIG. 27 is an explanatory diagram illustrating another example of the interference model assumed in the present embodiment. In the example of FIG. 27, unlike the example of FIG. 26 above, the communication parameter calculation server 40 estimates/predicts/calculates the interference (aggregated interference) with respect to the location of the communication device 10 of the high-priority communication system, rather than the interference with respect to the protection area of the high-priority communication system. In the example of FIG. 27, the communication system 1 (primary system) includes a receiving antenna as the communication device $10_2$. The communication device $10_2$ is, for example, a receiving antenna of a satellite ground station. The communication parameter calculation server 40 uses the location of the receiving antenna as the protection point and calculates aggregated interference at that point.

In each of the interference models illustrated in FIGS. 26 and 27, the regulatory management database 60 notifies the communication parameter calculation server 40 of information on the location of the protection area (protection point) of the high-priority communication system and the location of the communication device of the high-priority communication system (for example, at the time of registration or before the calculation starts). Here, estimated values $I_{est,c,total,fp}(x_p, y_p, z_p)$ of interference amount of aggregated interference of a frequency channel $f_p$ at a certain protection point or the location of a communication device p of a high-priority communication system can be as follows.

$$I_{est,total,p,f_p}(x_p, y_p, z_p) = \sum_{c=1}^{C} \sum_{f_c=1}^{F} I_{est,c,f_p,f_c}(x_p, y_p, z_p, x_c, y_c, z_c) \quad (1)$$

$$I_{est,c,f_p,f_c}(x_p, y_p, z_p, x_c, y_c, z_c) = \frac{G_p G_c A_{ACLR,f_p,f_c}}{L_{p,c,f_c} A_{ACS,f_p,f_c}} P_{tx,c,f_c} \quad (2)$$

Here, F is the number of frequency channels to be considered, C is the number of communication devices of a low-priority communication system to be considered, $I_{est,c,total,fp}(x_p, y_p, z_p, x_c, y_c, z_c)$ is an estimated value of the amount of interference of a single unit of a communication device c of a low-priority communication system using the frequency channel, $x_p, y_p, z_p$ is the location of a protection point or a communication device of a high-priority system to be estimated, $x_c, y_c, z_e$ is the location of the communication device c of the low-priority communication system, $G_p$ is an antenna gain assumed at the protection point or in the communication device of the high-priority communication system, $G_c$ is an antenna gain assumed in the communication device c of the low-priority communication system, $L_{p,c,f_c}$ is radio wave propagation attenuation between a target protection point or a target communication device of the high-priority communication system and the communication device c of the low-priority communication system, $A_{ACS,p,f_p,c,f_c}$ is adjacent channel selectivity between the target protection point or the target communication device (using the frequency channel $f_p$) of the high-priority communication system and the communication device c of the low-priority communication system (using the frequency channel $f_p$), $A_{ACLR,p,f_p,c,f_c}$ is an adjacent channel leakage ratio between the target protection point or the target communication device (using the frequency channel) of the high-priority communication system and the communication device (using the frequency channel $f_c$) of the low-priority communication system, and $P_{tx,c,f}$ is transmission power of the communication device c of the low-priority communication system. Note that, in the present embodiment, all calculations are described by using a true value (linear) expression. In a case of the expression, all variables in the above equation basically have values of real numbers greater than or equal to zero. Although the description of a decibel (dB) expression is omitted, the same calculation can be performed by appropriately converting the true value (linear) expression into the decibel expression.

Then, the estimated value of the aggregated interference amount is required to be equal to or less than a predetermined allowable interference amount $I_{accept}$.

$$I_{est,total,p,f_p}(x_p, y_p, z_p) \leq I_{accept} \quad (3)$$

The communication parameter calculation server 40 calculates and sets transmission power (allowable maximum transmission power) of each communication device c of the low-priority communication system so as to satisfy the above condition for each protection point or each communication device of the high-priority communication system. As calculation for this purpose, the communication parameter calculation server 40 may obtain allowable maximum transmission power $\hat{P}_{tx,max,c,f_c}$ of each communication device c by the following calculation, for example.

$$\hat{P}_{tx,max,c,f_c} = \min\left(\min_p P_{tx,max,p,c,f_c}, P_{tx,max,upper}\right) \quad (4)$$

In Equation (4), that is, $\hat{P}_{tx,max,p,c,f_c}$ is calculated for all protection points p or all communication devices p of the high-priority communication system that are to be assumed, and the smallest one is the allowable maximum transmission power of the communication device c of the low-priority communication system. Further, in consideration of the maximum transmission power $P_{tx,max,upper}$ specified by the regulations or the communication standard, the minimum value may be the allowable maximum transmission power of the communication device c of the low-priority communication system.

As the calculation of $\hat{P}_{tx,max,p,c,f_c}$, for example, the following calculation may be adopted.

$$\hat{P}_{tx,max,p,c,f_c} = \frac{I_{accept}}{C} \frac{L_{p,c,f_c} A_{ACS,f_p,f_c}}{G_p G_c A_{ACLR,f_p,f_c}} M_c \quad (5)$$

$$\hat{P}_{tx,max,p,c,f_c} = \frac{I_{accept}}{C} \frac{L_{p,c,f_c} A_{ACS,f_p,f_c}}{G_p G_c A_{ACLR,f_p,f_c}} + M_c \quad (6)$$

Here, $M_c$ is an interference margin (or a transmission power margin, a surplus interference margin, a margin, or the like) given to the communication device c of the low-priority communication system. This margin may be the total amount of margins of a plurality of elements. Further, the interference margin may be set as a magnification (first equation) or as an offset amount (second equation).

In a case where there is an abnormality in the calculation of the allowable maximum transmission power in the communication parameter calculation server 40, at least one of the parameters in the above equation may be inappropriate. Therefore, in the present embodiment, by analyzing the calculation results, the parameters used for these calculations are changed/updated, such that normal calculation results are obtained. FIG. 28 illustrates an example of norms for changing/updating various parameters or models when a calculation result is abnormal. In a case where the calculation result is abnormal, a parameter or model is basically changed so as to decrease the allowable maximum transmission power of the communication device of the low-priority communication system. Therefore, for example, in the above equation, parameters in the denominator are changed/updated so as to increase their values. On the other hand, parameters in the numerator are changed so as to decrease their values.

In the change/update of radio wave propagation attenuation, (a) a radio wave propagation attenuation model can be changed/updated, or (b) parameter values in the radio wave propagation attenuation model can be changed/updated (the model itself is not changed).

As for (i) above, in addition to the abnormality in the calculation result, parameters or models used for calculation of a communication parameter may be changed/updated. As an example, the parameters or models may be changed/updated when a normal calculation result is obtained a predetermined number of times or is continuously obtained for a predetermined period of time. In this case, the parameters or models may be changed/updated so that the allowable transmission power of the low-priority communication system is increased, unlike the above case where the calculation result is abnormal. That is, for example, in the above equation, the parameters in the denominator are changed/updated so as to decrease their values. On the other hand, the parameters in the numerator are changed to increase their values.

4-3. Change/Update of Parameter or Model

Figure 29:
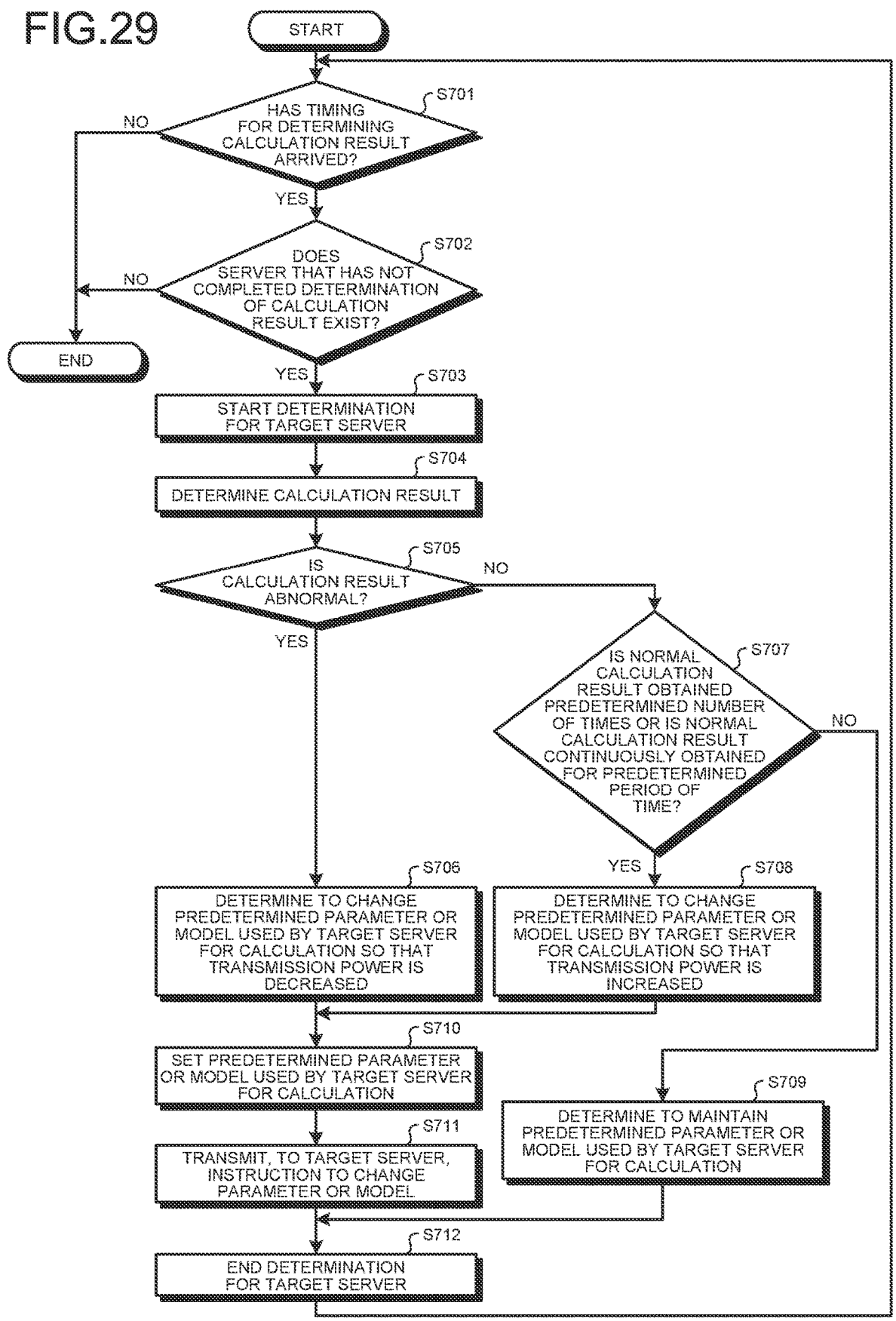
FIG. 29 is a flowchart illustrating an example of determination processing for changing/updating a parameter or model used for calculation with respect to a calculation result.

FIG. 29 is a flowchart illustrating an example of determination processing for changing/updating a parameter or model used for calculation with respect to a calculation result. It is desirable that the determination is performed by each communication parameter calculation server 40. It is a matter of course that a device for centralized management, such as the regulatory management database 60, may perform the determination.

Once a timing for determining a calculation result arrives, the verification unit 445 of the communication parameter calculation server 40 or the regulatory management database 60 determines a calculation result of a server that has not completed the determination (Steps S701 to S704). In a case where the calculation result of the server as a determination target is abnormal (Step S705: Yes), the verification unit 445 determines to change a parameter or model according to the policy as shown in the second column of FIG. 28 (Step S706). On the other hand, in a case where a normal calculation result is obtained a predetermined number of times or is continuously obtained for a predetermined period of time (Step S707: Yes), the control execution unit 446 changes the parameter or model according to the policy as shown in the third column of FIG. 28 (Step S707). In a case where none of these criteria are met (Step S707: No), the verification unit 445 determines to maintain the parameter or model used by the target server for calculation (Step S709).

Then, the control execution unit 446 of the communication parameter calculation server 40 or the regulatory management database 60 changes the parameter or model of the target server according to the determination result, and ends the processing (Steps S710 to S712).

Figure 30:
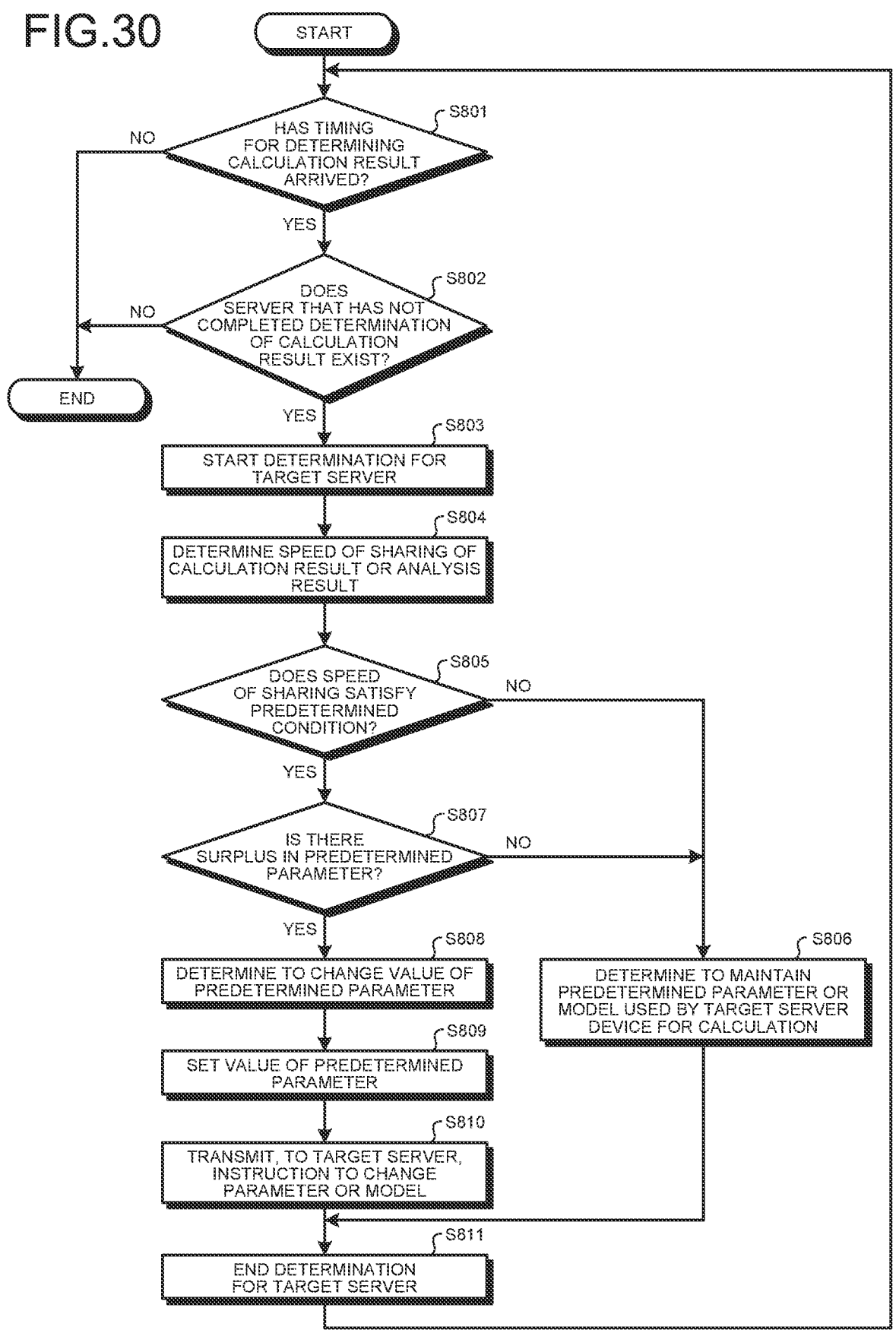
FIG. 30 is a flowchart illustrating another example of the determination processing for changing/updating a parameter for calculation.

As another example of performing the above (i), the communication parameter calculation server 40 or the regulatory management database 60 may change/update a parameter or model used in calculation with respect to the communication parameter calculation server 40 that has performed sharing of a calculation result or a calculation analysis result at a high speed. FIG. 30 is a flowchart illustrating another example of the determination processing for changing/updating a parameter for calculation.

Once a timing for determining a calculation result arrives, the verification unit 445 determines the speed of sharing of a calculation result or analysis result of a server that has not completed the determination (Steps S801 to S804). In the server as a determination target, in a case where the speed of sharing satisfies a predetermined condition and there is a surplus in a predetermined parameter (Step S807: Yes), the verification unit 445 determines to change the parameter or model (Step S808). In the opposite case, the verification unit 445 determines to maintain the parameter or model (Step S806).

Then, the control execution unit 446 changes the parameter or model of the target server according to the determination result, and ends the processing (Steps S809 to S811).

Note that, in this example, it is particularly desirable to change/update a margin value. In a case of other parameters or models, the proportion of contribution to the calculation of interference is large. Therefore, in a case of adopting a determination criterion that is not directly related to the amount of interference as in this example, it is not appropriate to use a predetermined parameter.

In the change of the margin value, specifically, it is desirable to change/update, to a larger value, a margin value used in the calculation by a communication parameter calculation server 40 that performs sharing at a high speed. As a predetermined condition related to the speed, the parameter change may be performed for a server that has performed sharing at the highest speed among a plurality of communication parameter calculation servers 40. As another example, the parameter change may be performed for a communication parameter calculation server 40 of which a time $T_{share}$ taken for sharing is shorter than a predetermined time threshold $T_{share,thr}$ ($T_{share} \leq T_{share,thr}$ or $T_{share} < T_{share,thr}$).

However, in a case of changing the margin, the margin is not given inexhaustibly, and thus it should also be considered whether or not there is a surplus in the calculation of aggregated interference that can change the value of the margin. In a case where there is no surplus, it may be determined that the margin is not changed even in a case where the condition of the sharing time is satisfied.

4-4. Change/Update of Frequency of Communication Parameter Calculation

As for (ii) above, for example, the server or database may increase the frequency of calculation (or shorten a time interval from one calculation to the next calculation) when a significant abnormality is found in a calculation result.

For example, the frequency of calculation that is previously set to once a day (24 hours) is changed to once every 12 hours. Alternatively, in a case where a normal calculation result is continuously obtained for a long period of time (for example, all communication parameter calculation servers 40 (in a group unit, in a case where grouping is performed) obtain normal calculation results A times or more, or continuously obtain normal calculation results for T hours or more (D days or more)), the server or database may decrease the frequency of calculation (or increase the time interval from one calculation to the next calculation). In a case of this procedure, it is basically desirable to perform the procedure for all communication parameter calculation servers 40 (in a group unit, in a case where grouping is performed).

Figure 31:
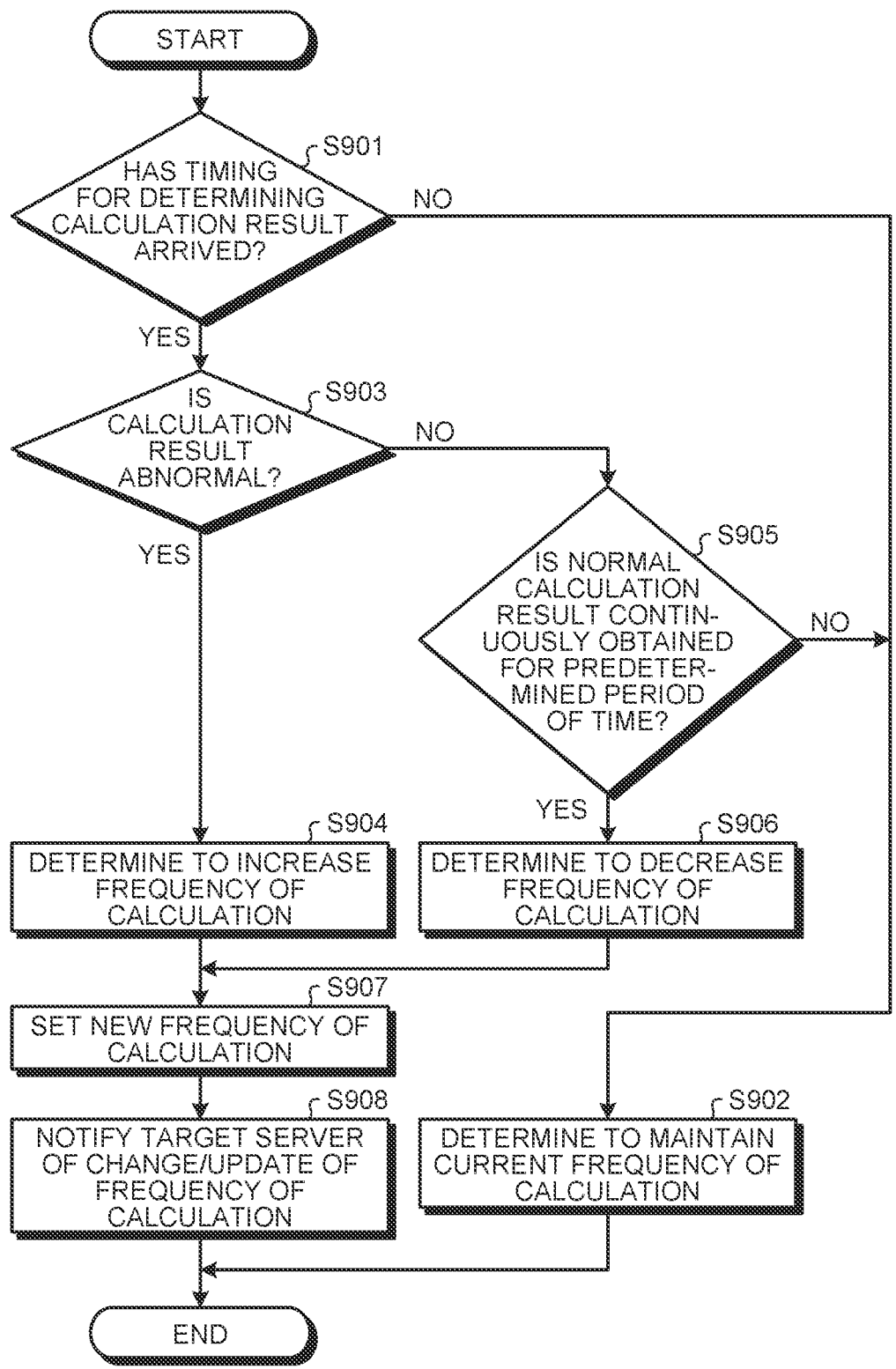
FIG. 31 is a flowchart illustrating an example of processing of determining a change/update of the frequency of communication parameter calculation.

FIG. 31 is a flowchart illustrating an example of processing of determining a change/update of the frequency of communication parameter calculation. For example, it is desirable that the regulatory management database 60 performs the determination. This is because, in a case where the determination itself is performed in a decentralized manner, the frequency of calculation may individually vary eventually, and a stable operation becomes difficult. Note that, as an embodiment, a device (for example, the communication parameter calculation server 40 or the calculation result record database 50) other than the regulatory management database 60 may execute this processing.

First, the verification unit 445 of the communication parameter calculation server 40 or the regulatory management database 60 determines whether or not a timing for determining a calculation result has arrived (Step S901). In a case where the timing for determining the calculation result has not arrived (Step S901: No), the verification unit 445 determines to maintain the current frequency of calculation (Step S902).

In a case where the timing for determining the calculation result has arrived (Step S901: Yes), the verification unit 445 determines whether or not the calculation result of the communication parameter calculation server 40 is abnormal (Step S903). In a case where grouping is performed, the verification unit 445 determines whether or not a calculation result of any of the communication parameter calculation servers 40 in the group is abnormal. In a case where the calculation result is abnormal (Step S903: Yes), the verification unit 445 determines to increase the frequency of calculation performed by the communication parameter calculation server 40 (Step S904).

In a case where the calculation result is not abnormal (Step S903: No), the verification unit 445 determines whether or not a normal calculation result is continuously obtained by the communication parameter calculation server 40 for a predetermined period of time (Step S905). In a case where grouping is performed, the verification unit 445 determines whether or not normal calculation results are continuously obtained by all communication parameter calculation servers 40 in the group for a predetermined period of time. In a case where the normal calculation result is continuously obtained for a predetermined period of time (Step S905: Yes), the verification unit 445 determines to decrease the frequency of calculation performed by the communication parameter calculation server 40. In the opposite case (Step S905: No), the verification unit 445 determines to maintain the current frequency of calculation (Step S902).

Then, the control execution unit 446 of the communication parameter calculation server 40 or the regulatory management database 60 sets the new frequency of calculation on the basis of the determination (Step S907), and notifies the target server of the change/update of the frequency of calculation (Step S908).

Note that a predetermined timing may be set for the determination of the calculation result. For example, a predetermined time after the sharing of the calculation result is started (or completed), or a predetermined time after the sharing of the result of analyzing the calculation result is started (or completed) may be set as a determination period. When not in the determination period, the regulatory management database 60 may determine to maintain the current frequency of calculation and end the operation.

In the example of FIG. 31, a criterion of the determination for changing/updating the frequency of calculation is normality/abnormality of a calculation result. Examples of this calculation result include allowable maximum transmission power of the communication device. Assuming that the allowable transmission power calculated by a server s as a determination target with respect to a certain communication device c as a calculation target is $P_{tx,max,c,s}$, for example, allowable transmission power calculated by at least one of the communication parameter calculation servers can be determined to be abnormal in a case where $P_{tx,max,c,s}$ satisfies a condition shown in the following Equation (7).

$$P_{tx,max,c,s} > P_{tx,max,upper} \quad (7)$$

Here, $P_{tx,max,upper}$ means the upper limit of the abnormal value. Further, as another determination, the allowable transmission power can be determined to be abnormal in a case where $P_{tx,max,c,s}$ satisfies a condition shown in the following Equation (8).

$$P_{tx,max,c,s} < P_{tx,max,lower} \text{ or } P_{tx,max,c,s} > P_{tx,max,upper} \quad (8)$$

Here, $P_{tx,max,lower}$ means the lower limit of the abnormal value. In a case where interference is the problem/issue, it is basically sufficient that only the upper limit value is determined. In the above determination, in a case where there are a plurality of target communication devices, it is desirable to determine that there is an abnormality when the above conditions are satisfied with respect to at least one of the communication devices. Further, in a case where results of multiple times of calculation are shared/recorded for a certain communication device s, it is desirable to determine that there is an abnormality when a result of at least one calculation satisfies the above conditions. When such an abnormality is found, it is determined to increase the frequency of calculation to be higher than the current frequency of calculation with respect to measures of all target communication parameter calculation servers (communication parameter calculation servers 40 of each group in a case where grouping is performed).

As another determination, the frequency of calculation may be decreased when the calculation result is normal. A condition based on which the calculation result is determined to be normal can be, for example, a condition shown in the following Equation (9).

$$P_{tx,max,c,s} < P_{tx,max,upper} \quad (9)$$

Further, as another determination, the calculation result can be determined to be abnormal in a case where $P_{tx,max,c,s}$ satisfies a condition shown in the following Equation (10).

$$P_{tx,max,c,s} \geq P_{tx,max,lower} \text{ and } P_{tx,max,c,s} \leq P_{tx,max,upper} \quad (10)$$

When a normal calculation result is obtained a predetermined number of times or is continuously obtained for a predetermined period of time in all communication parameter calculation servers (communication parameter calculation servers 40 of each group in a case where grouping is performed), it is determined to decrease the frequency of calculation to be lower than the current frequency of calculation.

When it is determined to increase the frequency of calculation or decrease the frequency of calculation, notification/instruction regarding the frequency of calculation after the change/update is made with respect to a target communication parameter calculation server 40. In a case where the current frequency of calculation is maintained, there is no need to notify the target communication parameter calculation server 40. At this time, it is desirable to maintain the current frequency of calculation until the communication parameter calculation server 40 receives notification of a change/update to a new frequency of calculation.

4-5. Stopping Specific Communication Parameter Calculation Server

As for (iii) above, for a server in which a significant abnormality is found in the calculation result, "an operation of a communication device of a wireless system controlled by the server is not allowed" and/or "execution of calculation performed by the server is not allowed" at a timing for a result of analyzing the calculation result and determination, or at a timing for a result of analyzing the calculation result and calculation after determination. Therefore, it is desirable that the determination is performed by each communication parameter calculation server 40. Examples of the "significant abnormality" include an abnormality in an allowable maximum transmission power value calculated for a communication device (for example, the allowable maximum transmission power value is excessively larger or smaller than that calculated by another communication parameter calculation server 40), and an abnormality in a time taken from the start to the end of the calculation (for example, a calculation time is excessively long or short as compared to that of another communication parameter calculation server 40). In particular, it is ideally desirable that a plurality of communication parameter calculation servers 40 obtain the same result of communication parameter calculation. However, it is difficult to expect exactly the same result in a case where there is a factor that causes a difference, such as the use of a random number in the calculation process. For example, the CBRS or Federal SAS of the United States specifies the use of a calculation model called an irregular terrain model (ITM) for aggregated interference calculation. This model expresses received signal power (affected by path loss (propagation loss)) w'(t,l,s) used in the aggregated interference calculation as shown in the following Equation (11) (note that it is a decibel expression).

$$w'(t,l,s) = W_0 + y_s(s) + \delta_L(s)y_L(l) + \delta_T(s)y_T(t) \quad (11)$$

The parameters t, l, and s indicate the time, location, and situation, respectively. W0 is average received power (median) (non-random value), and $y_s(s)$, $y_L(l)$, $y_T(t)$, $\delta_L(s)$, and $\delta_T(s)$ are each a random number. In a case where assumed received signal power (effect of path loss) is an analyzable distribution such as a normal distribution, it can be said that the above random numbers are unnecessary, but in the opposite case, the above random numbers are necessary. For example, in a case of applying the concept of this model to $I_{est,c,fp,fc}(x_p, y_p, z_p, x_c, y_c, z_c)$ described above, the calculation model is as shown in the following Equation (12) (the second and subsequent terms on the right side are the parts that consider the concept of the ITM).

$$I_{est,c,fp,fc}(x_p, y_p, z_p, x_c, y_c, z_c) = \frac{G_p G_c A_{ACLR,fp,fc}}{L_{p,c,fc} A_{ACS,fp,fc}} P_{t,x,c,fc} + \quad (12)$$
$$y_s(s) + \delta_L(s)y_L(x_p, y_p, z_p, x_c, y_c, z_c) + \delta_T(s)y_T(t)$$

Since the above random numbers have different values for each server that performs the calculation, the difference appears in the calculation result of each server. In a case of using such a calculation model, it is highly valuable to incorporate the analysis/determination as in the present invention.

As for the allowable maximum transmission power, a server that outputs an excessively high value as a calculation result may particularly result in serious interference, and thus it is necessary to stop the operation of the communication device of the controlled wireless system and stop the operation of the calculation performed by the server. Further, as for the calculation time, a server that requires an excessive calculation time may hinder the sharing/analysis/determination of the calculation result as in the present invention, which can hinder the stable operation of the communication system targeted by the present invention. Therefore, it is desirable to take measures to stop such a communication parameter calculation server 40 as well.

Figure 32:
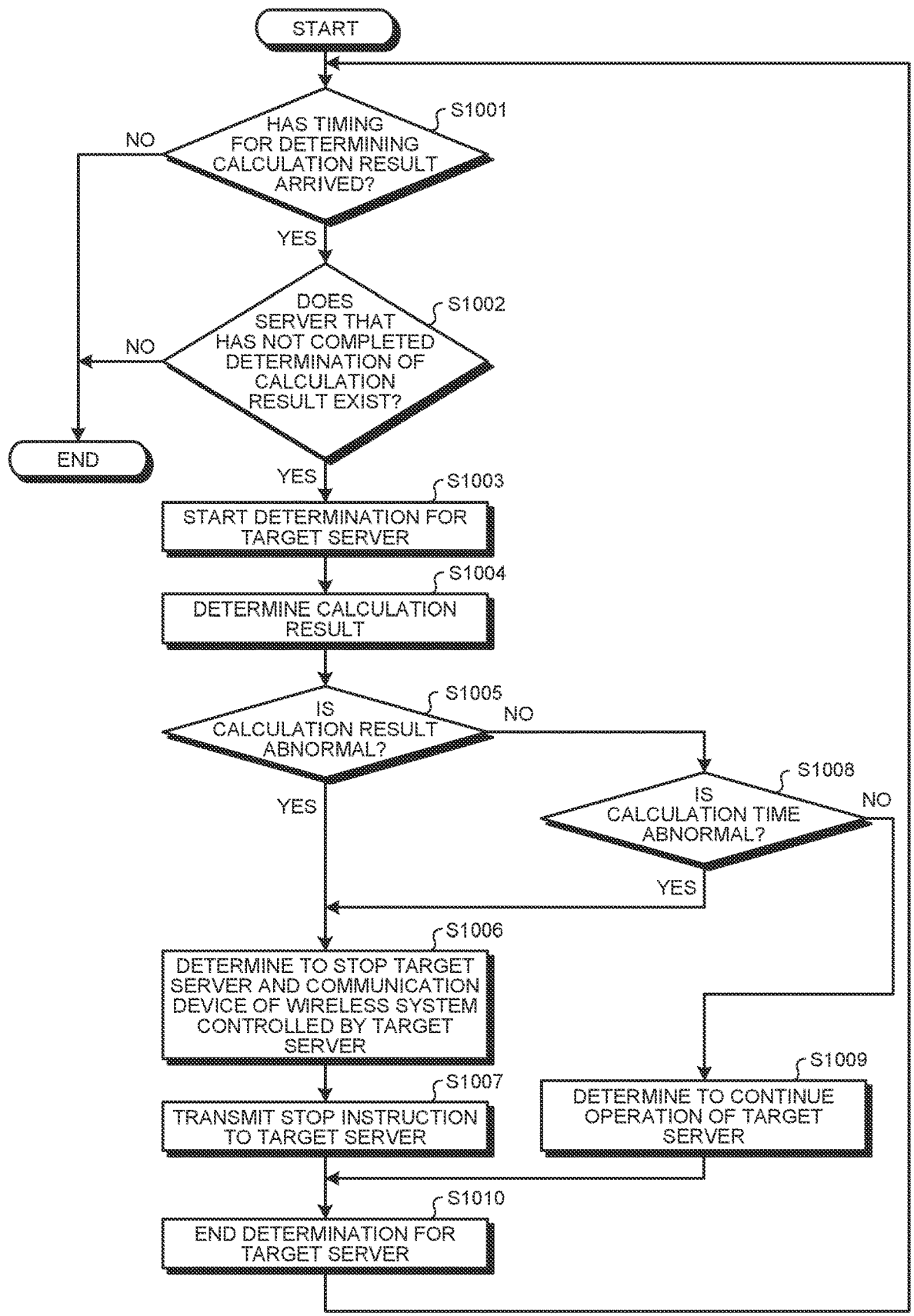
FIG. 32 is a flowchart illustrating an example of processing of determining whether or not the communication parameter calculation server satisfies a stop condition.

In (iii) above, it is desirable that the regulatory management database 60 performs the final determination. This is because in a case where the determination itself is performed in a decentralized manner, the determination of the stop may vary depending on the entity who performs the determination, and a stable operation becomes difficult. It is a matter of course that, as an embodiment, it can be assumed that the communication parameter calculation server 40 performs the determination. FIG. 32 is a flowchart illustrating an example of processing of determining whether or not the communication parameter calculation server 40 satisfies a stop condition.

First, the verification unit 445 of the communication parameter calculation server 40 or the regulatory management database 60 determines whether or not a timing for determining a calculation result has arrived (Step S1001). In a case where the timing for determining the calculation result has not arrived (Step S1001: No), the verification unit 445 ends the processing. In a case where the timing for determining the calculation result has arrived (Step S1001: Yes), whether or not a communication parameter calculation server 40 that has not completed the determination of the calculation result exists is determined (Step S1002). In a case where the communication parameter calculation server 40 that has not completed the determination of the calculation result does not exist (Step S1002: No), the verification unit 445 ends the processing.

In a case where the communication parameter calculation server 40 that has not completed the determination of the calculation result exists (Step S1002: Yes), the verification unit 445 starts the determination for the target communication parameter calculation server 40 (Step S1003). For example, the verification unit 445 determines the calculation result of the target communication parameter calculation server 40 (Step S1004). First, the verification unit 445 determines whether or not the calculation result of the communication parameter calculation server 40 is abnormal (Step S1005).

If the calculation result is abnormal (Step S1005: Yes), the verification unit 445 causes the target communication parameter calculation server 40 to stop a communication device of a wireless system controlled by the target communication parameter calculation server 40, and determines to stop the target communication parameter calculation server 40 (Step S1006). Note that the verification unit 445 does not have to stop the communication parameter calculation server 40, and may only determine to stop the communication device of the wireless system controlled by the communication parameter calculation server 40. Further, the verification unit 445 may only determine to stop the communication parameter calculation server 40. The "communication device of the controlled wireless system" may be paraphrased as the "controlled wireless system". Then, the control execution unit 446 of the communication parameter calculation server 40 or the regulatory management database 60 transmits a stop instruction to the target communication parameter calculation server 40 (Step S1007).

Here, "stopping the operation of the communication device of the wireless system" includes at least an operation of stopping transmission of radio waves of the target communication device. Note that "stopping the operation of the communication device of the wireless system" may include an operation of stopping reception of radio waves of the target communication device. That is, operations of the communication device of the wireless system other than the transmission and reception of radio waves do not necessarily have to be stopped. Further, it is desirable that radio waves of which transmission and reception are stopped are those in a frequency band where frequency sharing is performed. That is, the transmission and reception of the radio waves in the frequency band where the frequency sharing is not performed are not stopped, and the communication device of the wireless system may continue to transmit and receive the radio waves in the frequency band where the frequency sharing is not performed. The operation in this case is also included in "stopping the operation of the communication device of the wireless system".

In a case where the calculation result is not abnormal (Step S1005: No), the verification unit 445 determines whether or not a calculation time of the target communication parameter calculation server 40 is abnormal (Step S1008). If the calculation time is abnormal (Step S1008: Yes), the verification unit 445 causes the communication parameter calculation server 40 to stop the communication device of the wireless system controlled by the communication parameter calculation server 40, and determines to stop the target communication parameter calculation server 40 (Step S1006). Note that the verification unit 445 does not have to stop the communication parameter calculation server 40, and may only determine to stop the communication device of the wireless system controlled by the communication parameter calculation server 40. Further, the verification unit 445 may only determine to stop the communication parameter calculation server 40. Then, the control execution unit 446 transmits a stop instruction to the target communication parameter calculation server 40 (Step S1007). In the opposite case (Step S1008: No), the verification unit 445 determines to continue the operation of the target communication parameter calculation server 40 (Step S1009). Then, the control execution unit 446 ends the determination for the target communication parameter calculation server 40 (Step S1010).

Note that a predetermined timing may be set for the determination of the calculation result. For example, a predetermined time after the sharing of the calculation result is started (or completed), or a predetermined time after the sharing of the result of analyzing the calculation result is started (or completed) may be set as a determination period. Then, the regulatory management database 60 may end the determination when not in the determination period. Further, the regulatory management database 60 may end the determination even when the determination is completed for all the communication parameter calculation servers 40 that can be the targets of the determination during the determination period.

In the example of FIG. 32, in a case where a server that can be the target of determination exists, whether or not there is an abnormality in calculation of the server is determined. In the flowchart of FIG. 32, a calculation result of a server (normality/abnormality of a calculated communication parameter value) and normality/abnormality of a time required for the calculation are determined. Further, in FIG. 32, the regulatory management database 60 notifies (instructs) the target server to stop the operation when at least one of the calculation result or the time required for the calculation is abnormal. Note that, in addition to the example in FIG. 32, in a case where there are multiple criteria for determining normality/abnormality, a stop notification may be made when there are a predetermined number B or more abnormalities, or when there are abnormalities in all the criteria.

As for the normality/abnormality of the calculation result, for example, a value of the calculated allowable maximum transmission power can be determined. Assuming that the allowable transmission power calculated by a server as a determination target with respect to a certain communication device c as a calculation target is $P_{tx,max,c,s}$, for example, the allowable transmission power can be determined to be abnormal in a case where $P_{tx,max,c,s}$ satisfies a condition shown in the following Equation (13).

$$P_{tx,max,c,s} > P_{tx,max,upper} \quad (13)$$

Here, $P_{tx,max,upper}$ means the upper limit of the normal value. Further, as another determination, the allowable transmission power can be determined to be abnormal in a case where the $P_{tx,max,c,s}$ satisfies a condition shown in the following Equation (14).

$$P_{tx,max,c,s} < P_{tx,max,lower} \text{ or } P_{tx,max,c,s} > P_{tx,max,upper} \quad (14)$$

Here, $P_{tx,max,lower}$ means the lower limit of the normal value. In a case where interference is the problem/issue, it is basically sufficient that only the upper limit value is determined. In the above determination, in a case where there are a plurality of target communication devices c, it is desirable to determine that there is an abnormality when the above conditions are satisfied with respect to at least one of the communication devices. Further, in a case where results of multiple times of calculation are shared/recorded for a certain communication device s, it is desirable to determine that there is an abnormality when a result of at least one calculation satisfies the above conditions.

As for the normality/abnormality in the time required for the calculation, assuming that a time taken for the n-th (a count of the number of times of calculation common to servers or the number of times of calculation individually counted for each server) calculation performed by the server s as a determination target is $T_{calc,s,n}$, the calculation time can be determined to be abnormal in a case where $T_{calc,s,n}$ satisfies a condition shown in the following Equation (15).

$$T_{calc,s,n} > T_{calc,upper} \quad (15)$$

Here, $T_{calc,upper}$ means the upper limit of the normal value. Further, as another determination, the calculation time can be determined to be abnormal in a case where $T_{calc,s,n}$ satisfies the following condition.

$$T_{calc,s,n} < T_{calc,lower} \text{ or } T_{calc,s,n} > T_{calc,upper} \tag{16}$$

Here, $T_{calc,lower}$ means the lower limit of the normal value. Only the regulatory management database 60 may have the values Of $P_{tx,max,upper}$, $P_{tx,max,lower}$, $T_{calc,upper}$, and $T_{calc,lower}$, or the regulatory management database 60 may notify the communication parameter calculation server 40 of the values of $P_{tx,max,upper}$, $P_{tx,max,lower}$, $T_{calc,upper}$, and $T_{calc,lower}$ (for example, the regulatory management database 60 may notify the communication parameter calculation server 40 at the time of registration, before and after the start of calculation, after sharing, or the like).

Even in a case where the above verification is performed, there is also a possibility that no abnormality is observed in the calculation. For example, it is assumed that the communication device may malfunction due to a failure or the like. Therefore, in such a case, it is desirable to notify an operator (a business operator, an individual, an infrastructure manager, or the like) of the communication device. As a notification means, for example, automatic notification by a dedicated API or e-mail is assumed.

5. Modified Example

The above-described embodiment shows an example, and various modifications and applications are possible.

5-1. Modified Example Related to System Configuration

The communication parameter calculation server 40 of the present embodiment is not limited to the device described in the above-described embodiment. For example, the communication parameter calculation server 40 may be a device having a function other than controlling the communication device 20 that secondarily uses a frequency band where frequency sharing is performed. For example, a network manager may have the function of the communication parameter calculation server 40 of the present embodiment. In this case, the network manager may be, for example, a centralized base band unit (C-BBU) having a network configuration called a centralized radio access network (C-RAN) or a device including the same. Further, a base station (including an access point) may have the function of the network manager. These devices (the network manager and the like) can also be regarded as communication control devices.

Note that, in the above-described embodiment, the communication system 1 is the first wireless system and the communication device 20 is the second wireless system. However, the first wireless system and the second wireless system are not limited to this example. For example, the first wireless system may be a communication device (for example, the communication device 10), and the second wireless system may be a communication system (the communication system 2). Note that the wireless system appearing in the present embodiment is not limited to a system including a plurality of devices, and can be appropriately replaced with a "device", a "terminal", or the like.

Further, in the above-described embodiment, the communication parameter calculation server 40 is a device that does not belong to the communication system 2, but may be a device that belongs to the communication system 2. The communication parameter calculation server 40 does not have to directly control the communication device 20, and may indirectly control the communication device 20 via a device included in the communication system 2. Further, the number of secondary systems (communication systems 2) may be plural. In this case, the communication parameter calculation server 40 may manage a plurality of secondary systems. In this case, each secondary system can be regarded as the second wireless system.

Note that, in frequency sharing, an incumbent system that uses a target band is generally called the primary system, and a secondary user is called the secondary system, but the primary system and the secondary system may be replaced with other terms. A macrocell in a heterogeneous network (HetNET) may be the primary system, and a small cell or relay station may be the secondary system. Further, a base station may be the primary system, and a relay UE or vehicle UE that realizes D2D or vehicle-to-everything (V2X) in a coverage of the base station may be the secondary system. The base station is not limited to a fixed type, but may be a portable type/mobile type.

Furthermore, an interface between respective entities may be a wired interface or a wireless interface. For example, an interface between respective entities (the communication devices 10 and 20, the terminal device 30, the communication parameter calculation server 40, the calculation result record database 50, and the regulatory management database 60) that appear in the present embodiment may be a wireless interface that does not depend on frequency sharing. Examples of the wireless interface that does not depend on frequency sharing include a wireless interface provided by a mobile communication operator via a licensed band, and wireless LAN communication that uses an existing unlicensed band.

5-2. Communication Parameter Calculation Server

In detail, it is desirable that the communication parameter calculation server 40 has the function of each of a calculation execution device and a calculation result recording device. Here, the calculation execution device is a device having a function of executing calculation of a communication parameter, and is a device having a function of recording a calculation result. It is a matter of course that it is possible to realize these functions as one physical device, but in view of recent hardware and software mounting technologies, other implementation forms are also conceivable.

Figure 33:
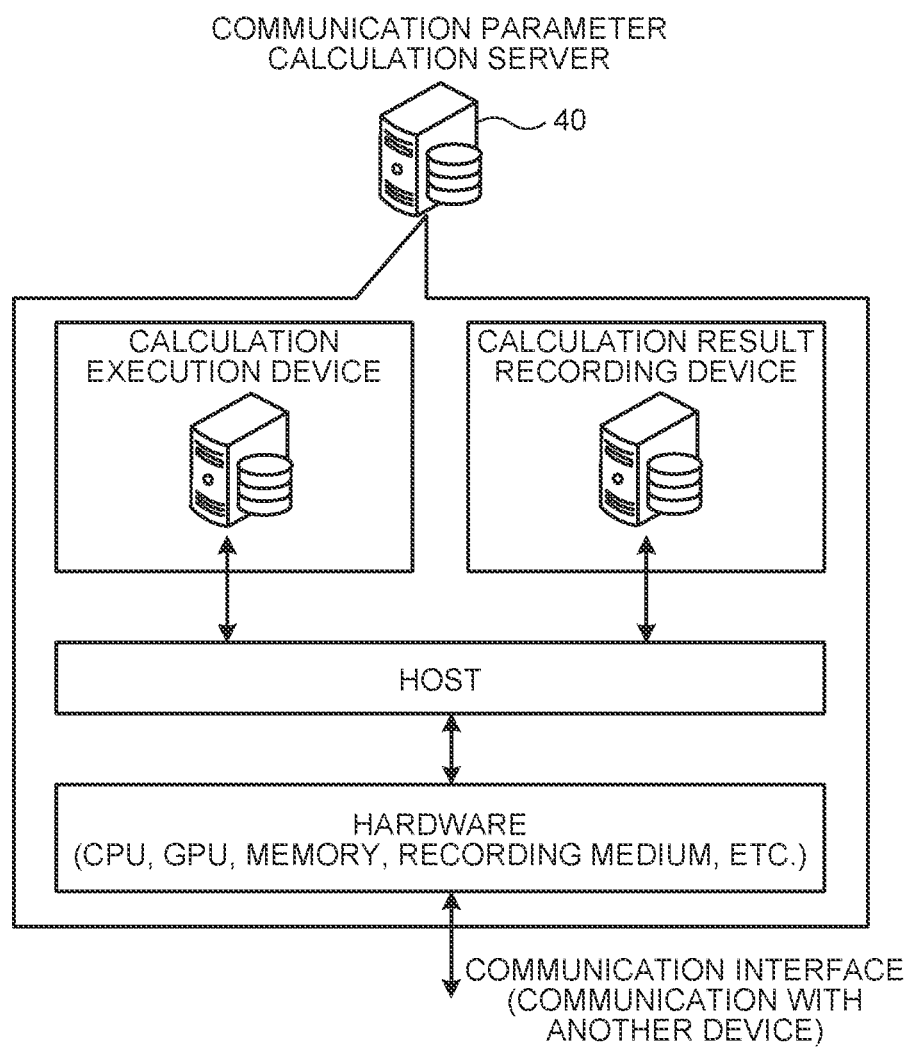
FIG. 33 is a diagram illustrating an example of a configuration of a communication parameter calculation server implemented by a plurality of devices.

FIG. 33 is a diagram illustrating an example of a configuration of the communication parameter calculation server 40 implemented by a plurality of devices. In implementing the communication parameter calculation server 40 of the present embodiment, the calculation execution device and the calculation result recording device can also be implemented as different devices logically (or virtually) at the software level on one device. Specifically, hardware resources such as a CPU, a GPU, a memory, and a recording medium are shared by these logical (virtual) devices. On the other hand, it is desirable that the calculation execution device and the calculation result recording device use virtualization technology such as a virtual machine (VM), a container, or docker. By adopting such a form, it is possible to perform maintenance or the like while handling the calculation execution device and the calculation result recording device separately, at least when a software problem occurs, thereby obtaining an operational benefit. It is a matter of course that the communication parameter calculation server 40 may be physically implemented by a plurality of devices.

Figure 34:
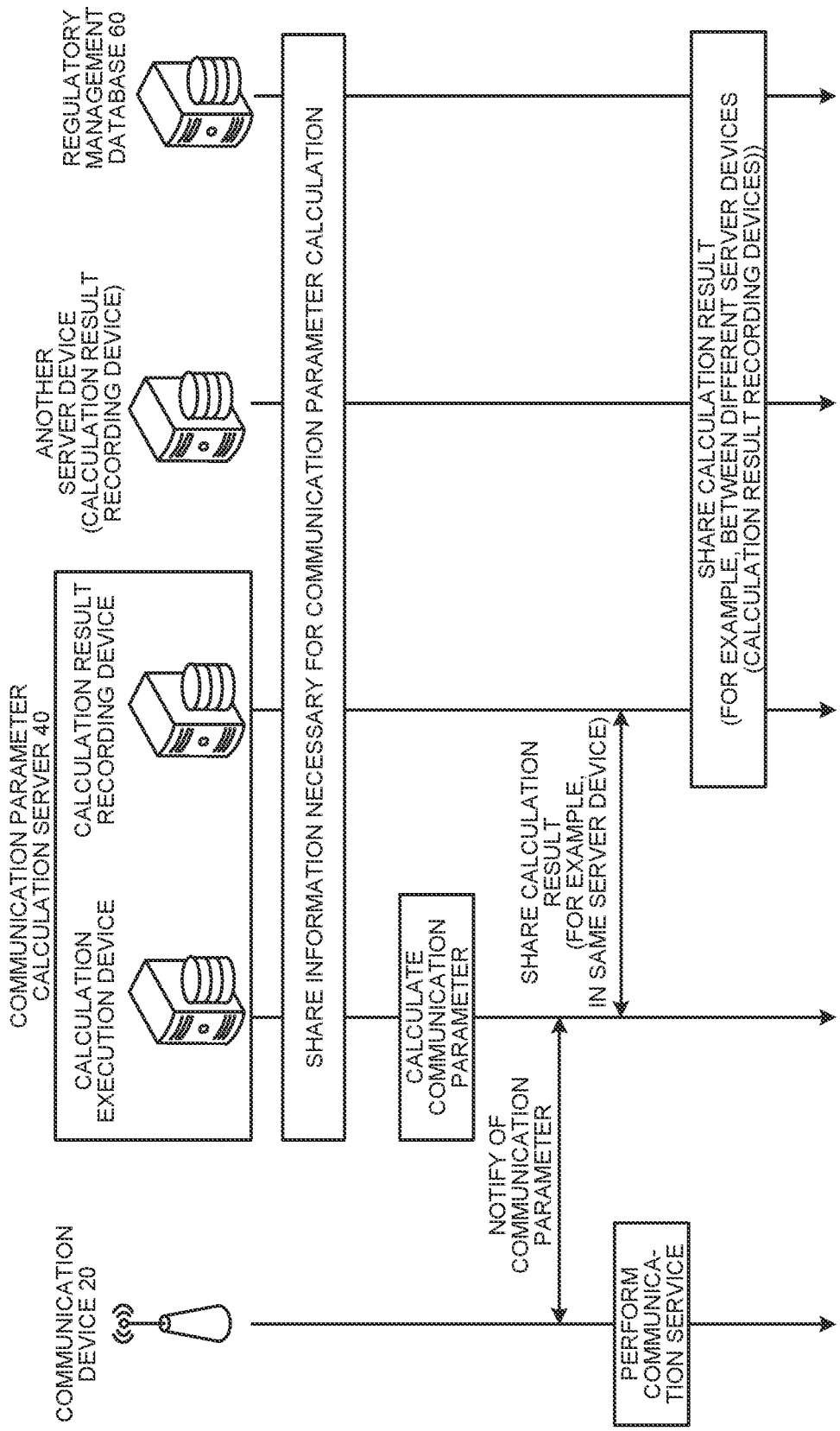
FIG. 34 is a sequence diagram illustrating an example of a calculation result sharing procedure when the communication parameter calculation server is implemented by a plurality of devices.

FIG. 34 is a sequence diagram illustrating an example of a calculation result sharing procedure when the communication parameter calculation server 40 is implemented by a plurality of devices (the calculation execution device and the calculation result recording device). This is an example corresponding to FIG. 10 above.

In a case where the communication parameter calculation server 40 is implemented by a plurality of logical devices, a result of communication parameter calculation performed by the calculation execution device may be shared (transmitted) directly by the calculation execution device with another server (to another server), but before that, it is desirable to share the result with the calculation result recording device in the same server. It is also desirable that the calculation result is shared between the communication parameter calculation servers via the calculation result recording device. In the example of FIG. 34, a new procedure between the logical calculation execution device and the logical calculation result recording device is added, unlike the example of FIG. 10. The sharing with another server is a procedure between the calculation result recording devices. By doing so, it is possible to clearly allocate the function related to the sharing of the result to the calculation result recording device.

Figure 35:
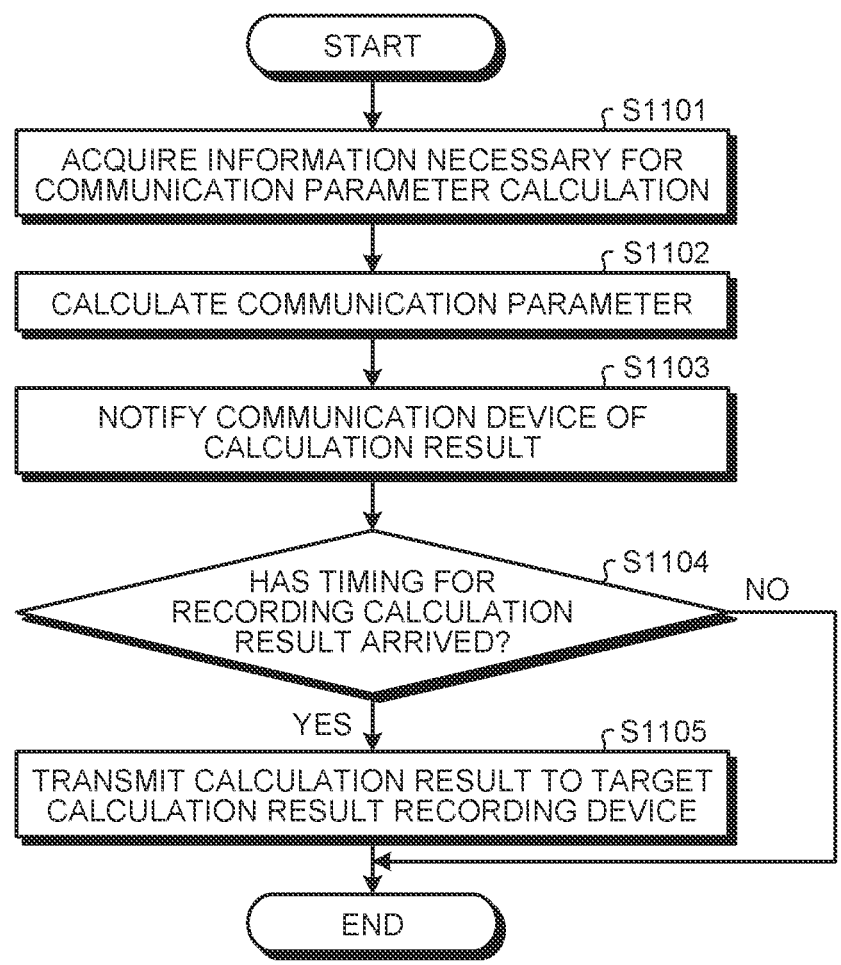
FIG. 35 is a flowchart illustrating an example of processing executed by a calculation execution device when the communication parameter calculation server is implemented by a plurality of devices.
Figure 36:
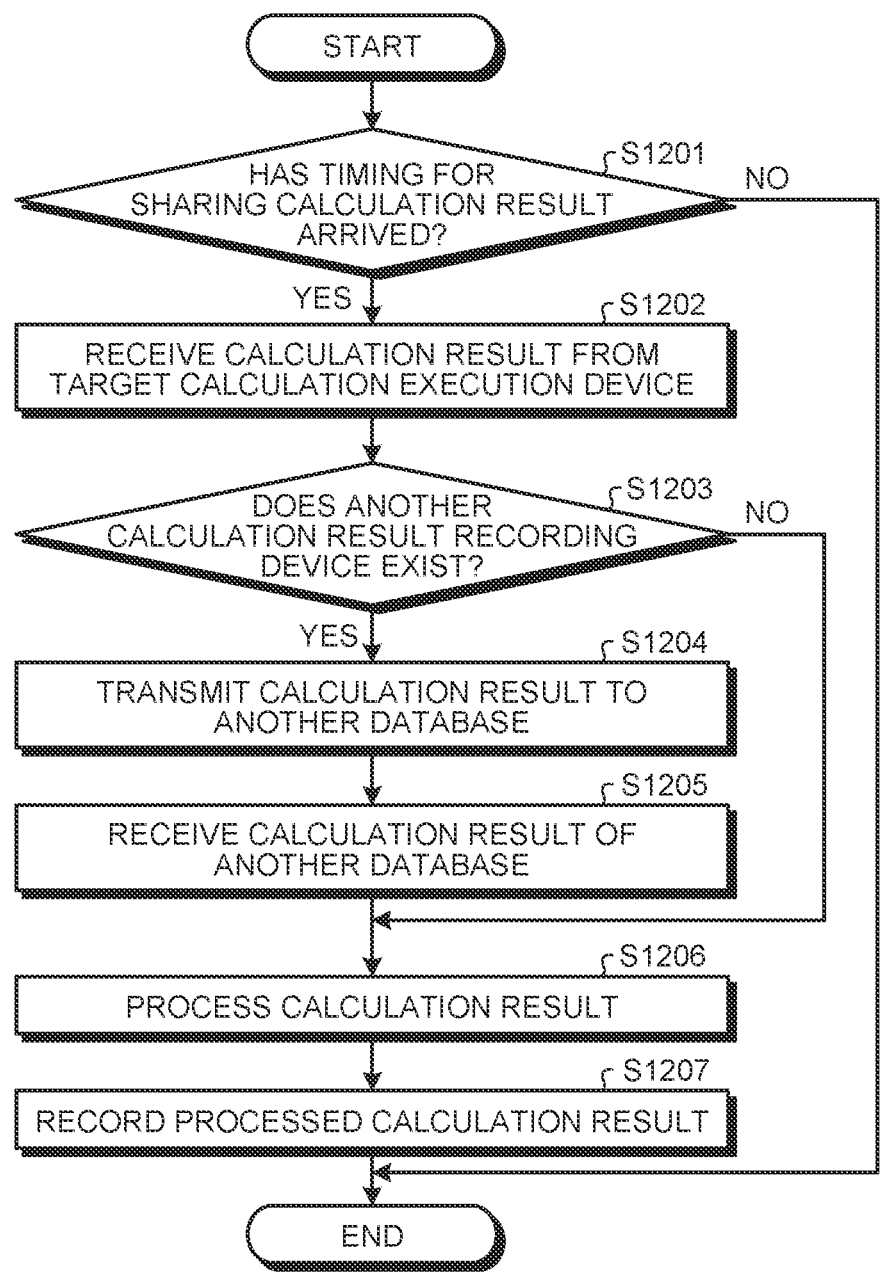
FIG. 36 is a flowchart illustrating an example of processing executed by a calculation result recording device when the communication parameter calculation server is implemented by a plurality of logical devices.

FIG. 35 is a flowchart illustrating an example of processing executed by the calculation execution device when the communication parameter calculation server 40 is implemented by a plurality of devices. FIG. 36 is a flowchart illustrating an example of processing executed by the calculation result recording device when the communication parameter calculation server 40 is implemented by a plurality of logical devices. The processing of FIGS. 35 and 36 relate to the processing illustrated in FIG. 14 or 17 above. In particular, the calculation and sharing operation, which is a continuous flow in FIG. 14, are separated into operations of the respective logical devices.

First, the processing of the calculation execution device will be described with reference to FIG. 35. First, the calculation execution device acquires information necessary for communication parameter calculation (Step S1101). Then, the calculation execution device performs the calculation of the communication parameter (Step S1102). Then, the calculation execution device notifies the communication device 20 of a calculation result (Step S1103). Next, the calculation execution device determines whether or not the calculation result is a recording timing (Step S1104). In a case where the calculation result is not the recording timing, (Step S1104: No), the calculation execution device ends the processing. In a case where the calculation result is the recording timing (Step S1104: Yes), the calculation execution device transmits the calculation result to a target calculation result recording device (Step S1105). Then, the calculation execution device ends the processing.

Next, the processing of the calculation result recording device will be described with reference to FIG. 36. First, the calculation result recording device determines whether or not a timing for sharing the calculation result has arrived (Step S1201). In a case where the timing for sharing the calculation result has not arrived (Step S1201: No), the calculation result recording device ends the processing. In a case where the timing for recording the calculation result has arrived (Step S1201: Yes), the calculation execution device receives the calculation result from the target calculation result recording device (Step S1202). Then, the calculation result recording device checks whether or not another calculation result recording device exists (Step S1203). In a case where another calculation result recording device does not exist (Step S1203: No), the calculation result recording device skips the procedure for sharing the calculation result.

In a case where another calculation result recording device exists (Step S1203: Yes), the calculation result recording device transmits the calculation result to another database (calculation result recording device) (Step S1204). Further, the calculation result recording device receives a calculation result from another data database (calculation result recording device) (Step S1205). Then, the calculation result recording device processes the received calculation result and the calculation result thereof (Step S1206), and records the processed calculation results (Step S1207). The calculation result recording device ends the processing once the recording of the calculation results is completed.

5-3. Example of Correspondence Between Device of Present Embodiment and Standards/Regulations Even in a case of having the same function, the communication parameter calculation server and the communication device of the present embodiment can each have a name that varies for each communication system to which they are to be applied. FIG. 37 illustrates names in IEEE 802.11af and the CBRS as typical examples. Note that the names of the communication parameter calculation server and the communication device are not limited to the example illustrated in FIG. 37.

5-4. Giving Incentive

The regulatory management database 60 may give an incentive to the communication parameter calculation server 40 in order to promote sharing of a calculation result. For example, after the sharing (Step S106) of the calculation result illustrated in FIGS. 10 to 13, the regulatory management database 60 may give an incentive to a communication parameter calculation server 40 (or an operator of the communication parameter calculation server 40) that has shared (or transmitted) a calculation result or has not shared (or transmitted) a calculation result.

The incentive giving operation performed by the regulatory management database 60 may be, for example, transmission of information regarding an incentive for a corresponding communication parameter calculation server 40 or an operator thereof (information on increase/decrease in the interference margin to be given or information on increase/decrease in the number of registrable devices). Further, the incentive giving operation may be a change of setting related to the communication parameter calculation server 40 (for example, a change of setting related to radio resource allocated to the communication parameter calculation server 40) in the regulatory management database 60.

Note that the incentive may be an award or a penalty. For example, the regulatory management database 60 gives an award to a communication parameter calculation server 40 that satisfies a predetermined condition. The following conditions (A1) to (A3) can be assumed as conditions corresponding to the award. It is a matter of course that the conditions corresponding to the award are not limited to the following conditions (A1) to (A3).

(A1) (In a case of sharing of a calculation result in a distributed manner) a storage unit that records a calculation result is included.

(A2) The calculation of the communication parameter is completed within a predetermined time.

(A3) The sharing of the calculation result is completed within a predetermined time, or the sharing of the calculation result is completed within a predetermined order among all databases (all communication parameter calculation servers).

Further, the regulatory management database 60 gives a penalty to a communication parameter calculation server 40 that satisfies a predetermined condition. The following conditions (B1) to (B3) can be assumed as conditions corresponding to the penalty. It is a matter of course that the conditions corresponding to the penalty are not limited to the following conditions (B1) to (B3).

(B1) The calculation result is not within a predetermined error range. 5(B2) The calculation of the communication parameter is not completed within a predetermined time.

(B3) The calculation result is not shared.

For example, the following C1 to C4 are assumed as the incentives (awards or penalties) given to the communication parameter calculation server 40 by the regulatory management database 60.

(C1) A margin of transmission power may be given (award) or decreased (penalty).

(C2) The number of registered CBSDs may be virtually increased (award).

(C3) The number of frequency channels that may be used is increased (award) or decreased (penalty).

(C4) Deregistration (penalty) or retest (penalty) is performed.

Note that the regulatory management database 60 may be configured to simultaneously determine the communication parameter calculation server 40 corresponding to the award and the communication parameter calculation server 40 corresponding to the penalty. Further, the regulatory management database 60 may be configured to determine only the communication parameter calculation server 40 corresponding to the award. Further, the regulatory management database 60 may be configured to determine only the communication parameter calculation server 40 corresponding to the award.

Note that, although the regulatory management database 60 determines the incentive given to the communication parameter calculation server 40 in the above description, but the communication parameter calculation server 40 may perform determination for giving an incentive (or an award) to itself and other servers. In this case, a plurality of communication parameter calculation servers 40 may each perform determination for giving an incentive. Then, the communication parameter calculation server 40 may use, as a final determination result, the most frequent determination result among determination results of the plurality of communication parameter calculation servers 40. Even in a case where there is no device for centralized management such as the regulatory management database 60, it is possible to promote the sharing of the calculation result.

5-5. Other Modified Examples

The control device that controls the communication device 10, the communication device 20, the terminal device 30, the communication parameter calculation server 40, the calculation result record database 50, or the regulatory management database 60 of the present embodiment may be implemented by a dedicated computer system or may be implemented by a general-purpose computer system.

For example, a communication program for performing the above-described operations is stored in a computer-readable recording medium such as an optical disk, a semiconductor memory, a magnetic tape, or a flexible disk, and distributed. Then, for example, the control device is configured by installing the program in a computer and executing the above processing. At this time, the control device may be a device (for example, a personal computer) outside the communication device 10, the communication device 20, the terminal device 30, the communication parameter calculation server 40, the calculation result record database 50, or the regulatory management database 60. Further, the control device may be a device (for example, the control unit 24, the control unit 34, the control unit 44, the control unit 54, or the control unit 64) inside the communication device 10, the communication device 20, the terminal device 30, the communication parameter calculation server 40, the calculation result record database 50, or the regulatory management database 60.

Further, the communication program may be stored in a disk device included in a server device on a network such as the Internet, and be downloaded to a computer. Further, the functions described above may be realized by cooperation between an operating system (OS) and application software. In this case, the part other than the OS may be stored in a medium and distributed, or the part other than the OS may be stored in the server device and downloaded to a computer.

Further, among the respective processing described in the above-described embodiment, all or some of the processing described as being automatically performed can be manually performed. Alternatively, all or some of the processing described as being manually performed can be automatically performed by a known method. In addition, the processing procedures, specific names, information including various data and parameters illustrated in the specification and drawings can be arbitrarily changed unless otherwise specified. For example, various information illustrated in each drawing is not limited to the illustrated information.

Further, each illustrated component of each device is functionally conceptual, and does not necessarily have to be configured physically as illustrated in the drawings. That is, the specific modes of distribution/integration of the respective devices are not limited to those illustrated in the drawings. All or some of the devices can be functionally or physically distributed/integrated in any arbitrary unit, depending on various loads or the status of use.

Further, the above-described embodiments can be appropriately combined as long as the processing contents do not contradict each other. Further, the order of each step illustrated in the sequence diagram or the flowchart of the present embodiment can be changed as appropriate.

6. Conclusion

According to the present embodiment, it is possible to detect a server that outputs an abnormal calculation result at an early stage. This makes it possible to quickly analyze why the interference of the low-priority communication system with the high-priority communication system occurs, and as a result, the operation of both the low-priority communication system and the high-priority communication system can be stably performed. As a result, the problem hardly occurs, and even when the problem occurs, the problem can be immediately corrected or resolved, such that wireless resources can be used efficiently.

In addition, according to the present embodiment, it is possible to objectively clarify which server is faster in calculation (especially when sharing in a distributed manner). As a result, end users (for example, consumer users and mobile network operators who use the communication parameter calculation server) who use/operate the communication device can select, as a connection destination, an excellent server (and a server business operator that operates the server). This is especially effective when it is necessary to keep the frequency of calculation of a communication parameter high.

The effect of preventing falsification of a calculation result by sharing the calculation result can be expected. For example, the end user may desire that as much transmission power as possible is allocated in order to achieve a high communication quality. On the other hand, a server business operator may desire to allocate an unreasonably large transmission power (inappropriate communication parameter) for the purpose of providing convenience to end users who use the server thereof, because profits can be increased by having as many end users who use the server thereof as possible. As described above, since there is a problem of interference with the high-priority communication system in the background of the present invention, an unreasonably large transmission power causes the interference problem. By sharing a calculation result according to the present invention, respective servers can mutually monitor calculation results thereof, and such unfair acts can be prevented. As a result, sound competition of server business operators can be encouraged.

Although the respective embodiments of the present disclosure have been described above, the technical scope of the present disclosure is not limited to the above-described embodiments, and various modifications can be made without departing from the scope of the present disclosure. Moreover, components of different embodiments and modified examples may be appropriately combined.

Further, the effects in each embodiment described in the present specification are merely examples. The effects of the present disclosure are not limited thereto, and other effects may be obtained.

Note that the present technology can also have the following configurations.

(1)
An information processing device comprising:
an acquisition unit that acquires information on a second wireless system that performs wireless communication by using radio waves in a frequency band used by a first wireless system;
a determination unit that determines a communication parameter of the second wireless system on the basis of the information on the second wireless system that is acquired by the acquisition unit; and
a notification unit that notifies another information processing device of the communication parameter determined by the determination unit.

(2)
The information processing device according to (1), wherein
the determination unit determines the communication parameter of the second wireless system at a predetermined timing, and
the notification unit notifies the another information processing device of the communication parameter of the second wireless system each time the determination unit determines the communication parameter.

(3)
The information processing device according to (1), wherein the determination unit determines the communication parameter of the second wireless system at a predetermined timing, and
the notification unit notifies the another information processing device of the communication parameter of the second wireless system each time determination of the communication parameter is performed multiple times.

(4)
The information processing device according to (3), wherein
the notification unit notifies the another information processing device of the communication parameter of the second wireless system each time the number of times of communication parameter determination performed by the determination unit reaches a predetermined number of times.

(5)
The information processing device according to (3), wherein
the another information processing device determines the communication parameter of the second wireless system at the predetermined timing, and
the notification unit holds a count of the number of times of determination of the communication parameter, the count being common to the information processing device and the another information processing device, and notifies the another information processing device of the communication parameter of the second wireless system each time the count reaches a predetermined number of times.

(6)
The information processing device according to any one of (1) to (5), wherein
the acquisition unit acquires information on the second wireless system controlled by the information processing device.

(7)
The information processing device according to any one of (1) to (5), wherein
the acquisition unit acquires information on the second wireless system controlled by another information processing device.

(8)
The information processing device according to any one of (1) to (7), wherein
the another information processing device is a device that determines a communication parameter of another second wireless system.

(9)
The information processing device according to any one of (1) to (8), further comprising
a processing unit that performs processing for preventing falsification on at least a part of information on the communication parameter determined by the determination unit,
wherein the notification unit notifies the another information processing device of a communication parameter subjected to the processing for preventing falsification.

(10)
The information processing device according to (9), wherein
the processing unit adds a hash of at least a part of the information on the communication parameter determined by the determination unit to the information on the communication parameter.

(11)
The information processing device according to (9), wherein
the processing unit inserts a digital watermark to at least a part of the information on the communication parameter determined by the determination unit.

(12)
An information processing device comprising:
an acquisition unit that acquires information on a communication parameter of a second wireless system from one or more communication parameter determination devices that determine the communication parameter of the second wireless system performing wireless communication by using radio waves in a frequency band used by a first wireless system;
a verification unit that verifies whether or not the communication parameter acquired by the acquisition unit satisfies a predetermined condition; and
a control execution unit that performs a predetermined control on the basis of a result of the verification performed by the verification unit.

(13)
The information processing device according to (12), wherein
the control execution unit requests at least one of the one or more communication parameter determination devices to perform a predetermined operation on the basis of the result of the verification performed by the verification unit.

(14)
The information processing device according to (13), wherein
the verification unit specifies a communication parameter determination device that has performed an abnormal calculation on the basis of the information on the communication parameter that is acquired by the acquisition unit, and
the control execution unit requests the communication parameter determination device that has performed an abnormal calculation to perform a predetermined operation.

(15)
The information processing device according to (14), wherein
the verification unit specifies a communication parameter determination device whose calculation result is abnormal on the basis of the information on the communication parameter that is acquired by the acquisition unit.

(16)
The information processing device according to (14), wherein
the verification unit specifies a communication parameter determination device whose calculation time is abnormal on the basis of the information on the communication parameter that is acquired by the acquisition unit.

(17)
The information processing device according to any one of (14) to (16), wherein
the control execution unit requests the communication parameter determination device that has performed an abnormal calculation to stop an operation of a second wireless system controlled by the communication parameter determination device.

(18)
The information processing device according to any one of (14) to (17), in which
the control execution unit requests the communication parameter determination device that has performed an abnormal calculation to stop the operation.

(19)
The information processing device according to any one of (14) to (16), wherein
the control execution unit requests the communication parameter determination device that has performed an abnormal calculation to change a frequency of communication parameter calculation.

(20)
The information processing device according to any one of (14) to (19), wherein
the control execution unit performs an operation of giving an incentive to the communication parameter determination device whose result of the verification performed by the verification unit satisfies a predetermined condition, or an operator of the communication parameter determination device.

(21)
An information processing method, by an information processing device, comprising:
acquiring information on a second wireless system that performs wireless communication by using radio waves in a frequency band used by a first wireless system;
determining a communication parameter of the second wireless system on the basis of the acquired information on the second wireless system; and
notifying another information processing device of the determined communication parameter.

(22)
An information processing method including:
acquiring information on a communication parameter of a second wireless system from one or more communication parameter determination devices that determine the communication parameter of the second wireless system performing wireless communication by using radio waves in a frequency band used by a first wireless system;
verifying whether or not the acquired communication parameter satisfies a predetermined condition; and
performing a predetermined control on the basis of a result of the verification.

(23)
An information processing program for causing a computer that controls an information processing device to function as:
an acquisition unit that acquires information on a second wireless system that performs wireless communication by using radio waves in a frequency band used by a first wireless system;
a determination unit that determines a communication parameter of the second wireless system on the basis of the information on the second wireless system that is acquired by the acquisition unit; and
a notification unit that notifies another information processing device of the communication parameter determined by the determination unit.

(24)
An information processing program for causing a computer to function as:
an acquisition unit that acquires information on a communication parameter of a second wireless system from one or more communication parameter determination devices that determine the communication parameter of the second wireless system performing wireless communication by using radio waves in a frequency band used by a first wireless system;

a verification unit that verifies whether or not the communication parameter acquired by the acquisition unit satisfies a predetermined condition; and a control execution unit that performs a predetermined control on the basis of a result of the verification performed by the verification unit.

REFERENCE SIGNS LIST

100 SYSTEM MODEL
1, 2, 2a, 2b, 2c COMMUNICATION SYSTEM
10, 20 COMMUNICATION DEVICE
30 TERMINAL DEVICE
40 COMMUNICATION PARAMETER CALCULATION SERVER
50 CALCULATION RESULT RECORD DATABASE
60 REGULATORY MANAGEMENT DATABASE
21, 31, 41, 51, 61 WIRELESS COMMUNICATION UNIT
22, 32, 42, 52, 62 STORAGE UNIT
23, 43, 53, 63 NETWORK COMMUNICATION UNIT
33 INPUT/OUTPUT UNIT
24, 34, 44, 54, 64 CONTROL UNIT
211, 311 RECEPTION PROCESSING UNIT
212, 312 TRANSMISSION PROCESSING UNIT
213, 313 ANTENNA
241 RECEPTION UNIT
242 TRANSMISSION UNIT
441 ACQUISITION UNIT
442 DETERMINATION UNIT
443 NOTIFICATION UNIT
444 PROCESSING UNIT
445 VERIFICATION UNIT
446 CONTROL EXECUTION UNIT

The invention claimed is:

1. A first information processing device, comprising:
circuitry configured to:
   acquire first information associated with a second wireless system, wherein
      the first information comprises a radio wave propagation model and a count of communication devices registered on the second wireless system, and
      the second wireless system performs wireless communication based on radio waves in a frequency band used by a first wireless system;
   determine a first communication parameter of the second wireless system at specific timings based on the radio wave propagation model and the count of communication devices registered on the second wireless system;
   determine a number of times of the determination of the first communication parameter is equal to a specific number; and
   notify a second information processing device of the first communication parameter based on the determination that the number of times of the determination of the first communication parameter is equal to the specific number.

2. The first information processing device according to claim 1, wherein the circuitry is further configured to notify the second information processing device of the first communication parameter of the second wireless system each time the first communication parameter is determined.

3. The first information processing device according to claim 1, wherein
the second information processing device determines the first communication parameter of the second wireless system at the specific timings, and
the circuitry is further configured to:
   hold a count of the number of times of the determination of the first communication parameter, wherein the count is common to the first information processing device and the second information processing device, and
   notify the second information processing device of the first communication parameter of the second wireless system each time the count is equal to the specific number.

4. The first information processing device according to claim 1, wherein the circuitry is further configured to acquire the first information on the second wireless system controlled by the first information processing device.

5. The first information processing device according to claim 1, wherein the circuitry is further configured to acquire the first information on the second wireless system controlled by the second information processing device.

6. The first information processing device according to claim 1, wherein the second information processing device is a device that determines a second communication parameter of a third wireless system.

7. The first information processing device according to claim 1, wherein the circuitry is further configured to:
   perform processing on at least a part of the first information on the first communication parameter to prevent falsification; and
   notify the second information processing device of the communication parameter subjected to the processing to prevent the falsification.

8. The first information processing device according to claim 7, wherein the circuitry is further configured to add a hash of at least the part of the first information on the first communication parameter to the first information on the first communication parameter.

9. The first information processing device according to claim 7, wherein the circuitry is further configured to insert a digital watermark to at least the part of the first information on the first communication parameter.

10. An information processing method by a first information processing device, the method comprising:
   acquiring information on a second wireless system, wherein
      the information comprises a radio wave propagation model and a count of communication devices registered on the second wireless system, and
      the second wireless system performs wireless communication based on radio waves in a frequency band used by a first wireless system;
   determining a communication parameter of the second wireless system at specific timings based on the radio wave propagation model and the count of communication devices registered on the second wireless system;
   determining a number of times of the determination of the communication parameter is equal to a specific number; and
   notifying a second information processing device of the determined communication parameter based on the determination that the number of times of the determination of the communication parameter is equal to the specific number.

* * * * *